US011819883B2

(12) United States Patent
Lee et al.

(10) Patent No.: US 11,819,883 B2
(45) Date of Patent: Nov. 21, 2023

(54) SYSTEMS FOR INTERFACING WITH IMMERSIVE COMPUTING ENVIRONMENTS

(71) Applicant: Emerge Now Inc., Marina del Rey, CA (US)

(72) Inventors: Sylvester Spencer Lee, Marina del Rey, CA (US); Isaac Castro, Marina del Rey, CA (US); Mauricio Teran, Marina del Rey, CA (US); James D. Hamilton, Marina del Rey, CA (US); Carmen Badea, Marina del Rey, CA (US); Ravi Patel, Marina del Rey, CA (US); Nathan E. Brummel, Marina del Rey, CA (US); Edward Marc Fernandez, Marina del Rey, CA (US); Naveen Anand Gunalan, Marina del Rey, CA (US); Dustin Delmar, Marina del Rey, CA (US)

(73) Assignee: Emerge Now Inc., Marina del Rey, CA (US)

(*) Notice: Subject to any disclaimer, the term of this patent is extended or adjusted under 35 U.S.C. 154(b) by 0 days.

(21) Appl. No.: 17/296,445

(22) PCT Filed: Mar. 11, 2019

(86) PCT No.: PCT/US2019/021699
§ 371 (c)(1),
(2) Date: May 24, 2021

(87) PCT Pub. No.: WO2020/131145
PCT Pub. Date: Jun. 25, 2020

(65) Prior Publication Data
US 2022/0016673 A1    Jan. 20, 2022

Related U.S. Application Data

(63) Continuation-in-part of application No. PCT/US2018/066087, filed on Dec. 17, 2018.

(51) Int. Cl.
G06F 3/01     (2006.01)
B06B 1/06     (2006.01)

(52) U.S. Cl.
CPC ............ *B06B 1/0637* (2013.01); *G06F 3/011* (2013.01); *G06F 3/016* (2013.01)

(58) Field of Classification Search
CPC ......... B06B 1/0637; G06F 3/011; G06F 3/016
See application file for complete search history.

(56) References Cited

U.S. PATENT DOCUMENTS 4,649,926 A * 3/1987 Abbott ................. G01S 15/894
                                                    600/445
4,745,812 A * 5/1988 Amazeen ................ G01L 1/18
                                                    901/33
(Continued)

FOREIGN PATENT DOCUMENTS

GB      2250093 A      5/1992
WO   2013038293 A1    3/2013
WO   2018039076 A1    3/2018

OTHER PUBLICATIONS

"Takayuki Hoshi, Development of Aerial-Input and Aerial-Tactile-Feedback System. Jun. 2011, pp. 569-573" (Year: 2011).*
(Continued)

*Primary Examiner* — Ryan F Pitaro
(74) *Attorney, Agent, or Firm* — Jeffrey Schox; Caitlin Ploch

(57) ABSTRACT

A multi-array ultrasound system for haptic engagement is provided. The system may include a computing device with a processing system, a tracking device communicatively coupled to the processing system, two or more ultrasound transducer arrays including a plurality of ultrasound trans-
(Continued)

ducers, and a driver communicatively coupled to the processing system and the two or more ultrasound transducer arrays.

20 Claims, 41 Drawing Sheets

(56) References Cited

U.S. PATENT DOCUMENTS

| | | | |
|---|---|---|---|
| 5,377,166 | A | 12/1994 | Kuhn |
| 9,092,953 | B1* | 7/2015 | Mortimer ................ G06F 3/016 |
| 9,278,375 | B2* | 3/2016 | Angle ................... B06B 1/0207 |
| 9,477,317 | B1* | 10/2016 | Clements ................ G06F 3/017 |
| 10,423,226 | B2* | 9/2019 | Chen ....................... G06F 3/017 |
| 10,497,358 | B2* | 12/2019 | Tester ................... G06F 3/0436 |
| 10,732,721 | B1* | 8/2020 | Clements ............... B66B 1/468 |
| 11,334,165 | B1* | 5/2022 | Clements ........... G02B 27/0093 |
| 11,353,135 | B1 | 6/2022 | Koenig .............. F16K 99/0046 |
| 11,531,395 | B2* | 12/2022 | Kappus ................ G06F 3/0304 |
| 2010/0052827 | A1 | 3/2010 | Schneider et al. |
| 2010/0268503 | A1* | 10/2010 | Specht .................. A61B 8/587 |
| | | | 73/1.82 |
| 2010/0302015 | A1* | 12/2010 | Kipman .................. A63F 13/42 |
| | | | 340/407.1 |
| 2012/0038582 | A1 | 2/2012 | Grant |
| 2014/0219062 | A1* | 8/2014 | Rothberg ............... G10K 11/18 |
| | | | 367/135 |
| 2016/0180644 | A1 | 6/2016 | Idris et al. |
| 2016/0320843 | A1* | 11/2016 | Long ....................... G06F 3/016 |
| 2017/0018171 | A1* | 1/2017 | Carter .................... G10K 11/34 |
| 2017/0035391 | A1* | 2/2017 | Liu ........................... A61N 7/00 |
| 2017/0080255 | A1 | 3/2017 | Law et al. |
| 2017/0123499 | A1* | 5/2017 | Eid .......................... G06F 3/017 |
| 2017/0153707 | A1 | 6/2017 | Subramanian et al. |
| 2018/0151035 | A1* | 5/2018 | Maalouf .................. G08B 6/00 |
| 2018/0193098 | A1* | 7/2018 | Caluser .................. A61B 34/20 |
| 2019/0341057 | A1* | 11/2019 | Zhang ................ G01N 21/8983 |
| 2020/0116672 | A1* | 4/2020 | Fukumoto ........... G01N 29/225 |
| 2020/0393156 | A1* | 12/2020 | Kim ........................ G06F 3/017 |
| 2021/0162457 | A1* | 6/2021 | Ebefors ................. G10K 15/00 |
| 2021/0211823 | A1* | 7/2021 | Shani ..................... H04R 1/406 |
| 2022/0149264 | A1* | 5/2022 | Pelssers ..................... G01L 1/16 |
| 2022/0152427 | A1* | 5/2022 | Bonutti ..................... A61N 7/00 |

OTHER PUBLICATIONS

International Search Report and Written Opinion of the ISA for application No. PCT/US2018/066087 dated Mar. 11, 2019.
International Search Report and Written Opinion of the ISA for application No. PCT/US2019/021699 dated Mar. 11, 2019.

* cited by examiner

SYSTEMS FOR INTERFACING WITH IMMERSIVE COMPUTING ENVIRONMENTS

CROSS-REFERENCE TO RELATED APPLICATIONS

This application is a continuation-in-part of International Application PCT/US18/6608 filed on Dec. 17, 2018 and which is hereby incorporated in its entirety by reference.

BACKGROUND OF THE INVENTION

Field of the Invention

The present invention generally relates to interfacing with immersive computing environments and more specifically to the use of ultrasonic energy to provide tactile sensations on the body of one or more users as the users interact with objects in an immersive computing environment.

Description of the Related Art

Haptic interactions involve systems and apparatus that impart kinesthetic or tactile sensations to a user in the course of user engagement with an object. These sensations may be created through the use of vibrations or force-feedback generated by mechanical sensors in a control device. Vibrations are typically characterized by oscillation of a fluid or an elastic solid whose equilibrium has been disturbed. Force-feedback implies physical resistance akin to attempting to "turn into" a wall (i.e., the wall would preclude the turn).

One of the earliest haptic devices was a telephone handset paired with a similarly designed handset to form a closed-loop feedback system. The system would present variations in pressure to a user at one handset as conveyed by the user of the other handset. Compression at one end of the phone line would cause an increase in pressure and/or expansion at the other end.

Mobile phones and handheld computing devices have continued that trend by integrating haptic feedback in the form of "ring" indicators like those found in early paging devices as well as user touch or device interaction response. In the latter example—sometimes referred to as surface haptics—the mobile device will produce a variety of forces on the finger of a user as the user engages the surfaces of the touchscreen device. These forces simulate a typing experience or indicate the selection or the actuation of a device feature or function.

Haptic interactions have also been a common feature for arcade gaming consoles. For example, arcade-based motorbike and driving games use haptic feedback in handlebars or steering wheels. The handlebars or steering wheel vibrate in the event of a collision or traversal of rough terrain. The handlebars also provide force-feedback in the event of a controlled game object encountering a larger or perhaps immovable object.

Home entertainment systems, too, have imparted tactile experiences in the form of joysticks and controllers. Nintendo and Sony Computer Entertainment respectively introduced the Nintendo 64 RumblePak and Sony PlayStation DualShock controller. The RumblePak was a removable, battery-operated device with a single motor plugged into a Nintendo controller. The Dual Shock involved two vibration motors housed within the handles of the game controller and drew power directly from the attached gaming console. Both devices would provide vibrations responsive to in-game interactions such as explosions, collisions, or other high-intensity events.

All of the foregoing instances of haptic interactions require a physical engagement with the vibration-driven or feedback-driven object. Physical engagement is not as practical with the increasing prevalence of immersive computing technologies. Immersive computing is generally representative of technologies that blur—or completely erase—the line between the physical world and the digital or simulated world thereby creating an immersive experience.

Immersive computing includes virtual reality (VR) technologies, which may use computer simulated imagery and environments to replace the real-world. VR technologies are typically effectuated through a user worn headset. Immersive computing also includes augmented reality (AR) technologies that involve a live or indirect view of the real-world supplemented by extra-sensory input. AR technologies are typically implemented in the context of glasses or other 'wearable' devices but can also involve non-wearable technologies such as the use of projections and holograms, which constitute a type of immersive computing experience in its own right. Other exemplary forms of immersive computing include mixed reality (MR), extended-reality (XR), augmented virtuality (AV), three-dimensional displays, full domes, three-dimensional audio, omnidirectional treadmills, and machine olfaction. Immersive computing can be represented by any one or more of the foregoing technologies alone or in combination as well as in proactive and reactive engagements.

In many of the foregoing examples, the user is unlikely to engage with the likes of a surface or controller. Requiring physical engagement would negatively impact the usability and reality of the immersive computing environment. Efforts to effectuate a haptic experience that does not require the presence of a glove, vest, or hand-held control object have resulted in only a modicum of success.

Haptic experiences such as those offered by four-dimensional (4-D) cinema have largely been limited to the use of compressed air jets in conjunction with other physical experiences (e.g., vibrations, smoke machines, wind, and fog). Installation of the hardware apparatus required for such an experience is expensive and requires custom-built venues such as theme and amusement parks. In those instances, where installation is economically possible, compressed air jets lack vertical resolution, precision control, and can create only very diffuse experiences such as blasts of air. These instances have been dismissed as gimmicky physical distractions that completely remove the user from an immersive experience rather than creating the same.

Thus, there is a need in the art for haptic interfaces that imparts a degree of realism equal to that implemented by an immersive computing experience without the need for complex physical installations or other custom-designed venues. An interface is needed that allows for coverage of larger distances and provides for a wider range of interactions thereby allowing a user to extend an appendage into a broader workspace while providing for multiple points of or comprehensive sensation or interaction without sacrificing user comfort with respect to any such interaction.

SUMMARY

A multi-array ultrasound system for haptic engagement is provided. The system may include a computing device with a processor; a tracking device communicatively coupled to the processing system, wherein the tracking device provides the tracking information to the processing system; two or more ultrasound transducer arrays including a plurality of ultrasound transducers that can produce multiple localized acoustic fields of ultrasonic energy; and a driver communicatively coupled to the processing system and the one or more ultrasound transducer arrays. The driver may cause the plurality of ultrasound transducers to create a mid-air tactile sensation on the body part of the at least one user through excitement of the two or more ultrasound transducer arrays in response to feedback from the processing system that is responsive to the tracking information from the tracking device.

Other features and advantages of the present invention will be or will become apparent to one skilled in the art upon examination of the following figures and detailed description, which illustrate, by way of examples, the principles of the present invention.

DETAILED DESCRIPTION

Figure 1A:
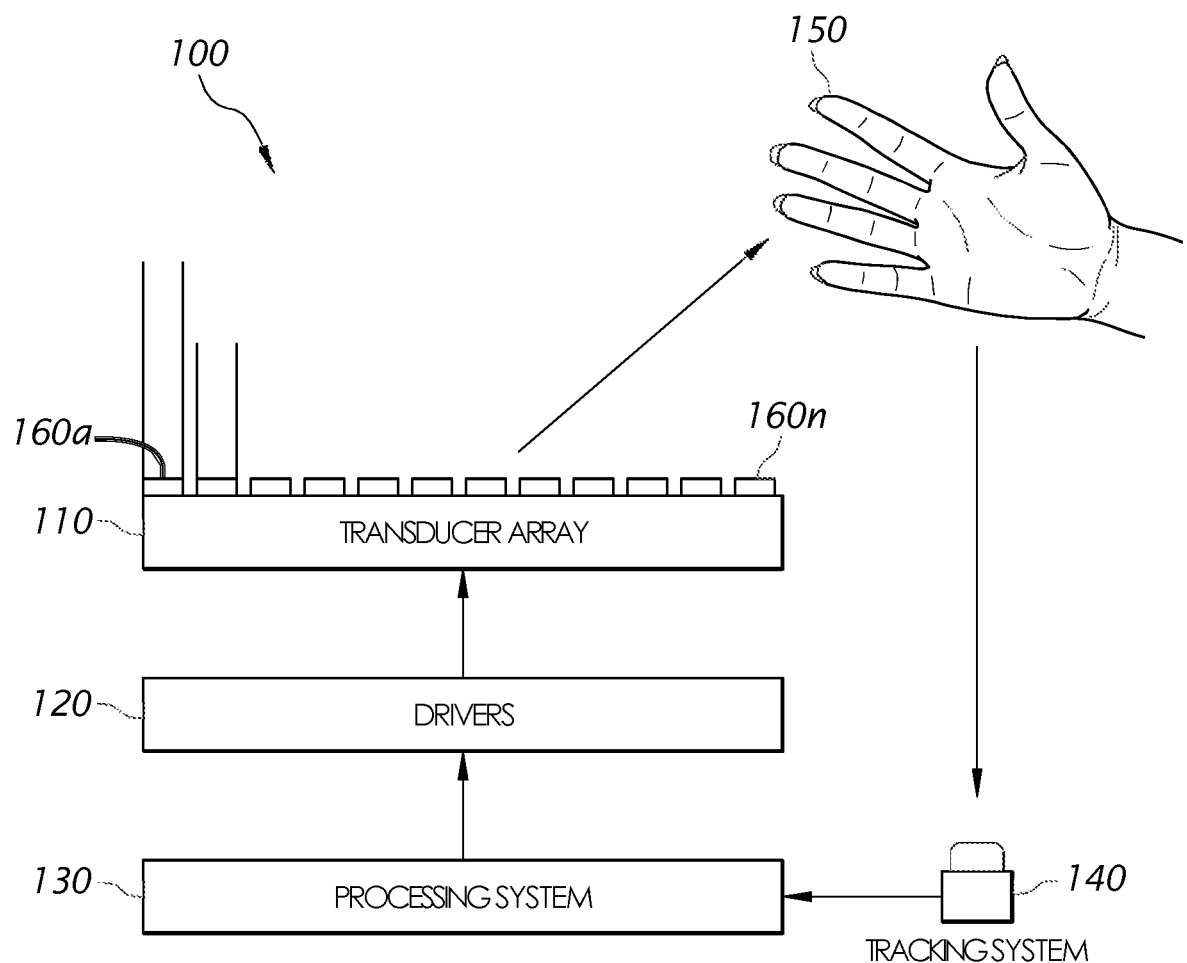
FIG. 1A illustrates a two-dimensional flat panel ultrasound system providing for tactile mid-air haptic feedback, according to exemplary embodiments of the present invention.

Disclosed herein are ultrasound systems for providing tactile mid-air haptic feedback. Embodiments of the present invention create a precise mid-air tactile sensation at and on one or both hands (or some other body part) or the complete body of one or more users through the use of one or more ultrasound transducers.

Sound is a pressure wave that results from the vibration of the particles of the medium through which the wave is moving. An ultrasound transducer is a device that converts an electrical signal into an ultrasonic pressure wave through oscillation. The beam pattern of a transducer can be affected by the active transducer area, the ultrasound wavelength, and the sound velocity of the propagation medium. Ultrasound transducers can likewise receive and aid in the processing of an ultrasonic signal or an interaction related thereto.

Through the use of software algorithms and hardware electronic systems, it is possible to control the acoustic pressure in the field of view of the array. For example, it is possible to focus the pressure output of an array of ultrasound transducers by using a precise frequency, sound amplitude and a phase delay for each transducer. A phase delay is constituted of timing differences among multiple transducers' emissions. A single instance of the aforementioned phase delay is called a phase map. The array can produce focal points of ultrasonic energy by way of constructive interference. These focal points provide sufficient radiation pressure to be felt by a user. A software driven ultrasound system, programmed with specific phase maps, may thus produce focal points of ultrasonic energy that can be controlled in all axes.

The ultrasound system disclosed as part of the present invention may take on any number of form factors. For example, the ultrasound system may be implemented as a flat panel. The ultrasound system may likewise be implemented as part of a curved panel. Various underlying components of the system, such as drivers and processing devices, may have a variety of form factors as well depending on a particular implementation and use case. For example, as illustrated in various portions of FIGS. 1 and 2, certain system elements may be curved, certain elements may be two-dimensional, or certain embodiments may have a combination of curved and two-dimensional componentry.

Various multiple-array and three-dimensional configurations may allow for simultaneous haptic interaction at a number of angles. A multiple-array system using either a flat, curved, or a combination thereof array panel may be used in a table-based, ceiling-based, wall-based, furniture-based, article-based, and/or equipment-based installation. Polyhedral configurations, such as a cube, spheres, a pyramid, truncated pyramid, etc., may implement the panel designs. Cuboidal, spherical, cylindrical, conical designs (or at least partially spherical or conical designs), and any other shapes are also within the scope of the present invention through their implementation of the various panel arrays. The foregoing ultrasound systems may likewise be integrated into various objects such as clothing, other pieces of technology, accessories used in clothing or technology, furniture, such as a chair or table, etc. Flexible embodiments of an ultrasound system are also disclosed. Such an embodiment may allow for increased portability of the ultrasound system and the immersive computing engagements provided by the same.

A particular form factor is intended to be used in the context of a particular user case, many of which are illustrated and described here. The various embodiments described herein are meant to allow for engagement with larger distances and performance of a greater range of user interactions. For example, a user may extend their arms and reach into a particular workspace versus simply "pawing" at the extremes of the same.

Various form factors may allow for a user experiencing feelings or sensations in a series of areas or focal points on a given appendage. For example, a user may encounter a sensation on both sides of a hand (palm and dorsal), on the palm of one hand and the dorsal side of another, or the dorsal side of both hands. "Speaker bars" may allow for tactile engagement with multiple hands simultaneously, maintaining maximum pressure per hand, while standing or chest level while sitting. "Halo" designs, too, could allow a user to experience ultrasonic sensations all around their body or relative specific portions of their body as part of an omnidirectional experience.

The various form factors described herein are also meant to provide for more comfortable interactions. The presently disclosed invention is envisioned to be incorporated into any number of work-related, leisure-related, entertainment-related, interactive-related implementations. Such implementations might find a user engaged at a desk or work station for long hours. By providing a combination of multi-array configurations and/or three-dimensional ultrasound configurations, one or more users may experience more comfortable interactions with an immersive environment. For example, a user may allow their arms to rest on a desktop while utilizing their hands to engage with an ultrasound system and workspace.

As suggested above, the disclosed ultrasound systems may be utilized in combination with various immersive computing technologies and corresponding system and apparatus. For example, in a VR immersive experience, the user may utilize a head mounted display to generate a virtual environment in conjunction with the presently disclosed ultrasound system to provide haptic interactions with objects displayed in that environment. In an AR immersive experience, the user may utilize a set of transparent glasses to supplement a real-world environment while concurrently using the presently disclosed ultrasound system to provide haptic interactions.

The presently disclosed ultrasound system may also be used with projected or artificial images that do not require an AR or VR head mounted (or worn) device to create an immersive experience. For example, embodiments of the present ultrasound system may be used in conjunction with a projection device displaying a two-dimensional image.

Embodiments of the present ultrasound system may similarly be used with holographic projections of environments and objects. A three-dimensional projection may also be used in conjunction with embodiments of the present invention although some 3D projections may require the use of 3D glasses or some other worn visual device. In some embodiments, the ultrasound system may facilitate at least a two-way communication between two or more users wherein at least one of the users uses the ultrasound system. In some embodiments, the ultrasound system may facilitate sensory interactions between two or more users wherein at least one of the users uses the ultrasound system. In some embodiments, the two or more users could both be using the ultrasound system.

FIG. 1A illustrates a two-dimensional flat panel ultrasound system 100 providing for tactile mid-air haptic feedback. The system 100 as illustrated in FIG. 1A includes a two-dimensional ultrasound transducer array 110, a driver system 120, a processing system 130, and a tracking system 140. FIG. 1A further illustrates the hand 150 of a user interacting with the system 100. The transducer array 110 of FIG. 1A is arranged as a flat panel of ultrasound transducers 160a . . . 160n. Transducers 160n in array 110 may be an open structure ultrasound transmitter or sensor. An ultrasound transducer of this type may include a composite oscillating body that combines the oscillator and piezoelectric material with a resonator. The resonator may have a funnel shaped in order to efficiently radiate ultrasonic energy into a medium of interest (e.g., the air). A transducer as may be used in various embodiments of the present invention will have a given size, nominal operating frequency, bandwidth, sensitivity, sound pressure, and directivity. Subject to the requirements or limitations of any particular ultrasound system implementation, one of ordinary skill in the art may modify the configuration or substitute any particular ultrasound transducer while still remaining within the scope and spirit of the presently disclosed invention.

Figure 1B:
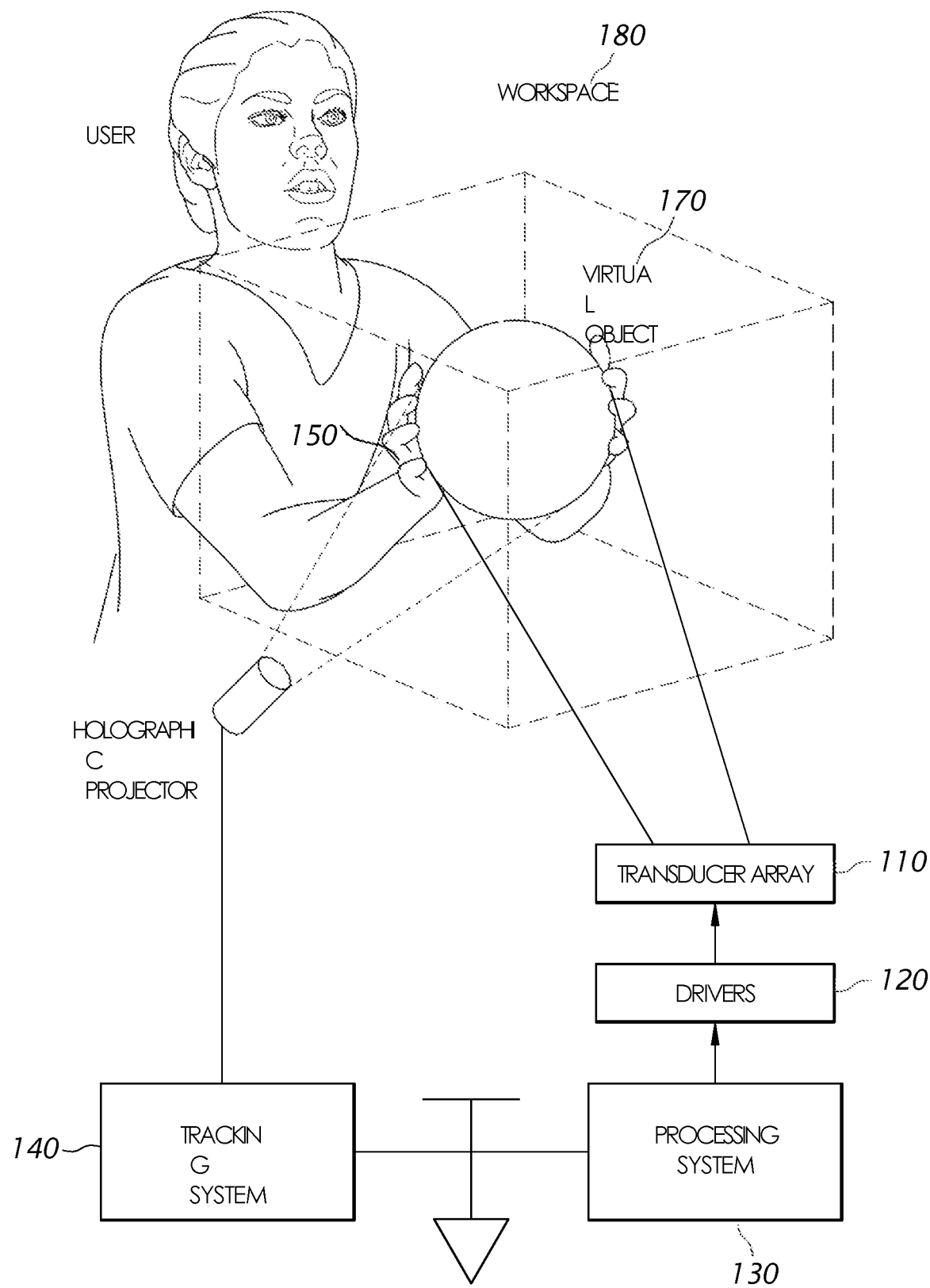
FIG. 1B illustrates a user interacting with a virtual object generated by an immersive computing system operating in conjunction with an ultrasound system like that in FIG. 1A, according to exemplary embodiments of the present invention.

While the tracking system 140 of FIG. 1A is described as having been implemented in the context of a stereoscopic infrared ("IR") camera, other technologies, such as ultrasonic and radar, may be utilized. The stereoscopic camera distills a video signal into a coherent data set that can be processed into actionable symbolic abstractions by the processing system 130, and any additional computing hardware or systems communicatively coupled thereto. In an exemplary mode of operation, an IR structured light source at the tracking system 140 emits a constant pattern onto a scene such as workspace 180 as discussed in the context of FIG. 1B. FIG. 1B illustrates a user interacting with a virtual object generated by an immersive computing system operating in conjunction with an ultrasound system 100 like that in FIG. 1A. This pattern may be acquired by a CMOS two-dimensional camera correlated against a reference pattern at the tracking system 140. The reference pattern is generated by capturing a plane at a known distance from each camera. When a speckle is projected on an object whose distance to the camera differs from that of the reference plane, the position of the speckle in the infrared image is shifted and measured by an image correlation process to generate a disparity map. The disparity map can then be used to calculate distance in real-space by way of triangulation.

The tracking system 140 senses the user hand 150 (or any other tracked body part) utilizing the tracking techniques identified above. For example, a user positions his or her hand 150 relative the tracker 140 for the purpose of interacting with an object in an immersive computing environment. The immersive environment might be generated by a computing device and related hardware and software operating in conjunction with ultrasound system 100 including but not limited to processing system 130. For example, the computing device and related hardware and software operating in conjunction with ultrasound system 100 may be a VR system with a head mounted display or an AR system that projects a hologram of an object or objects into a real-world physical space. The tracking system 140 sends the real-time spatial data concerning the movement and position of the user hand 150 (e.g., the three-dimensional coordinates of the fingertips and palm or any other tracked body part) to the processing system 130. This three-dimensional (3-D) positional information is processed by the processing system 130 to determine whether the user is in proximity to an object in a VR or AR space like that shown in the workspace 180 of FIG. 1B.

Processing system 130 is one or a set of processors or processing units (and supporting componentry) including but not limited to central processing units, graphics processing units, digital signal processing units, and field-programmable gate arrays. For example, in the case of a graphics processing unit (GPU), processing system 130 is inclusive of related electronic circuitry systems that allow for accelerated parallel processing for improved performance. The processing system may compute the virtual content in the immersive computing workspace, process the 3-D positional information from the tracking system to determine whether the user is in proximity to a virtual object, and translate information into coordinates that are transformed into phase maps and intensity values for the transducers.

Reference to a processing system 130 is similarly inclusive of a universe of processing technologies including dedicated graphics cards that interface with a motherboard, integrated graphics processors (IGPs) and unified memory architectures. Reference to a GPU is also meant to be inclusive of that segment of graphics processing technologies that include hybrid graphics processing as well as general purpose graphics processing units (GPGPUs) running compute kernels and external GPUs (eGPUs) that are located outside the housing of a computing device. The processing system 130 may utilize one or more algorithms responsive to the type of interaction, such as acoustic object shape, texture, etc., and location of interaction (hand tracking) to create phase maps and intensity values to generate signals for driving the transducers. The driver system 120 amplifies signals created by the processing system 130 to excite the transducers and create the desired acoustic field.

The driver system 120 controls the individual transducers 160 of array 110 thereby creating a tactile sensation on the hand 150 of the user. Responsive to information received from processing system 130, driver 120 broadcasts a control signal to one or more of the transducers 160 in the array 110. Driver 120 may operate in conjunction with one or more slave circuits (not shown) that receive the broadcast signal from driver 120 to control a series of the aforementioned transducers. Driver 120 (and slaves) may include one or more amplifiers and high pass filters as known in the ultrasonic art.

In some embodiments, tactile sensations on the skin of user hand 150 can be created by using a phased array of ultrasound transducers 160 to exert acoustic radiation responsive to control instructions from driver 120. Ultrasound waves are transmitted by the transducers 160a . . . 160n of array 110 with the phase emitted by each transducer 160 adjusted such that the waves concurrently arrive at the target point (i.e., the user hand 150) in order to maximize the acoustical radiation force exerted. While many existing ultrasound devices do not allow for distinctive multiple localized feedback points in mid-air, the present invention allows for high resolution haptic feedback through the use of a library of haptic features such that a user can distinguish between multiple localized feedback points separated by a small distance. Such a system also allows information to be transmitted via an additional haptic channel in parallel with or as an alternative to a visual display. This is in addition to the aforementioned benefits of increased interaction range, multiple sensation points or areas on user appendages, and increased comfort of the user.

As illustrated in FIG. 1B, the user may interact with a virtual object 170 in an immersive computing workspace 180 subject to tracking by tracking system 140. The immersive computing environment may be created through holographic projection. The specific dimensions of the workspace 180 may vary dependent upon a particular implementation of the ultrasound system 100 (specifically the ultrasonic power of array 110) and the immersive computing environment, including the size of virtual object 170.

In FIG. 1B, the hands 150 of user are tracked by tracking system 140 relative the virtual object 170 generated by a computing device working in conjunction with or otherwise including processing system 130. As the hands 150 of user approach the virtual object 170—an approach observed by tracker 140 and communicated to processing system 130—the driver 120 can receive control signals based on positional information from processing system 130 to cause the transducer array 110 to effectuate a particular tactile sensation at hands 150 based on their current position in three-dimensional space and relative the virtual object 170. For example, virtual object 170 may be a basketball having a particular circumference requiring the ultimate sensation of coming into contact with the ball surface. Transducers 160 of array 110 may be controlled by driver 120 responsive to processing system 130 to create the sensation of coming into contact with that object in real-world space.

Figure 2A:
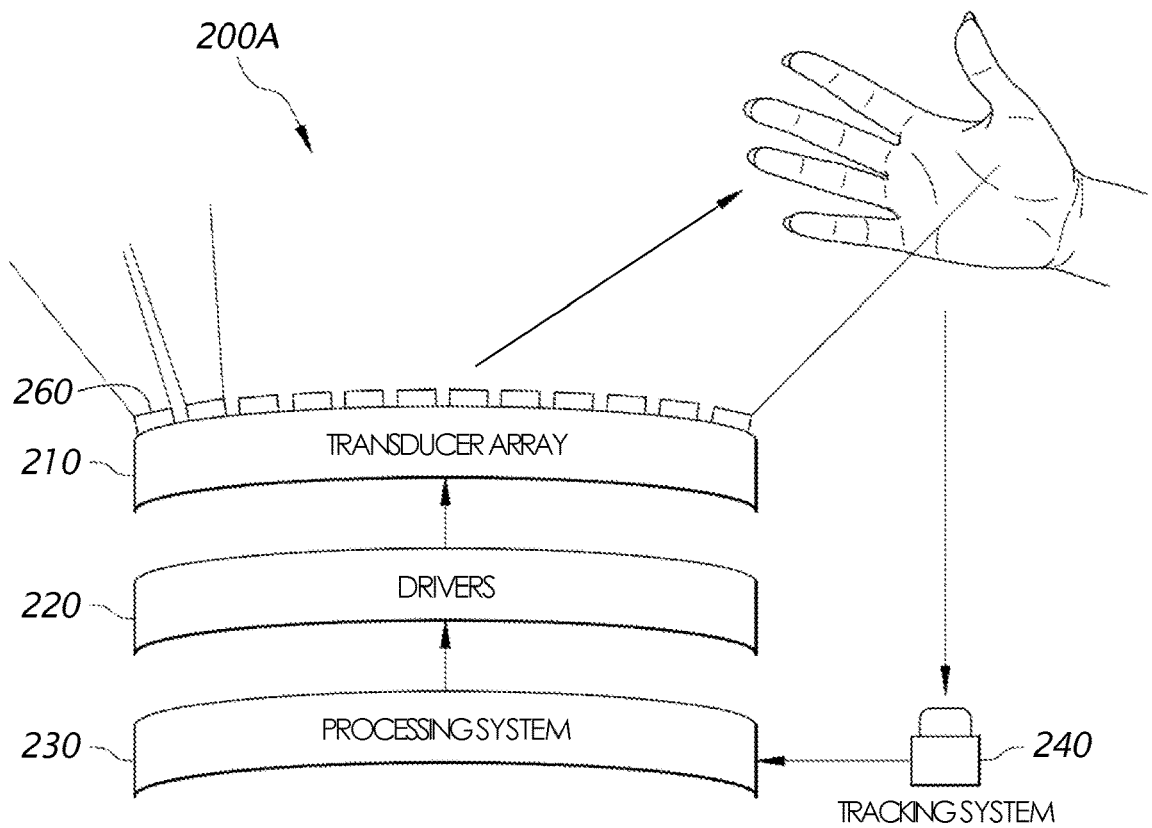
FIG. 2A illustrates a curved ultrasound system providing for tactile mid-air haptic feedback, according to exemplary embodiments of the present invention.

FIG. 2A illustrates a curved ultrasound system 200A providing for tactile mid-air haptic feedback. The ultrasound system 200 of FIG. 2A operates in a manner similar to the ultrasound system 100 of FIG. 1 but for the fact that the transducer array 210 has a convex curvature. Driver system 220 operates in a manner similar to that of driver system 120 in FIG. 1A but—at least as illustrated in FIG. 2A—is similarly curved in nature. A preferred embodiment of ultrasound system 200 presents with the dual convex configuration of array 210 and driver 220. An alternative embodiment is nevertheless possible with a curved transducer array 210 and a flat driver system like that shown in FIG. 1A (120) and as illustrated in FIG. 2B below.

In FIG. 2A, the design and implementation of processing system 230 and tracking system 240 are not changed versus corresponding elements 130 and 140 of FIG. 1A. Further, the design and implementation of transducers 260 also do not change with respect to their underlying design and functionality as described in the context of FIG. 1A. Only the presentation of transducers 260 changes in light of the form factor of the convex array 210. Due to the curvature of the array 210, the positioning of the individual transducers 260 will be angled (curved) thereby resulting in a 'fan shape' and corresponding increase in the volume of the acoustic field versus that which may be produced by the typical two-dimensional flat panel array 110 of FIG. 1A. The foregoing notwithstanding, the work flow of the various elements of the ultrasound system 200 in FIG. 2A is otherwise identical to that of system 100 concerning tracking, driver control, and ultimate creation of a tactile sensation; i.e., the primary change here is the position of the transducers used to calculate the phase maps.

Figure 2B:
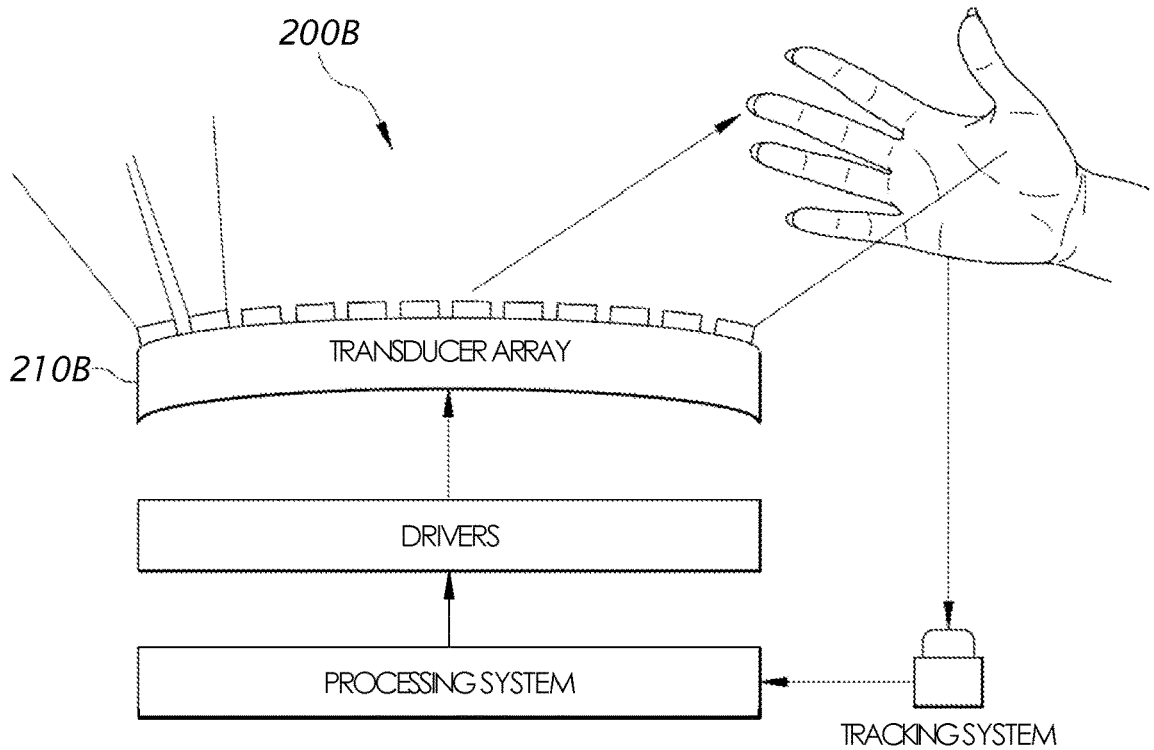
FIG. 2B illustrates an alternative embodiment of FIG. 2A where the processing system and the driver are flat, but the ultrasound system retains a curved form factor, according to exemplary embodiments of the present invention.

FIG. 2B illustrates an alternative embodiment 200B of FIG. 2A where the processing system and driver are flat, but the ultrasound system retains a curved form factor as shown by array 210B. The functionality of the elements of the alternative embodiment illustrated in FIG. 2B are the same as described in the context of FIG. 2A. The embodiment of FIG. 2B is meant to illustrate that different forms of componentry may be utilized in the course of implementing the presently claimed invention while retaining the underlying functionality of the same.

Figure 3A:
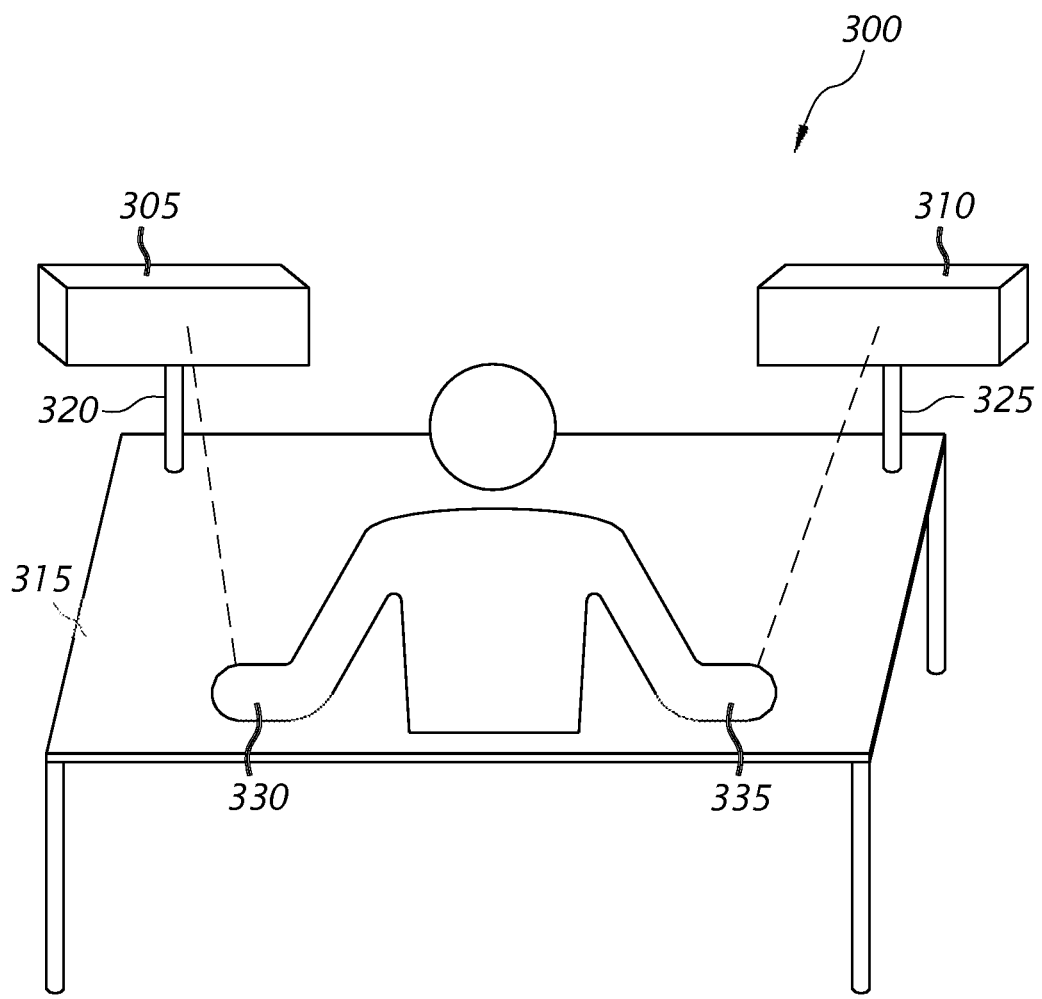
FIG. 3A illustrates a multi-array ultrasound system for providing tactile mid-air haptic feedback in use where the system is part of a workstation-based installation, according to exemplary embodiments of the present invention.

FIG. 3A illustrates a multi-array ultrasound system 300 for providing tactile mid-air haptic feedback where the system is part of a user's surrounding, such as a workstation-based installation. The ultrasound system 300 of FIG. 3A utilizes a two-dimensional flat-panel ultrasound system design like that described in the context of FIG. 1A (i.e., ultrasound system 100). The ultrasound system 100 is integrated into mountable ultrasound units 305 and 310. Mountable units 305 and 310 are then structurally coupled to the workstation 315 by way of adjustable stands 320 and 325.

The multiple arrays illustrated in the context of FIG. 3A (and other multi-array systems as discussed herein) may be synchronized utilizing a master processing system (not shown) for a series of ultrasound arrays with all other arrays operating in a slave relationship to the same (i.e., with a driver but no master processing system). In some embodiments, the master processing system and any requisite master-slave software componentry may be integrated into the processing systems of the slave arrays. The master processing system distributes signals to slave processing systems. The master processing system may be responsive to digital content, hand position (via tracking system), etc. The master processing system may also provide synchronization to slaves. The synchronization can have different levels of precision. For example, course synchronization may be at the rate the object moves or texture changes. Finer synchronization may be achieved by controlling the timing of the ultrasound wave emission from each array such that the foci from different modules (arrays) can be combined coherently (joint constructive interference). A specialized synchronization component need not be present and may be integrated into other elements of the system. The master processing system (or processing system tasked as the master) may determine phase maps and intensity values for one or a series of arrays. The master processing system may then communicate with the slave units (or non-master processing systems) and maintain synchronicity with the same using any communication mechanism, such as wired or wireless, including but not limited to 802.xx, ultrasound, serial peripheral interface (SPI), IEEE1394 serial bus and other USB serial bus protocols, or bluetooth.

Stands 320 and 325 may be similar to speaker stands manufactured for the placement of satellite speakers in home sound systems. Stands 320 and 325 may be height adjustable with a heavy-gauge offset steel pillar having an integrated channel for the purpose of housing, protecting, and guiding various wire channels related to mountable units 305 and 310 (e.g., power couplings). Mountable ultrasound units 305 and 310 may be affixed to stands 320 and 325 through a top plate, L-shape, or keyhole-type bracket depending on the weight and other specifications of units 305 and 310. Stands 320 and 325 may be free-standing with respect to the workstation 315 or may be temporarily or permanently affixed to the same. Workstation 315 may be a working surface such as a desk or table. Workstation 315 is inclusive of any area (e.g., a workspace) where a user is engaged with some sort of output warranting tactile mid-air haptic feedback.

Ultrasound system 300 may allow tactile sensation to be provided to both hands 330 and 335 of a user. Such a system may be paired with an immersive computing system offering, for example, VR, AR, or instances of holographic interaction (not shown). Such immersive computing systems may project an image or images in an open area of workstation 315 similar to the workspace 180 of FIG. 1B. In conjunction with a processing system and tracking system (as described elsewhere in this specification), input data related to the three-dimensional position of the hands of the user (330 and 335) are provided to a driver system by the processing system, which controls the two-dimensional flat panel ultrasound componentry of mounted ultrasound units 305 and 310. Appropriate tactile sensations may be provided as dictated by any corresponding immersive computing generated visuals and user interaction with the same. While not illustrated in FIG. 3A, a further embodiment may include the likes of ultrasound "speaker" bar as described earlier in this disclosure. Such a speaker bar may be tasked with unique or specific ultrasonic related assignments much in the way a sub-woofer might operate in an audio system.

Figure 3B:
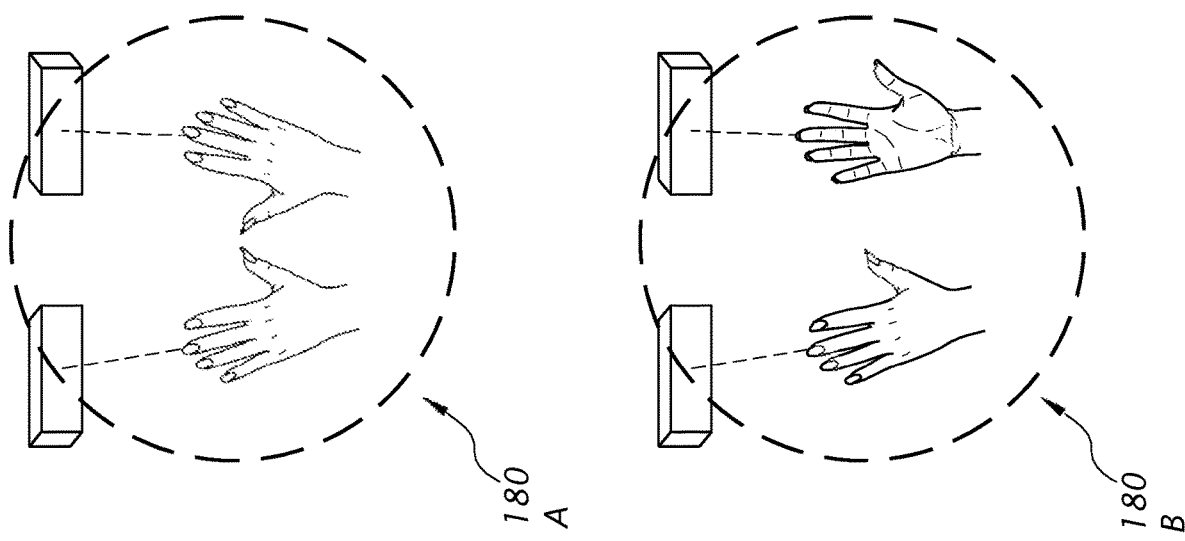
FIG. 3B illustrates a multi-array ultrasound system for providing tactile mid-air haptic feedback in use where the system is part of a ceiling-based installation, according to exemplary embodiments of the present invention.
Figure 3B:
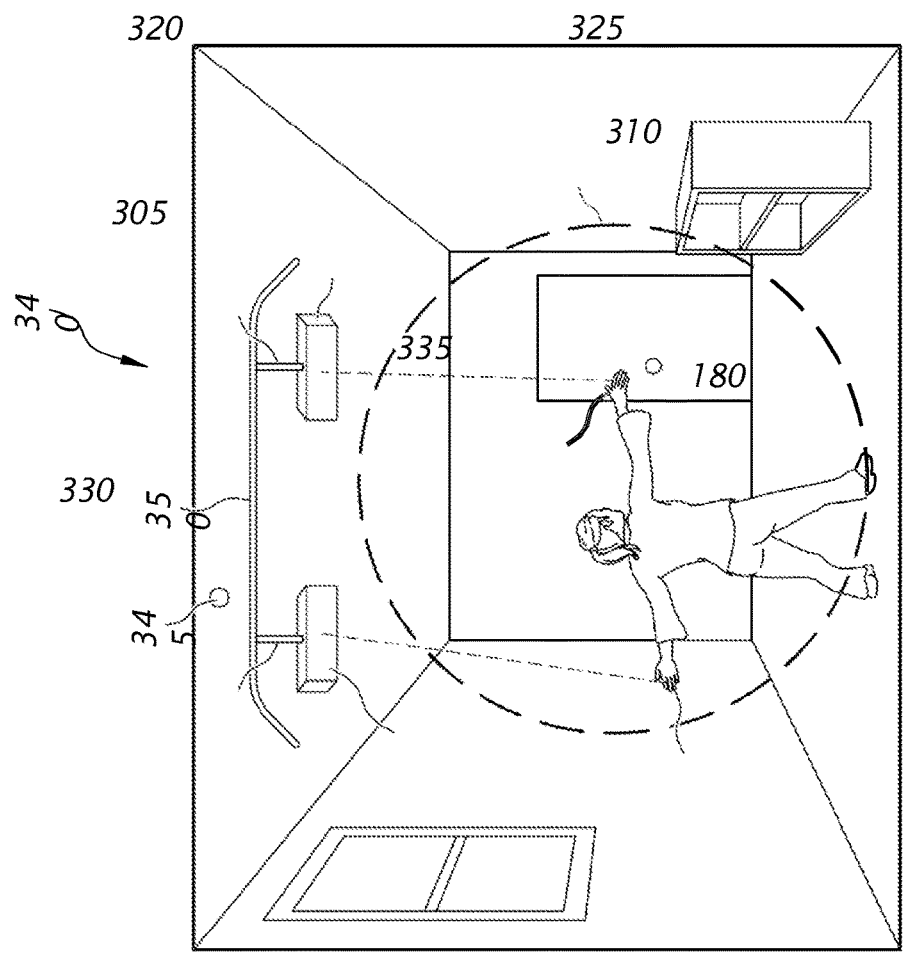

FIG. 3B illustrates a multi-array ultrasound system 340 for providing tactile mid-air haptic feedback where the system is part of a user's surrounding, such as a ceiling-based installation 345. Like the ultrasound system 300 of FIG. 3A, system 340 includes flat-panel ultrasound systems integrated into mountable ultrasound units 305 and 310. Ultrasound units 305 and 310 of system 340 utilize a structural coupling mechanism, which may be like stands 320 and 325 of FIG. 3A.

Unlike FIG. 3A, the ultrasound units 305 and 310 shown in FIG. 3B cannot be free-standing because said units are mounted to the ceiling 345. The ultrasound units 305 and 310 of FIG. 3B may be movable or adjustable, however, as can be effectuated using a continuous track device 350 that contain any necessary electrical conductors and that otherwise receive stands 320 and 325. Tracks 350 can be mounted to the ceiling 345 (or walls) lengthwise down beams or crosswise across rafters or joists allowing for X- and Y-axis adjustments. Ultrasound units 305 and 310 may alternatively or additionally be coupled to the ceiling 345 or track devices 350 with adjustable mounts allowing for height adjustment (Z-axis adjustments).

The workstation 315 of FIG. 3A is replaced by the broader workspace 180 concept of FIG. 1B. This configuration allows tactile sensation to be provided to both hands 330/335 of the user in a room scale setting without the need of ultrasound devices being placed on a table or other fixture. As shown in the exploded views of FIG. 3B that highlight workspace 180, the user can interact with a larger distance and more readily extend their arms and hands in a natural manner. This is accomplished without necessarily sacrificing user comfort. Further—and as is also shown in said exploded view (FIGS. 3B' and 3B")—the user may encounter multiple sensations or interactions over a given appendage, parts of appendage, opposite sides or locales of an appendage, various appendages, or a combination of the foregoing. As a result, the user has a more comprehensive engagement with the workspace.

Ultrasound system 340 may be paired with an immersive computing system that projects or displays an image or images in the open workspace 180. In conjunction with a processing system and tracking system, appropriate tactile sensations may be provided as dictated by any immersive computing environment visuals and user interaction with the same by way of driver componentry interacting with the aforementioned processing system and ultrasound array of system 340.

Figure 3C:
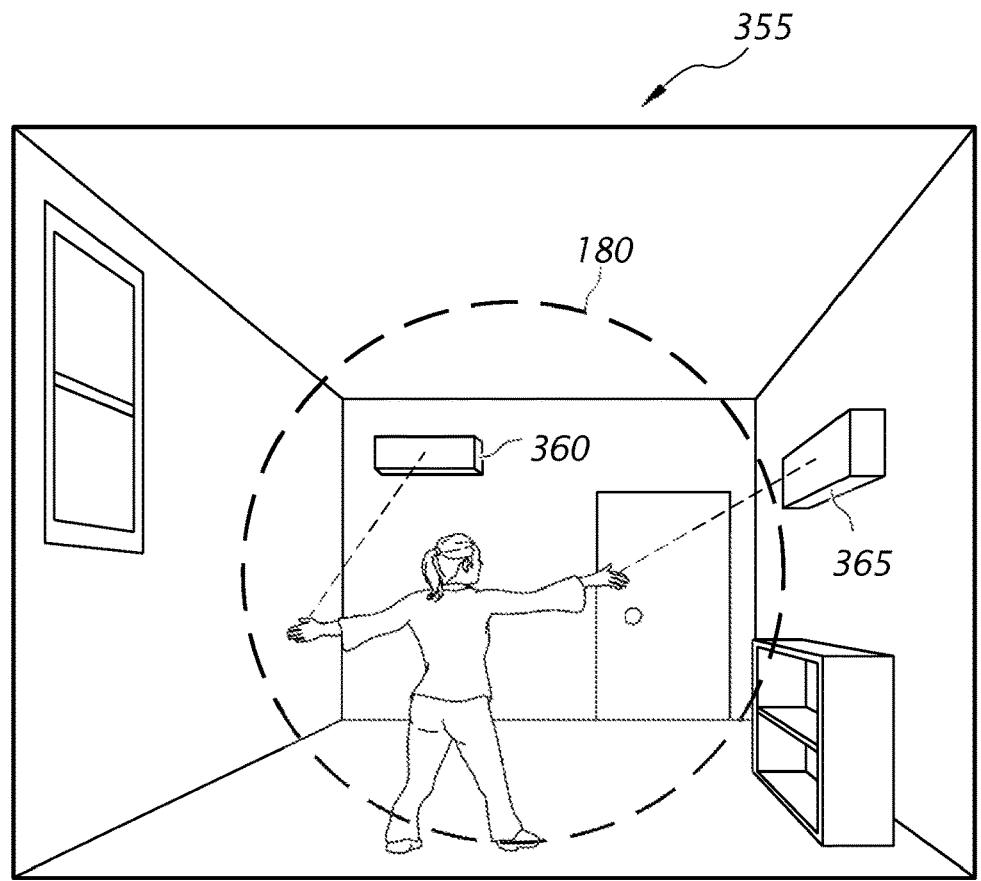
FIG. 3C illustrates a multi-array ultrasound system for providing tactile mid-air haptic feedback in use where the system is part of a wall-based installation, according to exemplary embodiments of the present invention.

FIG. 3C illustrates a multi-array ultrasound system 355 for providing tactile mid-air haptic feedback where the system is part of a user's surrounding, such as a wall-based installation 360. FIG. 3C illustrates an alternative implementation of a flat panel ultrasound system where ultrasound units are embedded in a wall or other surface area as shown by installations 360 and 365. Units may also be attached or otherwise installed subject to the physical design characteristics or limitations of any particular surface area. The design and operation of the ultrasound system 355 is otherwise like that of FIGS. 3A and 3B whereby tactile sensations may be provided as dictated by any corresponding immersive computing system visuals and corresponding user interaction within workspace 180.

Figure 3D:
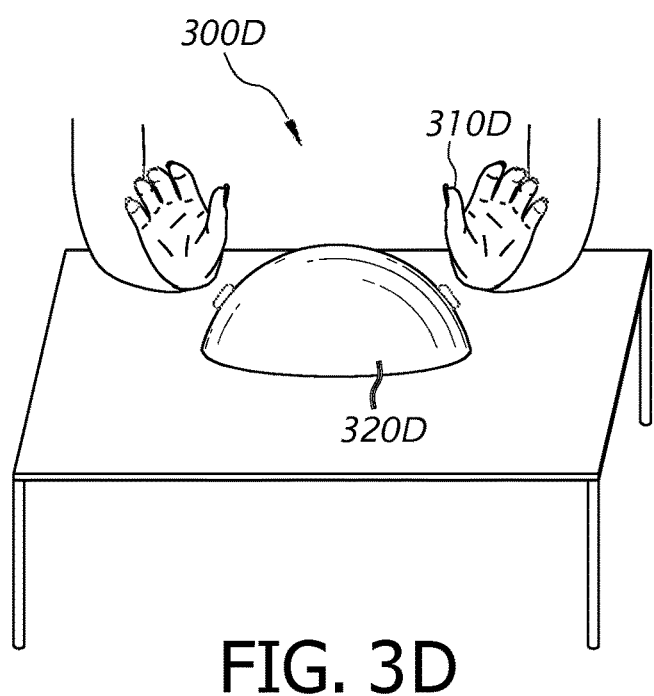
FIG. 3D illustrates an exemplary ultrasound system for providing tactile mid-air haptic feedback in use whereby the system provides for a larger realm of interaction without sacrificing comfort or engagement of the user, according to exemplary embodiments of the present invention

FIG. 3D illustrates the exemplary ultrasound system of FIG. 4G (described below) in use whereby it provides for a larger realm of interaction without sacrificing comfort or engagement of the user. As can be seen in FIG. 3D, the user is able to engage with larger distance and have a broader range of interactions with the workspace generated by the ultrasound system, which otherwise has the same functionality as described in the context of FIG. 4G. In some embodiments, ultrasound array described herein may produce acoustic fields and ultrasonic beams with different characteristics than the flat panel array described in FIG. 1A. For example, the ultrasonic beams may be broader and weaker than a similarly sized flat panel array but provide a larger field of interaction. The user is similarly able to encounter ultrasonic engagement at multiple points on a pair of appendages (i.e., the hands of the user 310D). Such interactions are intuitively natural and comfortable as well as a result of the user resting their hands on a workstation that otherwise hosts the ultrasound system. While a spherical embodiment 320D like that of FIG. 4G is illustrated, the benefits of such a system may be enjoyed in any number of form factors—spherical or otherwise, including but not limited to cylindrical.

Figure 4A:
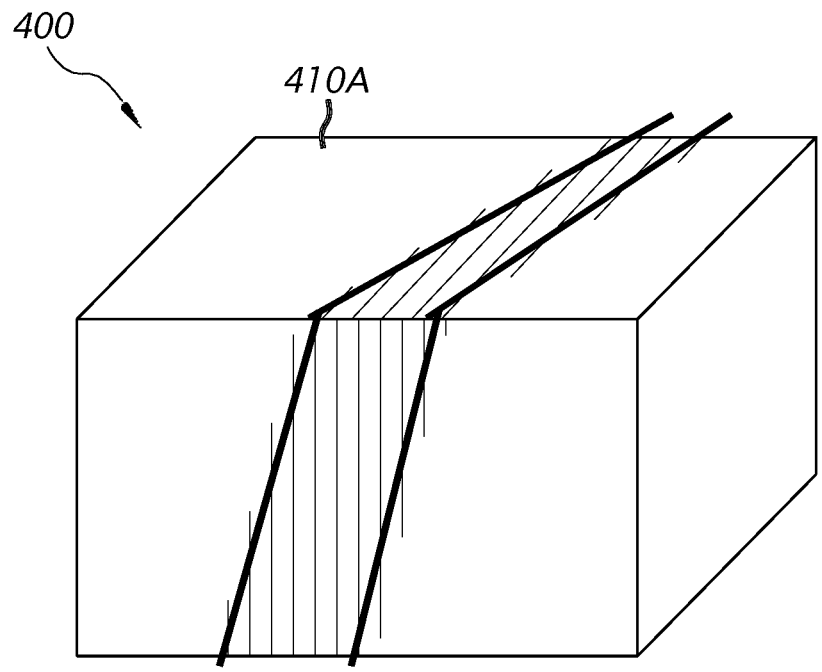
FIG. 4A illustrates an ultrasound system for providing tactile mid-air haptic feedback where the system is cuboidal, according to exemplary embodiments of the present invention.

FIG. 4A illustrates a polyhedral ultrasound system 400 for providing tactile mid-air haptic feedback where the system is a cube. The form factor illustrated in FIG. 4A includes a flat panel ultrasound system like the two-dimensional ultrasound system 100 of FIG. 1A. By utilizing a polyhedral design, specifically a cube, a user may feel tactile sensation and interact with the system 400 from multiple angles. Such a system may similarly allow for omnidirectional tracking and interaction depending on the exact placement and integration of transducers and the range of a corresponding tracking system or systems.

In the embodiment of FIG. 4A, multiple tracking systems are integrated in the system 400 such that the hands of the user may be tracked on five sides 410A (i.e., front, back, left, right, and top). Operational hardware for the tracking systems—in a preferred embodiment—is located within the polyhedral design of the cube (i.e., inside "the box") to allow for wired buses and optimal bandwidth connections. Actual imaging devices may extend outward from the cube-design (i.e., break the plane of any side of the cube) or be placed amongst a variety of transducers such that the sides of the cube maintain an overall flat appearance. Other system hardware may likewise be included within the cube form-factor, including but not limited to drivers and processing system.

In an alternative embodiment, however, certain hardware may be located outside and physically distinct from the actual cube. That hardware may communicate with the system by way of a wired connection through the "bottom" of the cube. Communications may also be facilitated through one or more wireless modes of communication such as Bluetooth or IEEE 802.xx. Whether certain hardware is located internal to or outside the cube form may be a factor of the actual physical size constraints of the cube and bandwidth requirements for various graphic processing and ultrasound driving componentry.

Regardless of the actual locale of certain hardware, the system 400 as illustrated in FIG. 4A provides tactile sensation in combination with a variety of visuals as may be provided by an immersive computing system. That system may similarly be internal to or external to the cube form factor either in whole or in part. While described with respect to five sides, embodiments may utilize less than all five exposed surfaces. For example, only the left and right sides or front and back sides may be used. Alternatively, an embodiment may make use of only the sides and top, front and back and top, or any combination of the foregoing. Such combinations allow for more natural "hands facing in" interactions when system 400 is placed on a surface whereby the hands of a user are proximate the left and right side of the cube with the hands facing the cube.

The system 400 of FIG. 4A may also include a modular feature where ultrasound array panels on any side 410A may be removed and repositioned on the form factor of FIG. 4A or those similar in concept. For example, a front side ultrasound array may be removed and moved to a backside of the cube while a non-ultrasound panel that previously occupied the backside is moved to the front. Such a feature would allow for production and commercialization of a "base" model with potential upgrades of additional panels, arrays, driver, and the like depending on demands or improvements in immersive computing and/or graphics processing technologies.

Figure 4B:
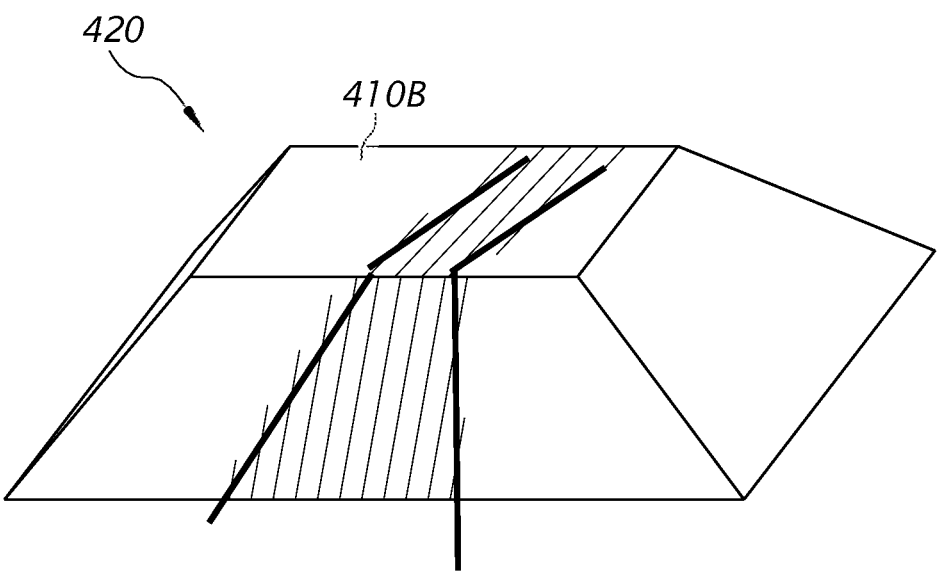
FIG. 4B illustrates an ultrasound system for providing tactile mid-air haptic feedback where the system is a truncated pyramid, according to exemplary embodiments of the present invention.

FIG. 4B illustrates a polyhedral ultrasound system 420 for providing tactile mid-air haptic feedback where the system is a truncated pyramid. Like the cuboid embodiment of FIG. 4A, the embodiment shown in FIG. 4B includes five flat panel systems (like system 100 of FIG. 1A) but arranged in a truncated pyramidal configuration instead of that of a cube. Such a form factor allows the user to experience tactile sensations and interact with system 420 from multiple angles while simultaneously maintaining a low profile for ease of use. While illustrated here as a truncated pyramid, other designs, including but not limited to an actual pyramid, may be used.

The embodiment of system 420 as shown in FIG. 4B, includes multiple integrated tracking systems. Integration of such trackers into the system 420 may be similar to those discussed in the context of the cuboid configuration of FIG. 4A, including but not limited to positioning of related hardware. Integration of tracking devices in such a manner allows hands of the user to be tracked on any or all of the five sides 410B (i.e., front, back, left, right, and top). The system 420 may then provide tactile sensation in combination with a variety of visuals as may be provided by an immersive computing system, which may be proximate or remote to the system 420 in a manner like that addressed with respect to FIG. 4A. Also similar to FIG. 4A is the fact that embodiments may utilize less than all five exposed surfaces, for example only the sides, only the front and back, sides and top, front and back and top, or any combination of the foregoing. Modular configurations are also envisioned in the context of the form factor of FIG. 4B.

Figure 4C:
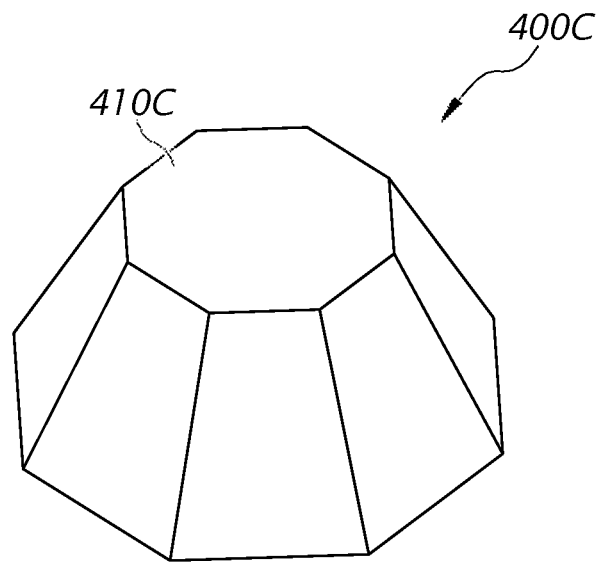
FIGS. 4C and 4D illustrate an ultrasound system for providing tactile mid-air haptic feedback where the system is a truncated polyhedron, according to exemplary embodiments of the present invention.
Figure 4D:
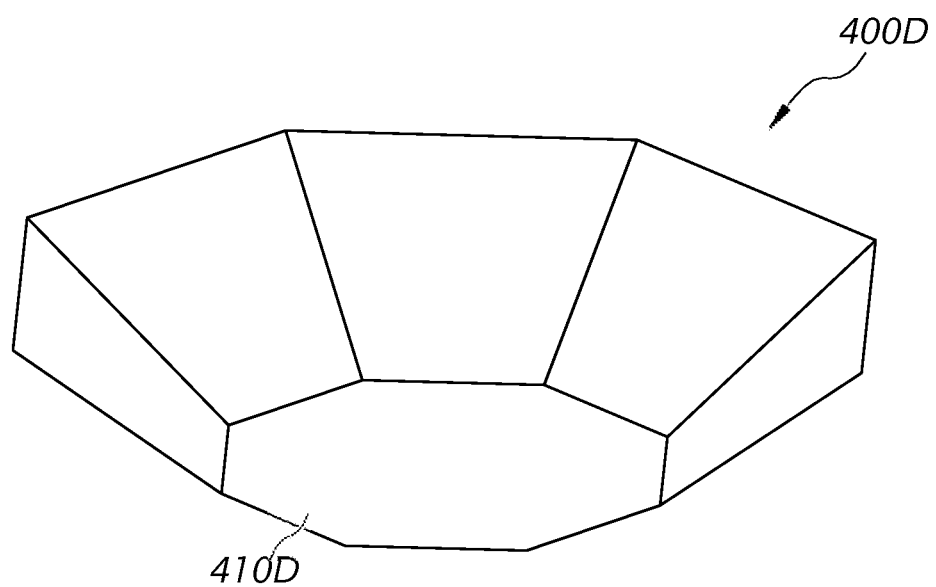

In some embodiments, the ultrasound system maybe a truncated polyhedron 400C, as illustrated in FIG. 4C, or an upside-down truncated polyhedron 400D, as illustrated in FIG. 4D. As described above, the truncated polyhedrons 400C and 400D may have multiple sides 410C and 410D, respectively, that may to a large extent have the same features as described for system 420 in FIG. B.

Figure 4E:
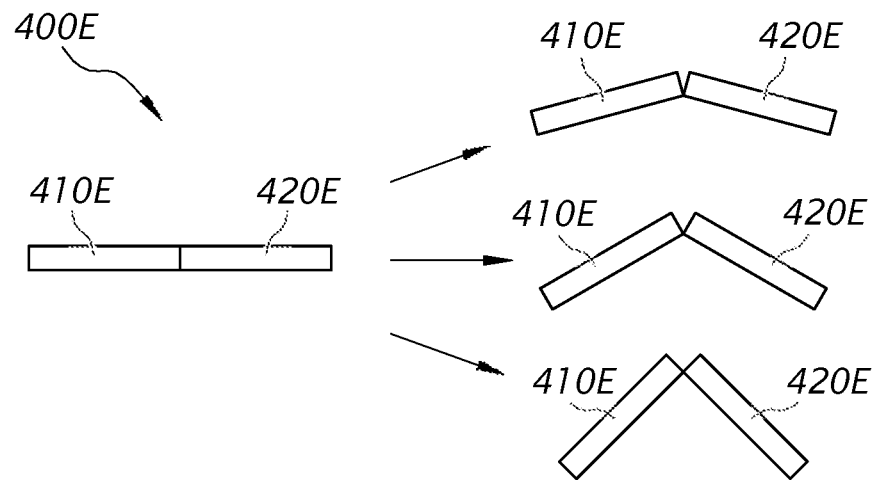
FIGS. 4E and 4F illustrate ultrasound systems for providing tactile mid-air haptic feedback where the system is a snap system, according to exemplary embodiments of the present invention.
Figure 4F:
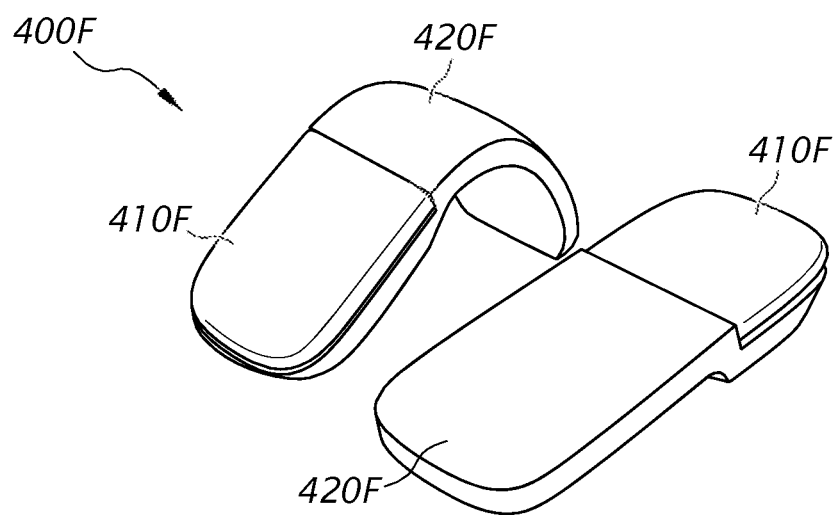
Figure 4G:
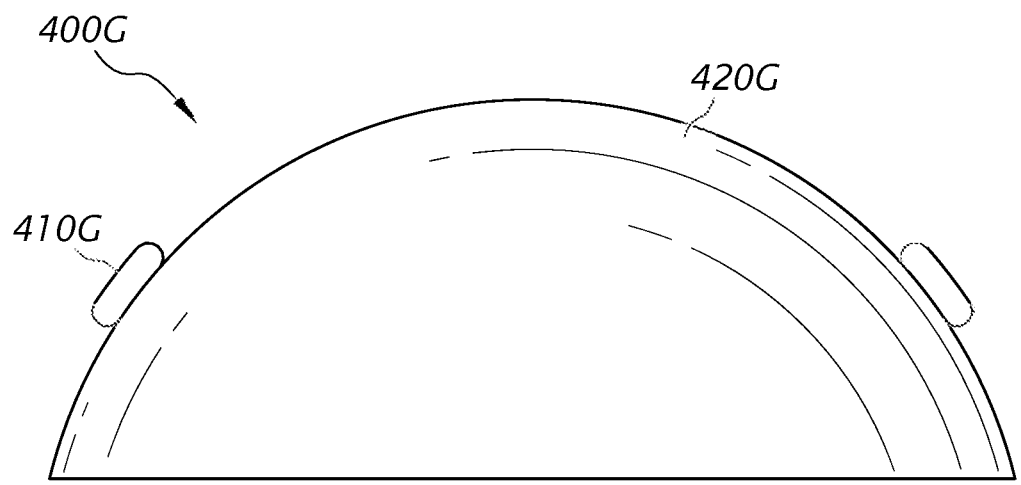
FIG. 4G illustrates an ultrasound system for providing tactile mid-air haptic feedback where the system is at least partially spherical, according to exemplary embodiments of the present invention.

As illustrated in FIG. 4E, the ultrasound system 400E for providing tactile mid-air haptic feedback system is based on a "snap" system. This system 400E may provide for higher ranges of interaction than the ones described above. Further, in some embodiments, system 400E, when placed on a desk, facilitates interactions when the users' arms and/or other body parts are relaxed. The system 400E may have at least two flat-panel systems 410E and 420E that may interact with each other as illustrated in FIG. 4E. In some embodiments, the panel systems may be on all sides of the two "snap" systems. The flat panel systems 410E and 420E may be capable of pivoting 360 degrees relative to each other. In some embodiments, the flat panel systems 410E and 420E may be capable of "snapping" together in place at several locations within the 360-degrees pivot (180 degrees, 30 degrees, 45 degrees, etc.), using any mechanisms that facilitates the "snap," such as a longitudinal, diagonal, non-linear hinge(s), snaps, adhesives, etc. In some embodiments, the panel systems 410E and 420E may be curved or partially curved. In some embodiments, as illustrated in FIG. 4F, the system 400F may have at least one curved panel system 420F and at least one flat panel system 420F.

FIG. 4G illustrates an ultrasound system 400G for providing tactile mid-air haptic feedback that is at least partially spherical such as a semi-sphere. An ultrasound system 400G like that of FIG. 4G utilizes a curved ultrasound array like the system 200 of FIG. 2A. The spherical or "dome" design of FIG. 4G allows the user to feel tactile sensation and interact with the system 400G from multiple angles with more fluid interactive ability than that offered by a polyhedral design such as those illustrated in FIGS. 4A and 4B.

The ultrasound system 400G as illustrated in FIG. 4G utilizes two-hand tracking devices 410G. While two such devices are illustrated, it is possible for such an embodiment to be configured with one or a series of such hand tracking devices. While FIG. 4G illustrates tracking devices 410G as being integrated into the ultrasound system 400G, an alternative embodiment may involve the placement of the tracking devices proximate the system. For example, tracking devices 410G may be located on a table or workstation that hosts the ultrasound system 400G. Tracking devices 410G could alternatively be located in a wall installation proximate the system 400G or located above the system 400G in a ceiling installation. Other system hardware may be located internal or external the system 400G as was discussed in the context of the embodiments of FIGS. 4A and 4B. Further, such multi-hand tracking systems with one or more tracking devices may be used for any embodiments described herein and not just for the ultrasound system 400G as illustrated in FIG. 4G.

Figure 4H:
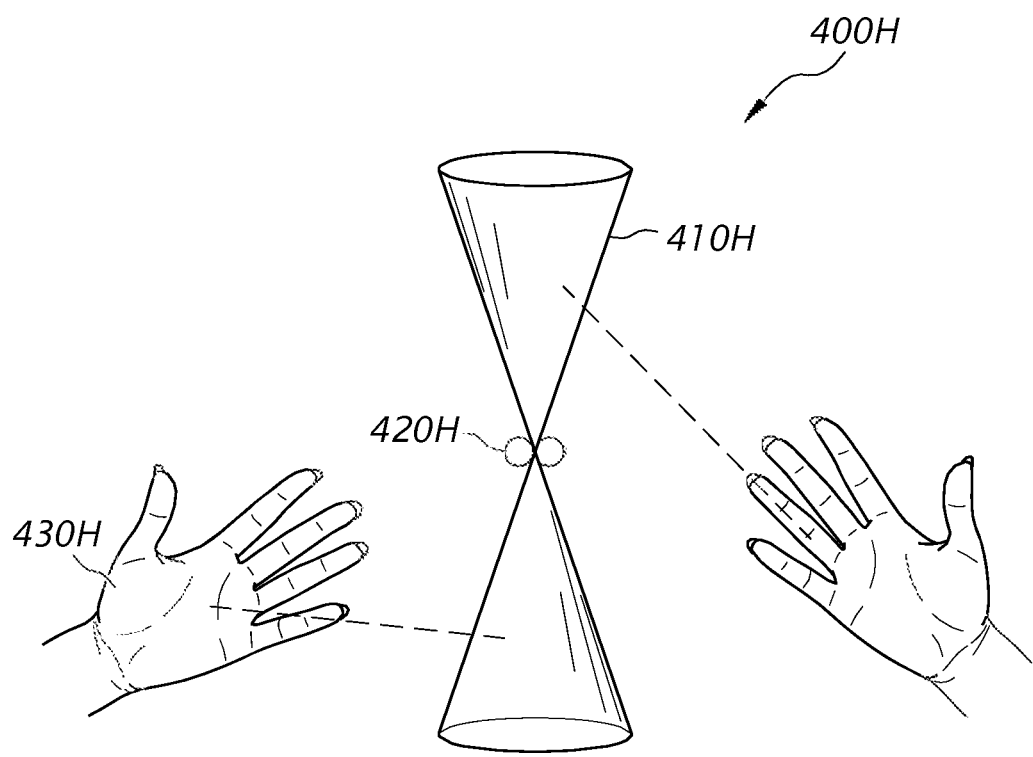
FIG. 4H illustrates an ultrasound system for providing tactile mid-air haptic feedback where the system is at least partially conical, according to exemplary embodiments of the present invention.

FIG. 4H illustrates an ultrasound system 400H for providing tactile mid-air haptic feedback that is at least partially conical. The embodiment of FIG. 4H includes two curved-panel systems 410H (like that of FIG. 2A) and arranged in an hour-glass form factor. Such a form-factor allows a user to feel tactile sensations from both palms in a face-up as well as a face-down placement. The ultrasound system 400H as illustrated in FIG. 4H includes two hand 430H tracking devices 420H integrated into the ultrasound system 400H. While illustrated with two such devices, as noted elsewhere in this disclosure, embodiments may include but a single hand tracking device or a series of the same. An alternative embodiment may involve placement of the tracking devices proximate the system 400H. For example, tracking devices 420H may be located on a table or workstation that hosts the ultrasound system 400H. Tracking devices 420H could alternatively be located in a wall installation proximate the system 400H or located above the system 400H in a ceiling installation. Additional tracking devices, as noted earlier, may also be implemented beyond the two illustrated in FIG. 4H. Other system hardware may be located internal or external the system 400H.

Figure 4I:
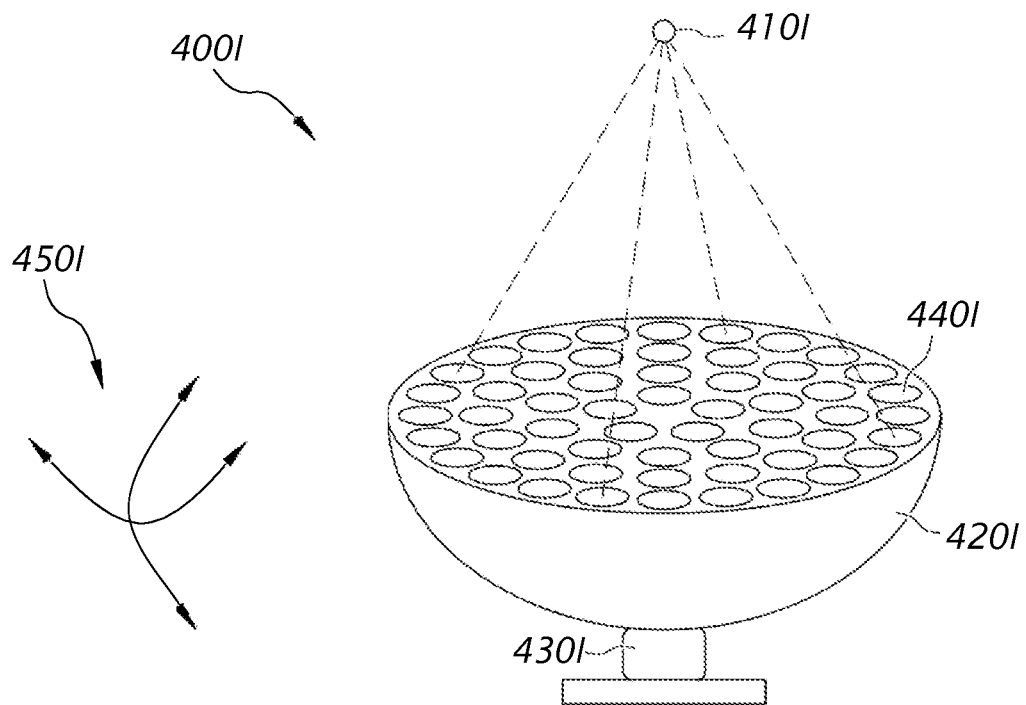
FIG. 4I illustrates an ultrasound system for providing tactile mid-air haptic feedback where the system is a movable bowl-like array, according to exemplary embodiments of the present invention.

FIG. 4I illustrates an ultrasound system 400I for providing tactile mid-air haptic feedback where the system resembles a moveable bowl board 420I. The goal of the system 400I is to reduce number of channels in the circuit boards, and to increase focus and pressure. In this embodiment, transducers 440I are arranged on the inside of a bowl board 420I. Rings of transducers 440I are connected together such that they receive signals from drivers with the same amplitude and phase. Such a multi-array ring concept can be applied to other form factors, such as a flat array. Because of this, the number of channels on the board 420I are reduced. Together, they are able to only form a single focal point fixed position 410I in a three-dimensional space. The distance of the focal position from the system can be controlled by the phase and amplitude signals to each ring of transducers. In some embodiments, the focal beam may be steered mechanically, manually, or through a mechanical gimbal motor 430I.

Figure 4J:
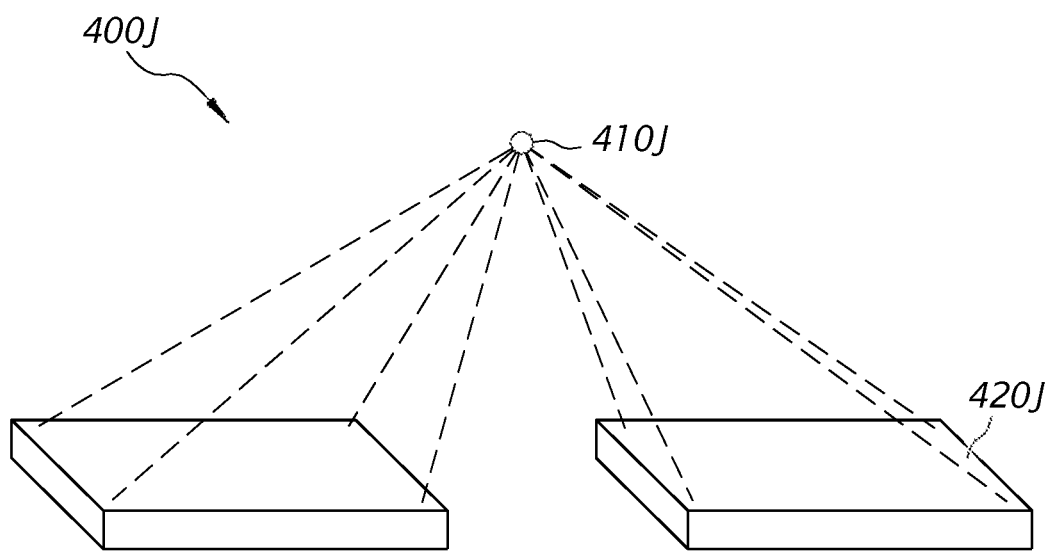
FIG. 4J illustrates an ultrasound system for providing tactile mid-air haptic feedback where the system comprises multiple arrays, according to exemplary embodiments of the present invention.

FIG. 4J illustrates an ultrasound system 400J for providing tactile mid-air haptic feedback where the system has multiple arrays 420J. The multiple arrays 420J may be the same in size, shape, and properties and/or may be different. The one or more arrays 420J may be located at different locations, such as different areas of the desk. The one or more arrays 420J may be synchronized in front of the user. The one or more arrays 420J may work independently or combined when put close or together. The one or more arrays may interact in any manner with one another, sync, and act synergistically. The one or more arrays may exhibit multiple beams that may exist independently. In some embodiments, the beams may be combined in one focal point. The combination can be done asynchronously, such that each module or array has independent phasing (emissions of each module is not synchronized). The modules or arrays (or parts of a single array) may produce a combined focus beam (i.e., phase synchronized arrays acting as one array) or independent beams. The independent beams may be used in different ways to optimize haptic sensation described herein. In some embodiments, the independent beams may have independent position and timing (movement rates).

For multi-array ultrasound systems to work, the relative positions and orientations (e.g., tilt or rotation) of the arrays must be known. Currently, the position and orientation of the arrays are measured manually. While the positions and orientations of the arrays can be measured manually in various embodiments described herein, an automatic measurement method may be more accurate and may allow for dynamic positioning of the arrays outside the factory. For such automatic measurement methods, three or more ultrasound transmitters may be placed above two or more arrays. The transducers may be held above the arrays using mechanical apparatuses such as posts, clamps and supports, machined parts or other suitable mechanisms, such as magnet, hooks, snaps, etc. In some embodiments, the holding system should not have components between the transmitter and array as to impede signal transmission. The relative position of the transmitters may be known by measurement or design of the holding apparatus. The arrays may be equipped with one or more ultrasound detectors spatially separated on the array. The transmitters are positioned above the array such that ultrasound signals from the transmitters can be received by the detectors. The location of the detectors on each array may be known and determined by measurement or device design similar to how the positions of ultrasound transducers on array used for haptics based on device design is determined. The relative positions of the transmitters may be arbitrary, but greater separation between transmitters while maintaining adequate signal propagation to the detecting transducers (e.g., not long (<100 cm), and not too strongly angled) may improve accuracy of this method. One of the ultrasound transmitters may emit a signal, for example a pulse. The emission time of such an emitted pulse may also be known. The ultrasound detectors may receive the emitted signal. The emission and detection process may be repeated for the other transmitters. Based on the time of flight of the pulses, speed of sound, and the positions of the detectors, the position and orientation of the ultrasound arrays may be computed since the path lengths from each transmitter to each detector may be known. A standard acquisition system (e.g., digital scope) and electronic waveform generator may be used to perform the measurements. The waveform generator is commutatively coupled using any method described herein to the ultrasound transmitters and acquisition system. The ultrasound pulse emitted by the transmitters may be created by an electronic signal produced by the waveform generator. The acquisition system may record the emission time. The acquisition system is also commutatively coupled to the ultrasound detectors and may record the pulse arrival time. The acquisition system, waveform generator, or both may be embedded in the ultrasound haptic system. Using the recorded emission times and detection times, the transmitter to detector path lengths may be calculated using propagation times and speed of sound. For example, the 3D location of each detector may be determined using well known triangulation methods applied to time of flight measurements from the three (or more) transmitters. Since each array position and orientation is known relative the transmitter set location, each array position is known with respect to other arrays. For example, three or more detectors on each array receiving signals from three or more transmitters may provide the position and orientation of each array. Measurement of the 3D location of each detector on an array fully defines the array plane (i.e., the mathematical plane containing the ultrasound array) orientation and position. More detectors and/or transmitters may improve the accuracy of the method. Fewer detectors may be used for cases when position and orientation of arrays are restricted. For example, if orientation measurement is not needed (e.g., each array is on same flat table), a single detector on each array may be sufficient to determine position. This method may also be done using other signals such as IR light or Radar (GHz radiation).

Alternatively, the arrays can be synchronized that control the relative timing of the emissions from each module. Beams from each array can also be operated cooperatively in multiple ways: 1) Beams create different parts of the same object (i.e. one of the arrays 420J may generate the left side of a haptic sphere and the other array 420J may generate the right side of the haptic sphere. 2) Combined field of interaction or individual fields of interaction method: In this method, each array 420J can only operate/be optimized for individual field of interaction or can be optimized for a combined field of interaction. 3) Synchronous or asynchronous beam position updates methods: In this method, each array 420J can update their beam position (moving the focal point) in sync with the other array or not in sync. 4) Acoustic object transition schemes method: In this method, when transitioning from one acoustic object to another (for example, when a user puts down a virtual ball and picks up a panel), a multi array system may be able to provide a more fluid transition, each acting independently. For example, imagine two arrays operating at less than 100% capacity in normal interactions. As a user transitions from one object to another, the ultrasound system may use the remaining capacity to generate more points, or make more shapes, etc., in order to make the user's transition from one object to the other smoother. In some embodiments, the communication between the multiple arrays 420J may be using a wireless method (e.g., Bluetooth, Wifi, etc.) or a wired method (e.g., serial data connection). The arrays can be arbitrarily positioned and can be combined to achieve a variety of form factors described herein. In this embodiment, multiple users can interact with each other using one or more arrays 420J, respectively. Thus, this system 400J, in some embodiments, facilitates a multi-user, social experience, in which a person brings one of their own array 420J or system 400J to someone else's array or system, couples them together, and interacts with each other. The system may have a communication protocol to synchronize beams.

Figure 4K:
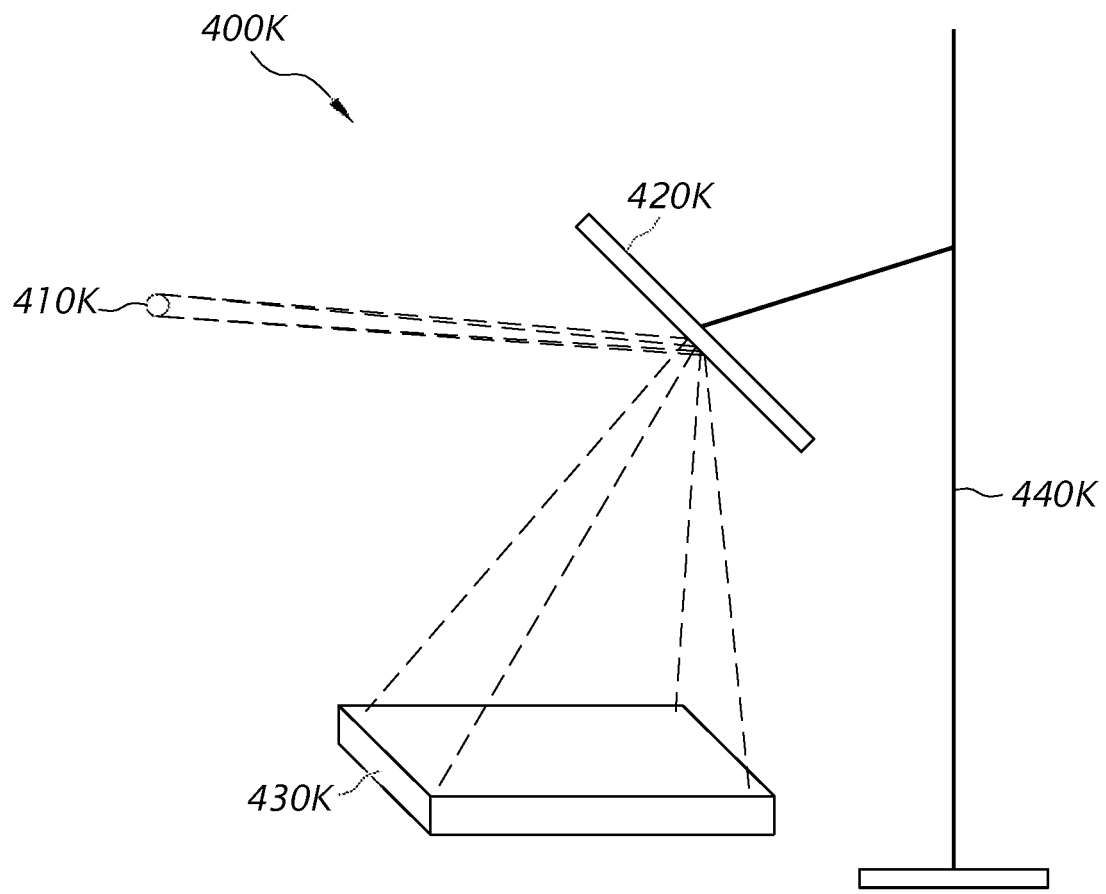
FIG. 4K illustrates an ultrasound system for providing tactile mid-air haptic feedback where the system comprises reflection panels, according to exemplary embodiments of the present invention.

FIG. 4K illustrates an ultrasound system 400K for providing tactile mid-air haptic feedback where the system comprises reflection panel 420K. The reflection panel 420K may be attached to a supporting structure 440K, such as a wall, beam, etc. The system 400K may have an array 430K that emits ultrasound beams. The ultrasound emissions from array 430K are then reflected or "bounced" off of the reflection panel 420K—arranged at any desired angle—in a way that the emissions are combined at a point 410K. The reflection panel 420K may be controlled in angle or position to vary location of focus point 410K. The control may be done using gimbals, motors, actuators or other similar means. The array 430K may be incorporated into any systems, such as head mounted displays, desks, chairs, ceilings, etc., described herein. In some embodiments, the system 400K may allow for "feelings" on both sides of a user's hands and allow for more angles of interaction. The arrays 400K can be of any kind described herein. In some embodiments, beams may even be reflected multiple times (like telescopes). The ultrasound system 400K may have a simple base array or any other arrays described herein. For example, the array 430K may have a fixed focus relying on the reflection system to move focus. Furthermore, the ultrasound system 400K may consist of multiple reflection panels 420K to direct ultrasonic emissions from ultrasound array 430K to multiple and different combination locations 410K. The ultrasound system 400K could be very simple in construction and have a low cost. For example, the ultrasound array 430K could be a single, large ultrasound transducer or an ultrasound array with all transducers electrically tied together. Furthermore, the array described herein, or in any other embodiments described herein, could be combined with other arrays described in other embodiments.

Figure 4L:
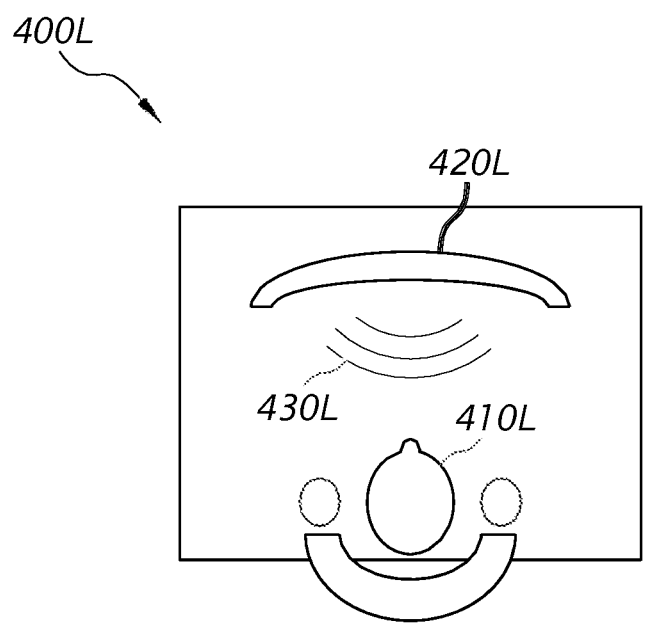
FIG. 4L illustrates an ultrasound system for providing tactile mid-air haptic feedback where the system is at least a partially semicircular panel, according to exemplary embodiments of the present invention.

FIG. 4L illustrates an ultrasound system 400L for providing tactile mid-air haptic feedback where the system comprises a curved array 420L. The curved array 420L may function as a screen that resembles a television, desktop monitor, etc. The curved panel 400L may be capable of being integrated into any systems, such as head mounted displays, desks, chairs, ceilings, etc., described herein.

Figure 5A:
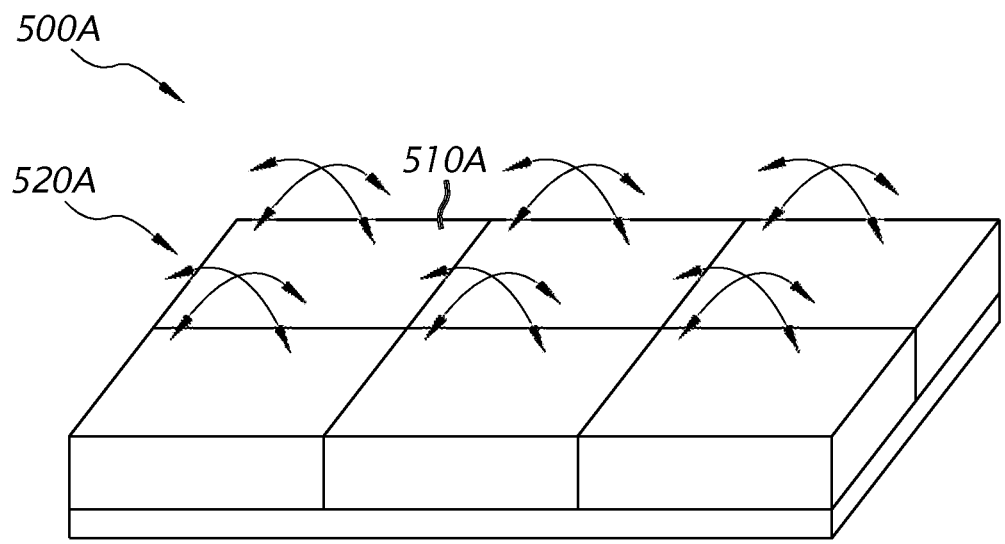
FIG. 5A illustrates a movable ultrasound system for providing tactile mid-air haptic feedback including moveable sub-arrays as well as individually moveable transducers coupled to a gimbal system according to exemplary embodiments of the present invention.

FIG. 5A illustrates a movable ultrasound apparatus 500A for providing tactile mid-air haptic feedback, which may include moveable sub-arrays as well as individually moveable transducers 510A coupled to a gimbal system and otherwise making up a flat panel ultrasound array. In an embodiment using individually moveable transducer arrays or sub-arrays as addressed herein, various synchronization techniques may be used including but not limited to those discussed earlier in the context of a multi-array ultrasound system. The ultrasound array of FIG. 5A may be otherwise collectively comparable to the flat-panel array of FIG. 1A but includes a series of individually moveable transducers 510A versus said transducers being fixed in the context of FIG. 1A. Each of the individually moveable transducers 510A may be coupled to a gimbal system and base. This coupling allows for multi-axis movement 520A by an individually paired gimbal and base operating in conjunction with each transducer. The transducers 510A may be all the same or different or some same and some different to each other.

Alternatively, a series of transducers may make up an individual panel of transducers (a sub-array) with a particular ultrasound array having a series of transducer panels. Instead of the array or individual transducers having a gimbal mechanism, the aforementioned panels of transducers may have a gimbal and base pairing. In both of these embodiments, specifically directed tactile feedback is possible such that tactile sensations are directed at various portions of the user body or specific areas thereof. Multiple tracking systems may be implemented in such an embodiment, including per panel or per transducer.

Figure 5B:
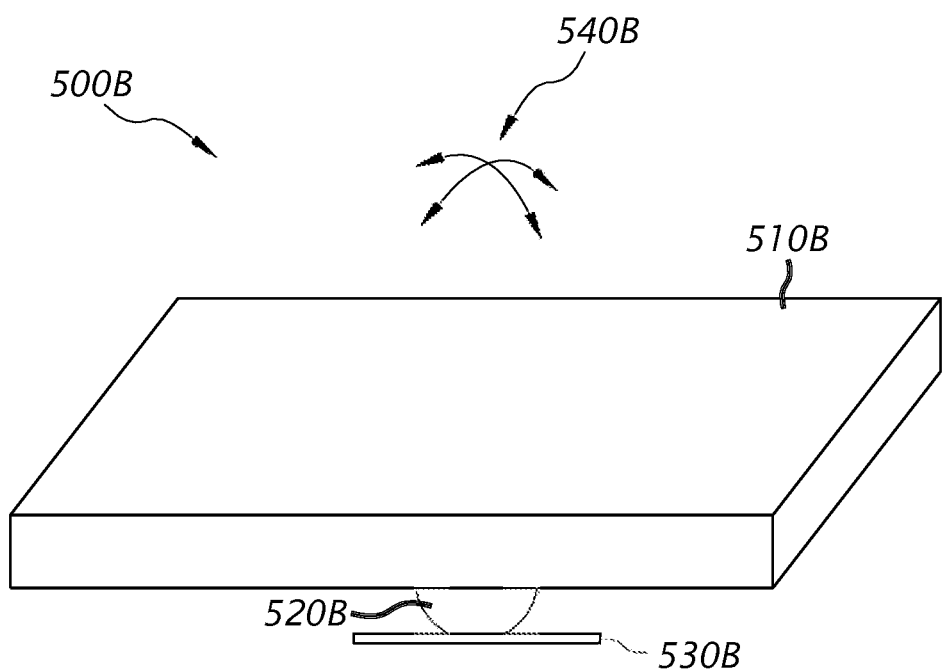
FIG. 5B illustrates a movable ultrasound system for providing tactile mid-air haptic feedback including a flat panel ultrasound system coupled to a gimbal array, according to exemplary embodiments of the present invention.

FIG. 5B illustrates a movable ultrasound apparatus 500B for providing tactile mid-air haptic feedback including a flat panel ultrasound system 510B coupled to a gimbal array. Flat-panel ultrasound system 510B may have similar features as described with respect to FIG. 1 (ultrasound system 100). Apparatus 500B of FIG. 5B further includes a motorized gimbal system 520B and base 530B that allows for multi-axis movement. Such multi-axis movement allows for a wider range of interaction and position control while maintain ultrasound panels more parallel to the hands of a user notwithstanding the natural angulation and movement of the hands of a user.

In an exemplary embodiment of gimbal system 520B, a set of three gimbals are presented—one mounted on the other with orthogonal pivot axes. Such a design allows system 500B to enjoy roll, pitch, and yaw control. The base 530B and mechanical componentry embodied therein control the gimbal system 520B such that a user might enjoy position control and six-degrees of freedom and vector control over the corresponding ultrasound panel 510B and the transducers therein. Gimbal system 520B may be integrated into an immersive computing system to further facilitate a virtual or augmented reality experience.

In some embodiments, the gimbal system 520B may allow for inertial dampening if the ultrasound apparatus 500B is being utilized in a physically unstable environment. For example, ultrasound apparatus 500B may be a part of a larger virtual or augmented reality environment. Such an environment may utilize rumbles or vibrations independent of engagement with a haptic interface (e.g., to simulate an earthquake or explosion). Inertial dampening through use of a gimbal system would allow for such effects to be provided without interfering with the haptic experience offered by system 500B.

An apparatus like that of FIG. 5B also allows for increased engagement with a more limited surface area or array of transducers. The apparatus may also simplify the complete ultrasound system as described above. Like the other form factors discussed throughout, such a system also allows for a wider realm of engagement, more points of interaction and sensation, and increased user comfort. An ultrasound system like that of FIG. 5B, in particular, may allow for a determination of an optimal angle for providing an increased or optimized ultrasonic sensation or series of sensations. By integrating such functionality into a moveable array, as the user or an appendage of the user moves, the array may also move such that the sensation remains constant through the engagement notwithstanding a change of position of the appendage in three-dimensional space. Through the use of gimbal system 520B, the apparatus 500B allows for increased tactile interaction with the hands of a user by moving relative to a user or a virtual object or a combination of the two. A hand tracking device like that of FIG. 1A (not shown) captures the hand position of a user and, in addition to providing driver instructions by way of a processing system, also influences control of the gimbal hardware such that it adjusts the angle of the ultrasound panel to remain perpendicular to the hands of the user.

Figure 5C:
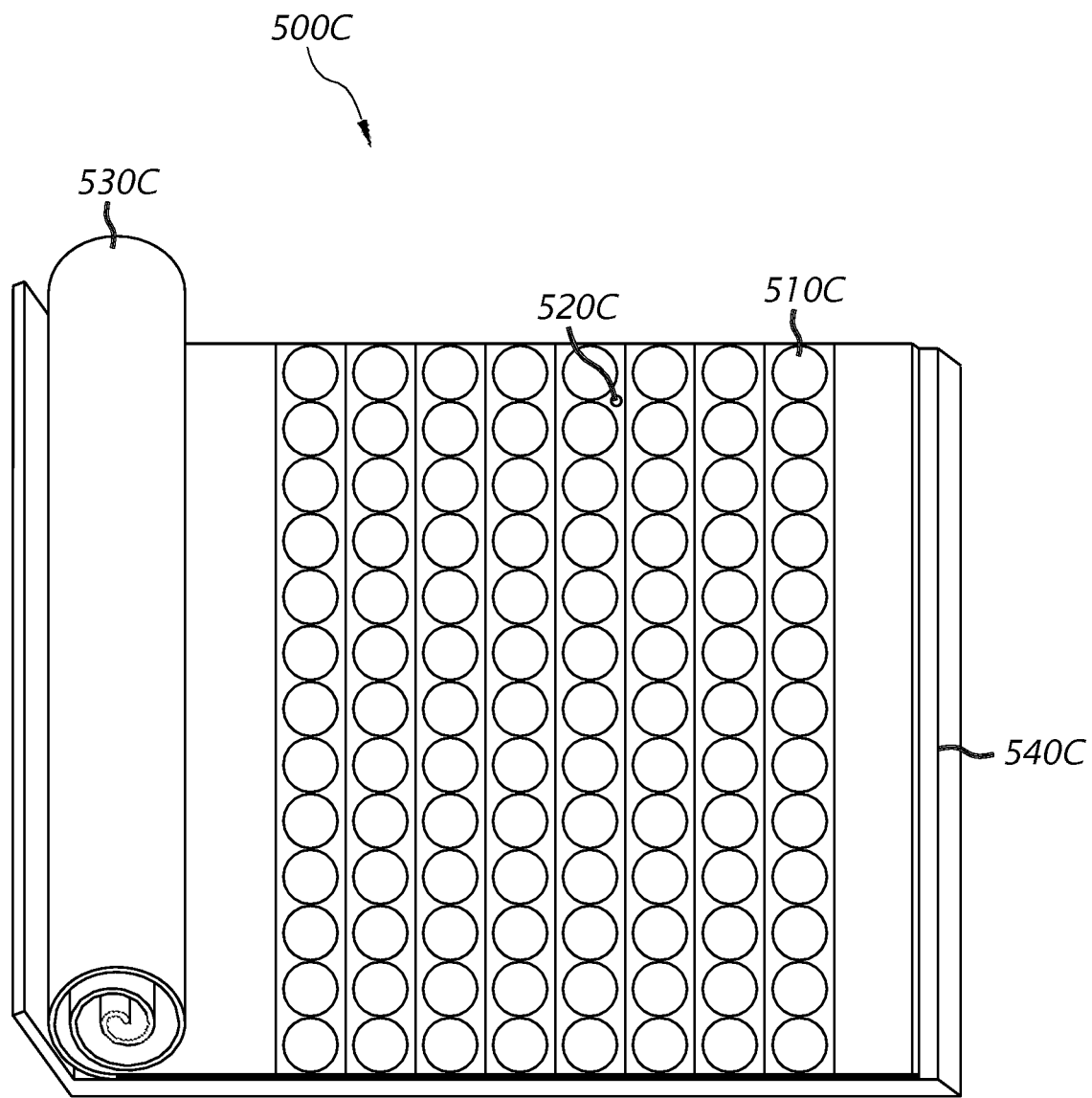
FIG. 5C illustrates a flexible ultrasound system for providing tactile mid-air haptic feedback, according to exemplary embodiments of the present invention.

FIG. 5C illustrates a flexible ultrasound system 500C for providing tactile mid-air haptic feedback. The ultrasound system 500C of FIG. 5C may use a segmented approach of the two-dimensional flat panel ultrasound system 100 as described in the context of FIG. 1A. The panels of ultrasound system 500C include of rows of transducers 510C with flexible material (any kinds of flexible material may be used) 510C interspersed there between. Integration of this material 520C between the rows of transducers 510C allows the system 500C to be rolled up as suggested by element 530C. The end of the flexible system 500 includes a magnetic or some other adhesive strip 540C (any kind of attaching mechanism that facilitates similar function may be used) that maintains the system 500C in a closed position when in a rolled configuration. The drivers (not shown) for each of the various transducers 510C may be manufactured from flexible electronics or flex circuits. The requisite driver circuitry may be mounted on a flexible plastic substrate such as polymide or transparent conductive polyester. Flex circuits may likewise be screen printed. Any other means of producing a flexible driver component, such as the use of flexible silicon may be employed.

For example, instead of the transducers being interconnected by way of flexible material, some embodiments of the present invention may find the transducers directly integrated into a particular flexible material such as those that might be found in a flexible printed circuit board. Such a design may enjoy the benefits of lower manufacturing cost, reduced procurement times, and increased performance by "tuning" the acoustic properties of a flexible matrix material thereby allowing for optimized ultrasonic operation. It is also possible to create a flexible ultrasound sheet through micro-machining a piezoelectric ultrasound transducer in a polyimide substrate. The transducer is made on the substrate and package with polydimethylsilozane. Instead of etching the PZT ceramic, diced PZT blocks are placed into holes on the polyimide, which is pre-etched. Various hardware elements may be further integrated or "plugged into" the flexible ultrasound system 500C of FIG. 5C including but not limited hand tracking devices, processing systems, and the aforementioned transducer drivers. Those connections may be wired or wireless in design. The ultrasound system 500C itself may then be integrated into an immersive computing system.

Figure 6B:
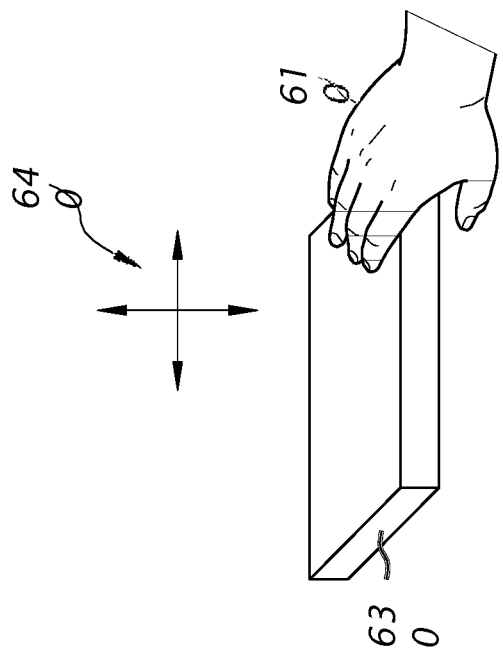
FIGS. 6A and 6B illustrate ultrasound apparatuses for providing tactile mid-air haptic feedback including a cover, according to exemplary embodiments of the present invention.
Figure 6A:
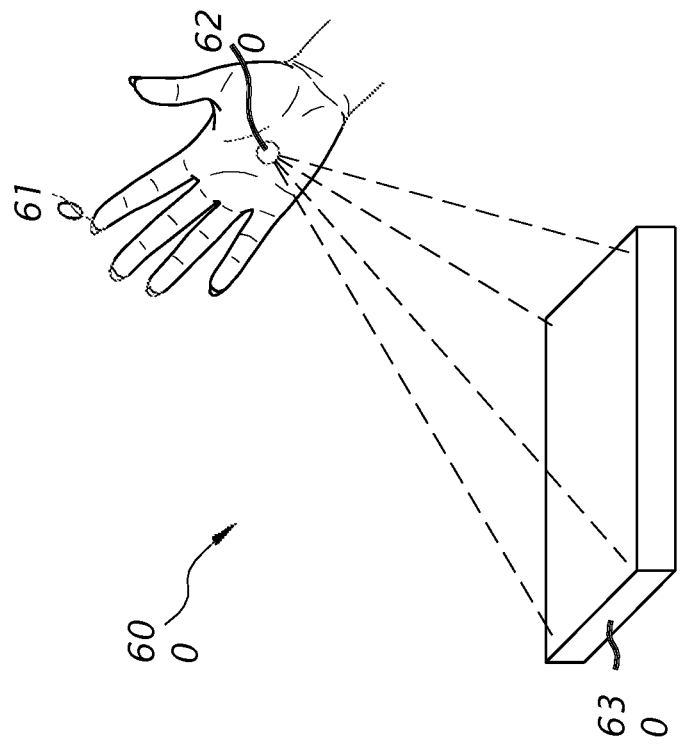

FIGS. 6A and 6B illustrate ultrasound systems 600 for providing tactile mid-air haptic feedback. The ultrasound array 630 may include a cover such that in some embodiments, the ultrasound array 630 may function as any array described herein so that it provides mid-air tactile haptic feedback on a user 610 at one or more focal points 620. In other embodiments, the cover may function as a touchpad so that a user 610 may use the array 630 like a mouse touchpad by moving the hand in any direction 640. In such cases, the user 610 may be able use to array 630 like a mouse in combination with various interfaces like a screen, for example, resembling a laptop.

Figure 7:
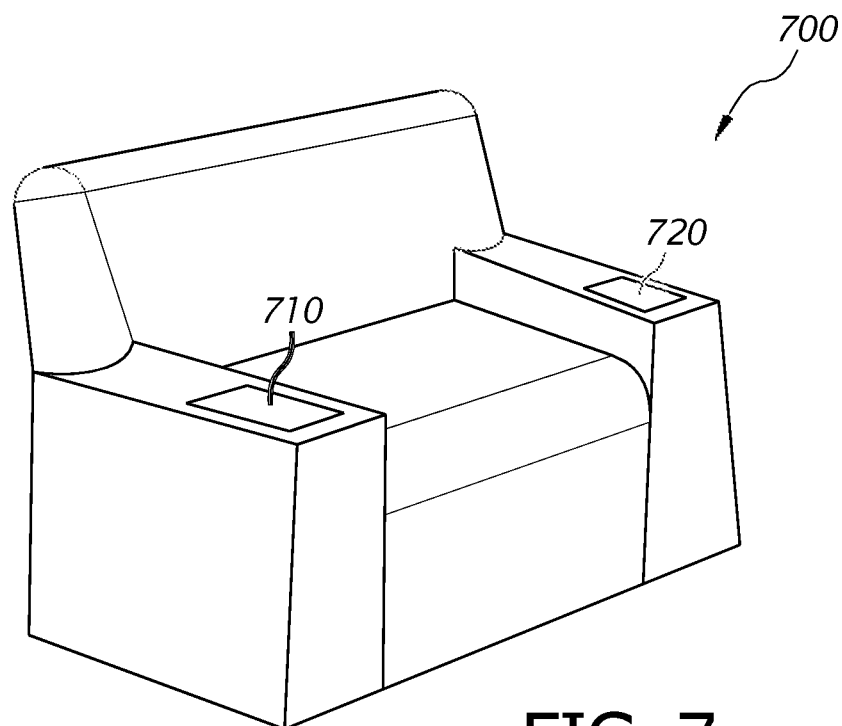
FIG. 7 illustrates a flat panel ultrasound system for providing tactile mid-air haptic feedback integrated into a chair, according to exemplary embodiments of the present invention.

FIG. 7 illustrates a form factor 700 whereby a flat-panel ultrasound system for providing tactile mid-air haptic feedback is integrated into an apparatus, such as a chair. The embodiment of FIG. 7 involves a flat-panel two-dimensional ultrasound system 100 like that disclosed in the context of FIG. 1A. Specifically, the chair embodiment 700 of FIG. 7 involves two such two-dimensional ultrasound panels—one installed in each arm of the chair—elements 710 and 720, respectively. An embodiment utilizing such a form factor allows for interactions and tactile sensation from a seated position. The positioning of ultrasound panels 710 and 720 at the ends of the arm rests allow the arms of a user to be at rest while the hands of the user are still engaged with the content generated by an immersive computing system. Synchronization techniques like those described above may be implemented to the extent such a synchronized experience is required in light of a part use claim or content engagement.

Figure 8:
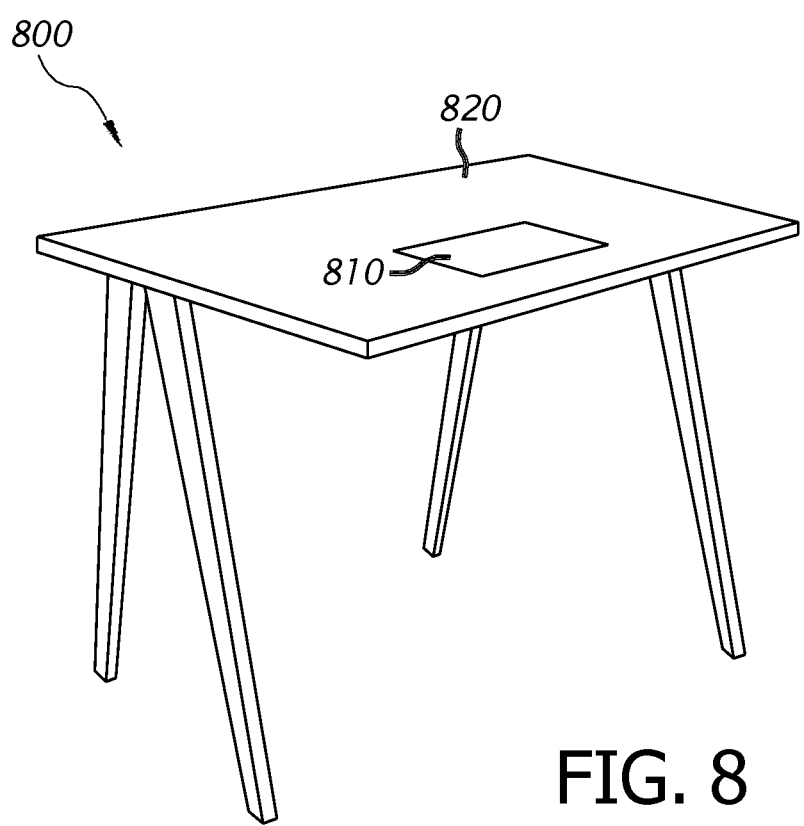
FIG. 8 illustrates a flat panel ultrasound system for providing tactile mid-air haptic feedback integrated into a table, according to exemplary embodiments of the present invention.

FIG. 8 illustrates a form factor 800 whereby a flat-panel ultrasound system for providing tactile mid-air haptic feedback is integrated into an apparatus, such as a table. The embodiment of FIG. 8 involves a flat panel two-dimensional ultrasound system, like that (100) disclosed in the context of FIG. 1A. Specifically, the table embodiment 800 of FIG. 8 involves a single panel 810 although a multitude of panels may be integrated directly into table 820 and allowing for interaction with content generated by an immersive computing system. For example, different panels may be associated with different generated objects or environments. An embodiment such as this allows for interaction and tactile sensation coupled with the productivity and working space of a desktop environment. Any other kind of apparatus may be integrated with the systems described herein as well. In some embodiments, the ultrasound system may be hidden within the apparatus. For example, the ultrasound system may be hidden under the table, much like a keypad tray under a desk, that a user may pull out whenever needed.

In some embodiments, the systems described herein can lend themselves to communication related interactions. For example, touch can create universal interactions for UX/UI, rather than gesture commands, which are only useful to limited number of "power users," like ctl+alt+delete. Good UI/UX hardware devices have a visual and a non-visual component. For example, an AR keyboard with feedback may include any systems described herein that identify movement of users' body parts, such as fingers, and based on that movement, provide haptic feedback in the same or different body parts according to specific actions. In such situations, as a non-limiting example, a user can see his or her keyboard but does not need to continuously look at it while typing or need to see the mouse when scrolling. Similarly, the systems described herein may allow users to interact with virtual objects, and in some cases, navigate an immersive space without looking at their hands, which can only be achieved via touch. Such interactions are described herein.

Figure 27:
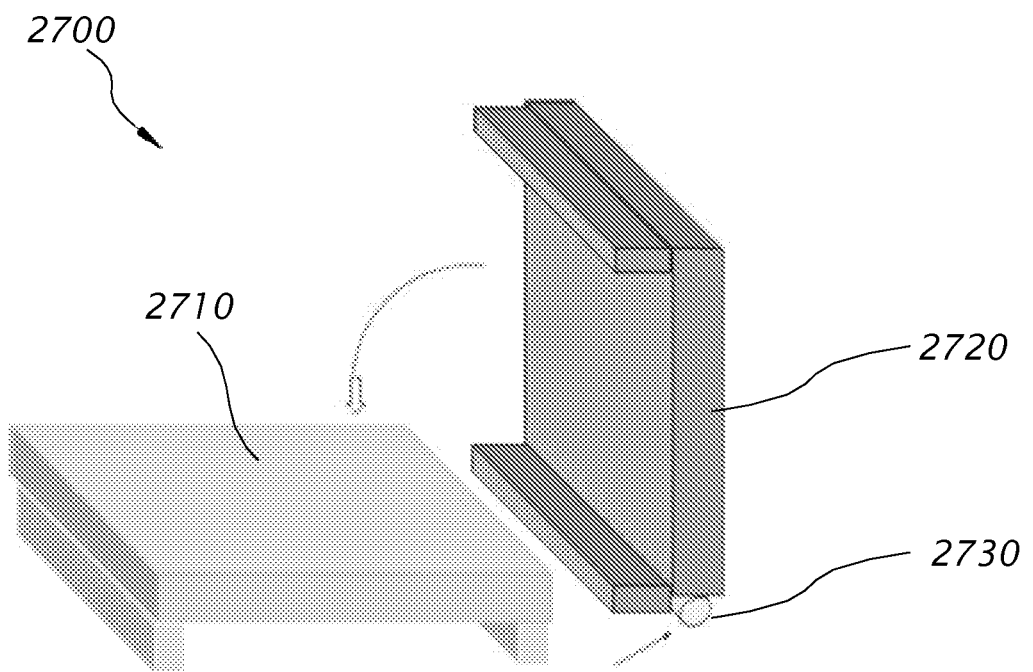
FIG. 27 illustrates an ultrasound system capable of multiple orientations, according to exemplary embodiments of the present invention.

In some embodiments, the user's arms may be at rest on the apparatus, such as a table or a chair (as described in FIGS. 7 and 8), but still be able to interact with the ultrasound system respectively. In some embodiments, the ultrasound system may not be flat, i.e., it may be of any other shape. For example, it may be a semicircular long panel that resembles a long half cylinder resting on table or any other apparatus with the ultrasound emitting curved surface facing up in order to provide an extended field of interaction. In some embodiments, the length of the cylinder may be roughly the user's shoulder width. However, the length may be variable based on need. In other embodiments, and as described herein, the ultrasound system may be an upside-down pyramid or have any other concave array shape. The upside-down pyramid ultrasound system may provide a stronger sensation in the region above the form factor compared to flat arrays or convex designs at the expense of reduced size of field of interaction. Ultrasound systems and/or the arrays housed therein may be capable of being oriented in any direction. For example, as illustrated in FIG. 27, an ultrasound system or the array contained therein 2700 may be capable of being oriented horizontally 2710 or vertically 2720. The ultrasound system or the array contained therein 2700 may be capable of functioning in all orientations. In other embodiments, some orientation arrangement may be primarily for non-functional aspects, such as effective storage, space saving, preventing any damages from spills, etc. The ultrasound system may have an orienting feature 2730, such as a hook, hinge, etc., that may facilitate the ultrasound system, or the array contained therein, 2700 to change its orientation.

Figure 9:
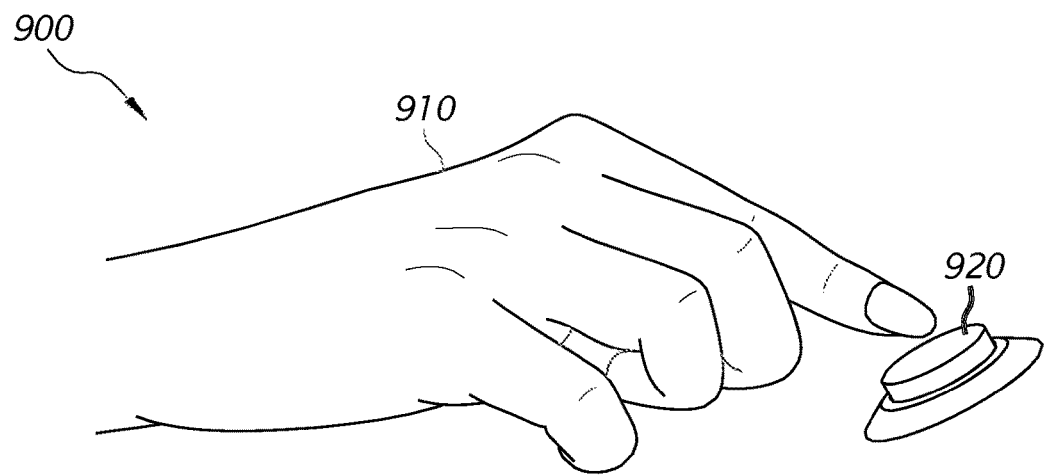
FIG. 9 illustrates an UI/UX gesture for selecting, according to exemplary embodiments of the present invention.
Figure 10:
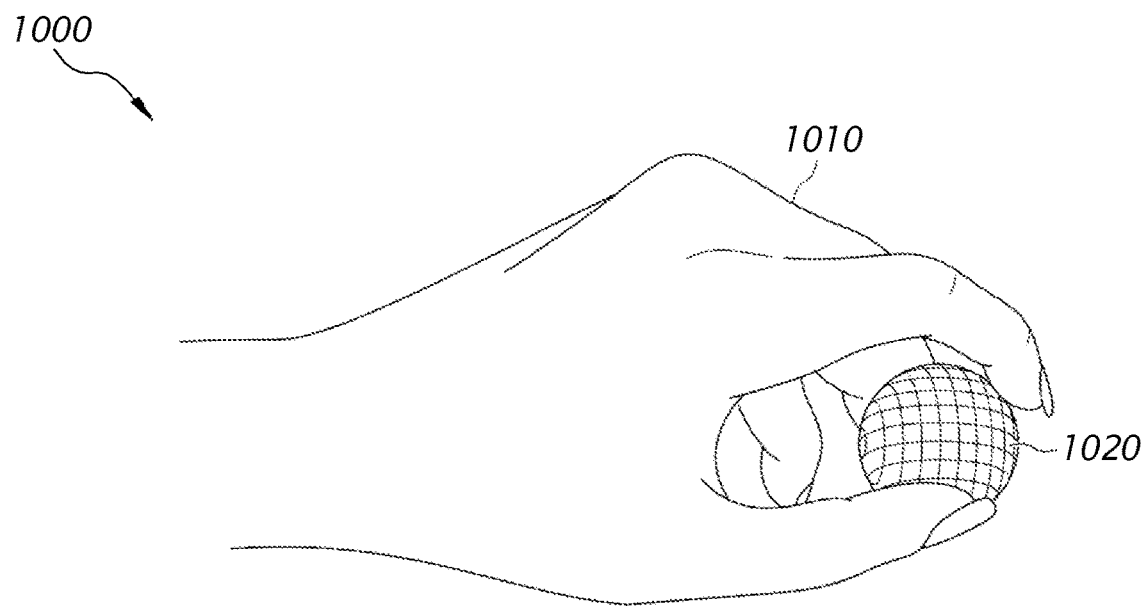
FIG. 10 illustrates an UI/UX gesture for navigating, according to exemplary embodiments of the present invention.
Figure 11A:
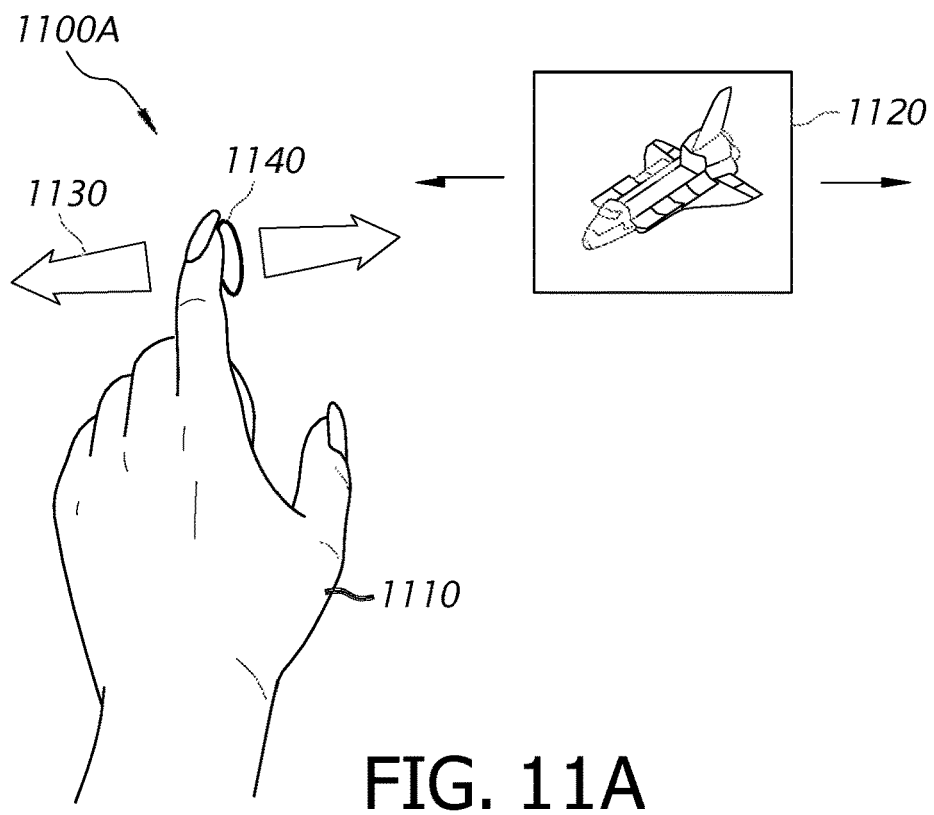
FIGS. 11A and 11B illustrate UI/UX gestures for swiping, according to exemplary embodiments of the present invention.
Figure 11B:
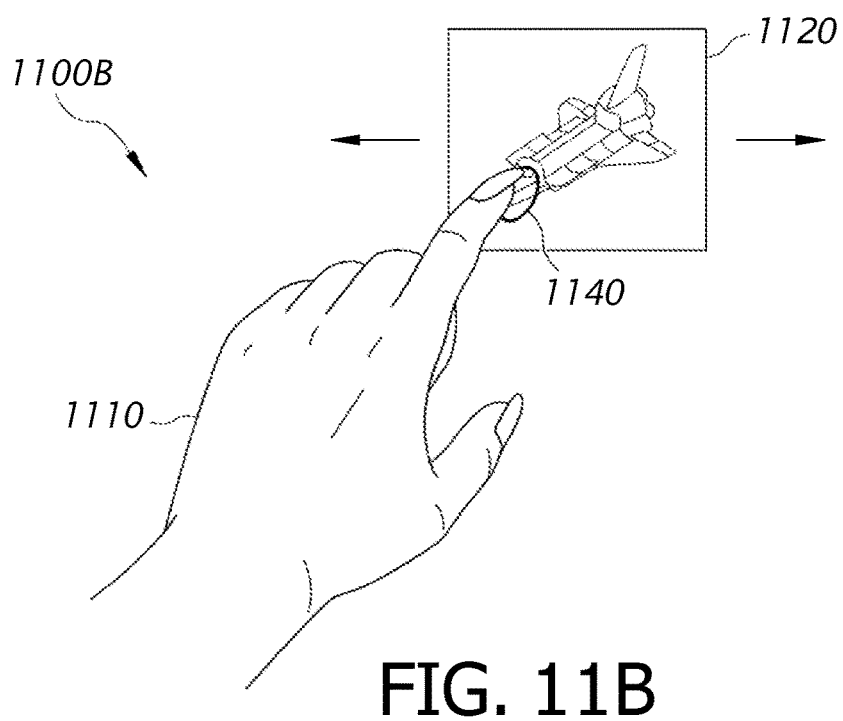
Figure 17:
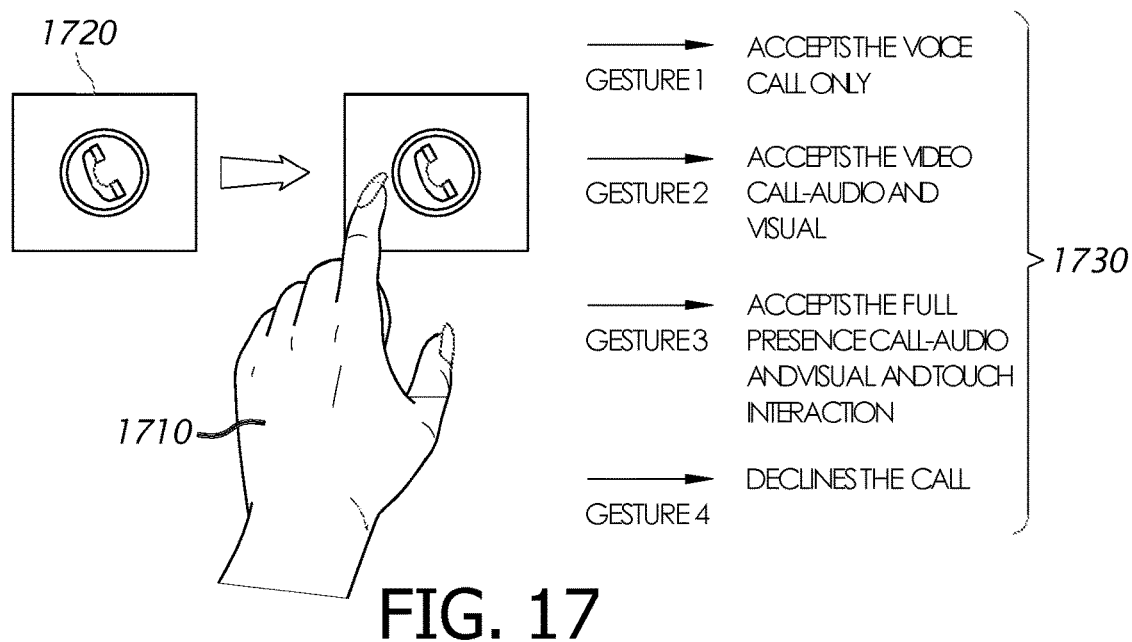
FIG. 17 illustrates an UI/UX system based on a swiping signaling system, according to exemplary embodiments of the present invention.

FIG. 9 illustrates a system 900 that shows how a user 910 may participate in a communication related interaction. The user 910 can tap on a virtual icon, button, or object 920 (feel a focal point) to trigger an action. FIG. 10. illustrates a system 1000 that shows how a user 1010 may participate in a communication related interaction. The user 1010 can use a small haptic ball (or any other shape) 1020, which functions similar to a trackball mouse, created by the ultrasound systems herein, as a "navigation tool." FIGS. 11A and 11B illustrate a system 1100 that shows how a user 1110 may participate in a communication-related interaction. The ultrasound systems described herein may create a "swiping pulse" 1140 that may allow user 1110 to swipe in any direction 1130. The user 1110 swiping in any direction may translate a similar response in a corresponding system. For example, the user 1110 may swipe left mid-air (as illustrated in FIG. 11A) or on an image itself (as illustrated in FIG. 11B) and the image on the displaying medium, such as in a AR headset, may swipe left as well. This approach may be applied to pick up or drop calls 1720 in a AR headset as well, as illustrated in FIG. 17. Depending on the way a user 1710 interacts with the AR headset, different outputs 1730 may be generated in the AR display. In other words, "permissions" are set depending on how a user accepts the virtual call. For example, swiping left, right, up, down, etc. may make the call a video call, hologram call, audio call, etc. In some embodiments, swiping in one direction may set forth a specific permission. For example, swiping left may generate a voice version of a call; swiping up may generate a video version of the same call; etc.

Figure 12A:
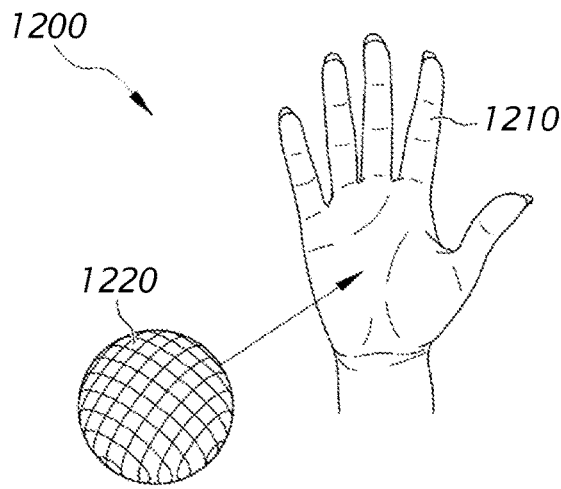
FIGS. 12A and 12B illustrate UI/UX gestures for summoning, according to exemplary embodiments of the present invention.
Figure 12B:
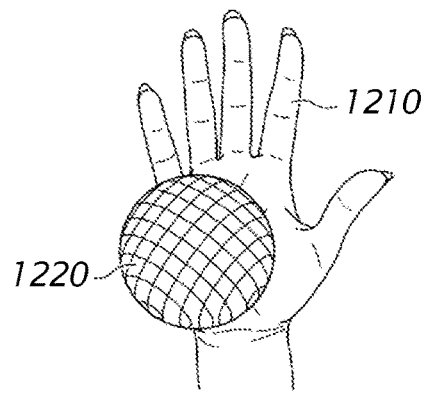
Figure 13A:
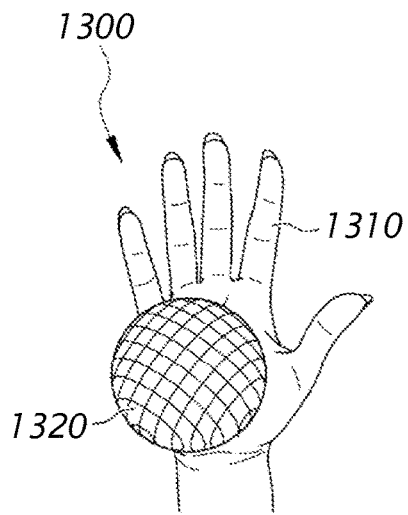
FIGS. 13A, 13B, and 13C illustrate UI/UX gestures for placing, according to exemplary embodiments of the present invention.
Figure 13C:
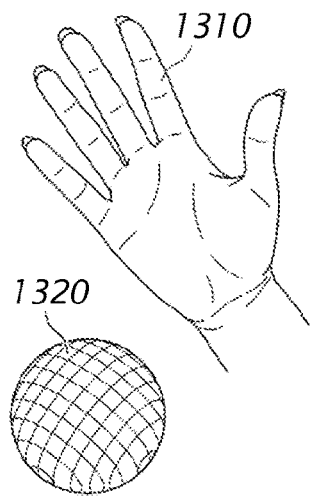
Figure 13B:
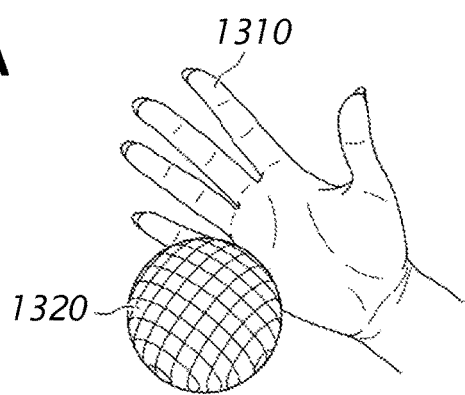

FIGS. 12A and 12B illustrate a system 1200 that shows how a user 1210 may participate in a communication related interaction. The system 1200 may allow for summoning of an object 1220 created by the ultrasound systems described herein based on the user's 1210 gesture. For example, in an embodiment, the user 1210 may extend all fingers (or display any other gesture through any other body part), and that gesture would then summon the object 1220 to the user's 1210 hands. In some embodiments, the object may stick to the user's hands and follow it around. In other embodiments, the user 1210 may be able to leave the object 1220 behind. For example, as illustrated in FIGS. 13A to 13B, a user 1310 may place the object 1320 at a certain location by indicating via a gesture that the user wants to "put down" the navigation ball at a certain location (similar to how a user positions a wireless keypad on a desk).

Figure 14A:
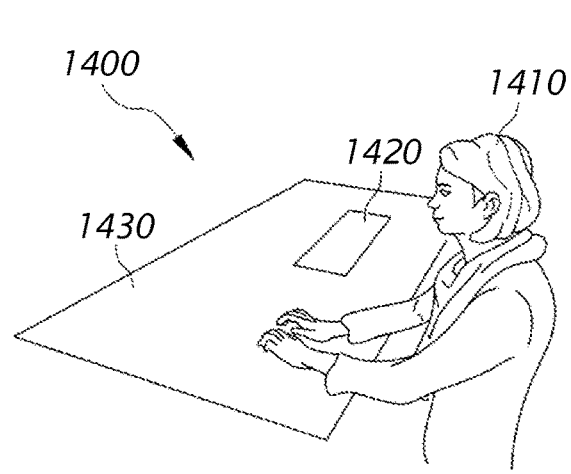
FIGS. 14A and 14B illustrate an UI/UX system based on active voice control, according to exemplary embodiments of the present invention.
Figure 14B:
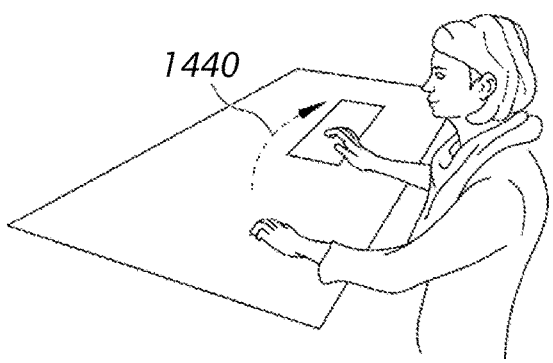
Figure 15A:
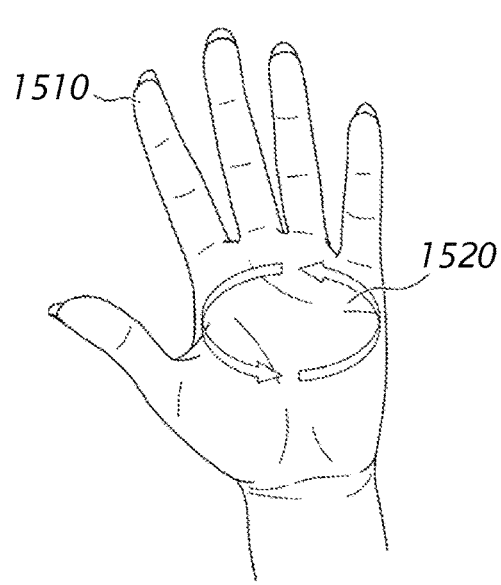
FIGS. 15A and 15B illustrate an UI/UX system based on a rotator signaling system, according to exemplary embodiments of the present invention.
Figure 15B:
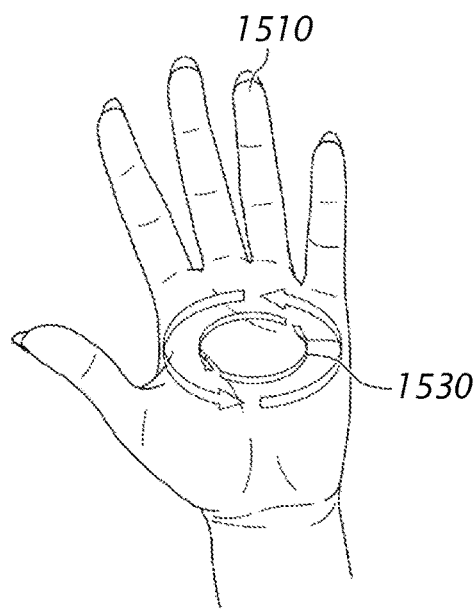

FIGS. 14A and 14B illustrate a system 1400 wherein a user 1410 interacts with an array 1420. In some embodiments, the system 1400 may function as a work desk. The user 1410 may not always want to see controls on his or her desk all the time, so he or she may want it to be invisible and then use a special gesture 1440 or a button to reveal it. So, in some embodiments, when the user 1410 exhibits the gesture 1440 of moving his or her hand towards a certain area on the desk, a virtual keyboard 1420 may appear. In some embodiments, the system 1400 may also have one or more storage that will memorize a map of the hidden buttons or controls such that when the user is near the buttons or controls and performs a specific gesture or executes a certain touch, the required hidden buttons or controls will be ready for the user to use. This indication may occur, for example, when the user 1410 moves a body part closer to the object, as illustrated in FIGS. 14A and 14B. The indication may be provided through a "sensation" generated by the ultrasound array 1420. For example, FIGS. 15A and 15B illustrate how the characteristics of an object may be communicated using acoustic signals. In some embodiments, for example, the rotator pattern 1520 may speed up or slow down on a user's body part, such as hand 1510, to convey a signal that an object is close or far or is changing its size.

Figure 16A:
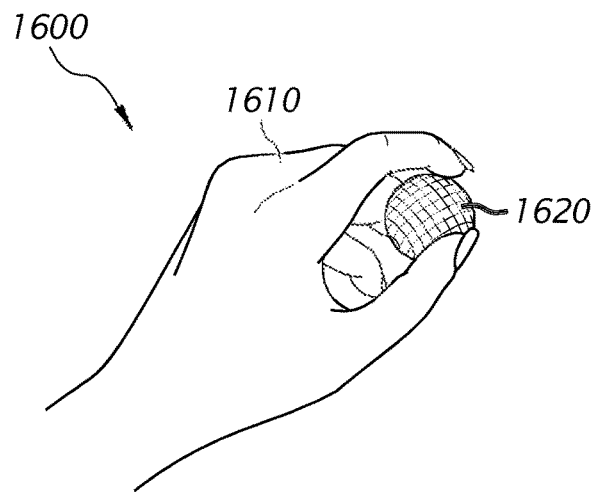
FIGS. 16A and 16B illustrate an UI/UX system based on a squeeze signaling system, according to exemplary embodiments of the present invention.
Figure 16B:
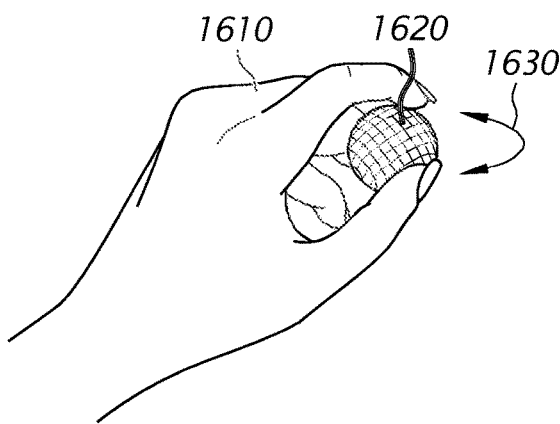

FIGS. 16A and 16B illustrate how a user 1610 may manipulate or interact with an object 1620. The user 1610, using any of the ultrasound systems described herein, may be able to interact with objects in any way that the user may interact with objects in the real world. For example, the user 1610 may be able to squeeze 1630 the object 1620. This may be possible by modulating the amplitude of beams generated by the arrays of the ultrasound systems. The user's 1610 interaction with the object 1620 may also facilitate some other response in another system.

Figure 18:
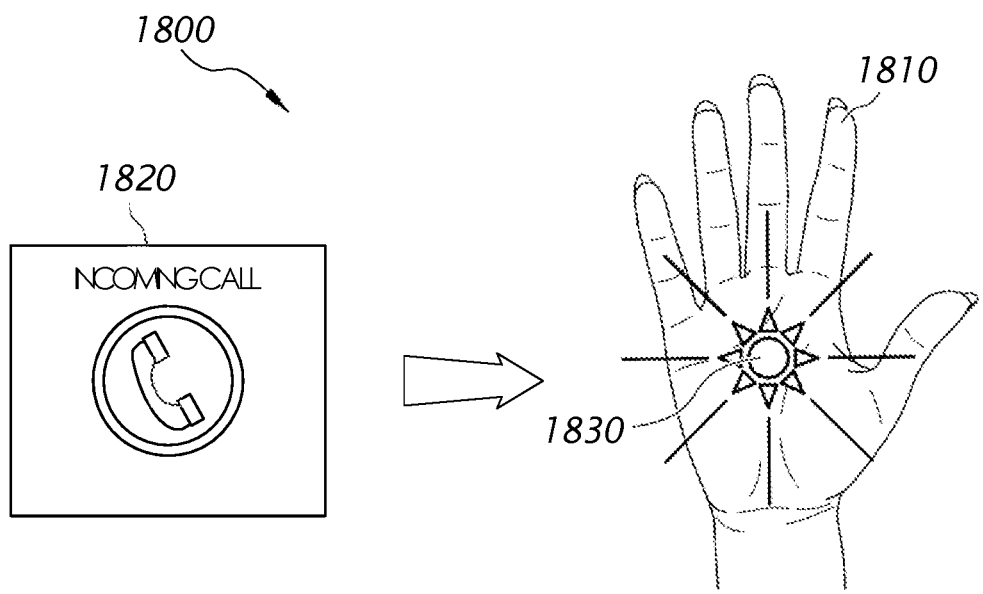
FIG. 18 illustrates an UI/UX system based on a feedback signaling system, according to exemplary embodiments of the present invention.
Figure 19:
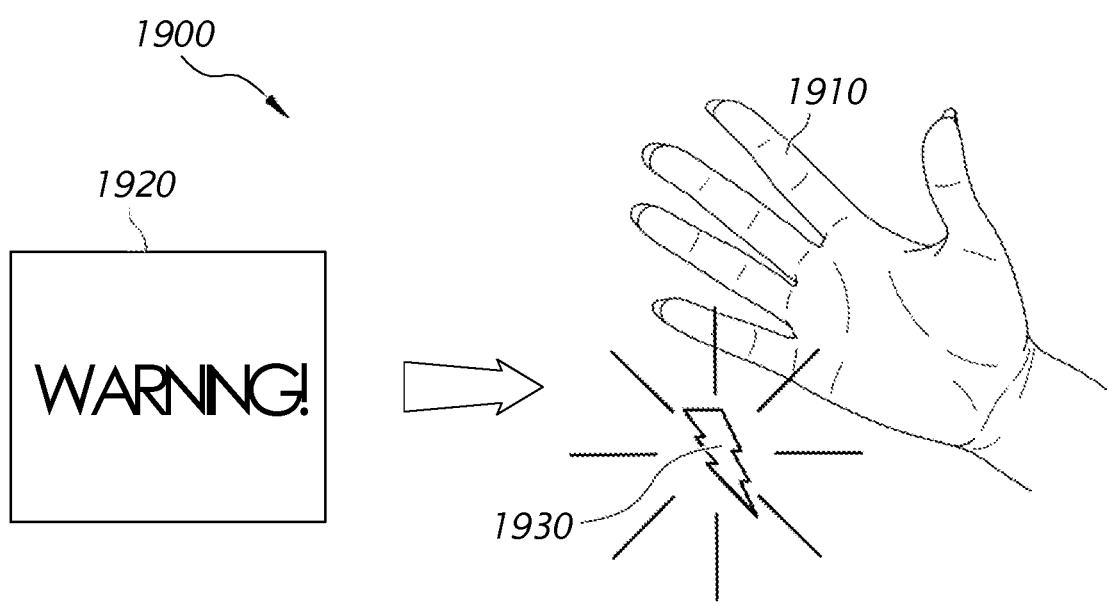
FIG. 19 illustrates an UI/UX system based on a feedback signaling system, according to exemplary embodiments of the present invention.

In some embodiments, as described in FIGS. 18 and 19, the ultrasound systems described herein may also create passive feedback. For example, if a user 1810 or 1910 receives a call 1820 or a warning 1920, such as someone is breaking into his or her house, an ultrasound array may create a signal 1830 or 1930 alerting the user of the same.

Home hub and smart speakers have drastically increased over the last years due to smart assistant software from companies like Google, Amazon, Apple, and others. Thus far these speakers have been limited to audible speaker technology, and more recently, 2-D screen technology. It was announced that Apple recently patented the ability to overlay AR content on top of their Apple HomePod.

In some embodiments, the ultrasound systems described herein may facilitate interactions with other systems, such as an artificial intelligence assistant in the immersive computing environment using haptic interaction. Any touch or gesture interactions described herein may allow the users to activate voice commands of these artificial intelligences. For example, with any of these touch or gesture interactions a user may turn on the artificial intelligence assistant. For example, a user may just use the touch or gesture interactions instead of saying, "Hey Siri," "Ok, Google," or "Alexa", which is disruptive, and exhausting to repeat if conveying multiple commands or using frequently. In other embodiments, a user may use touch or gesture interactions described herein to identify hidden controls.

Figure 20A:
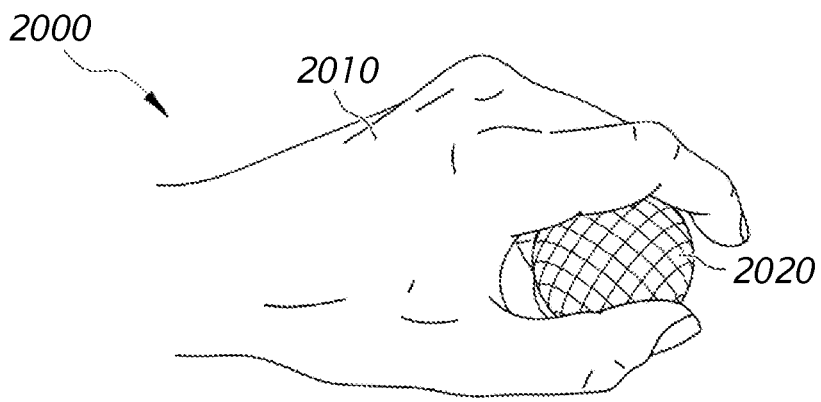
FIGS. 20A-20E illustrate an ultrasound system capable of a multi-user experience, according to exemplary embodiments of the present invention.
Figure 20B:
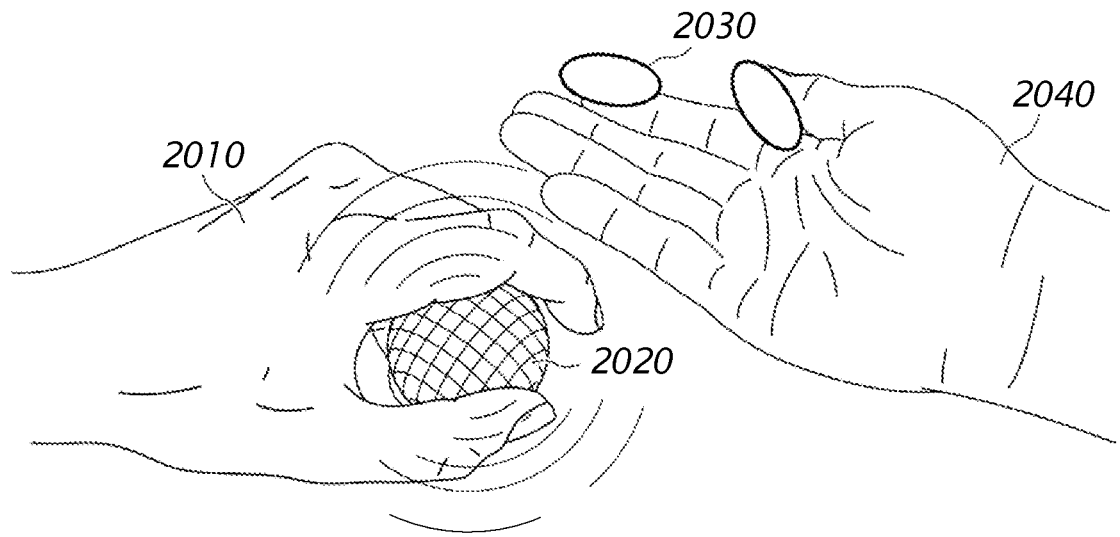
Figure 20C:
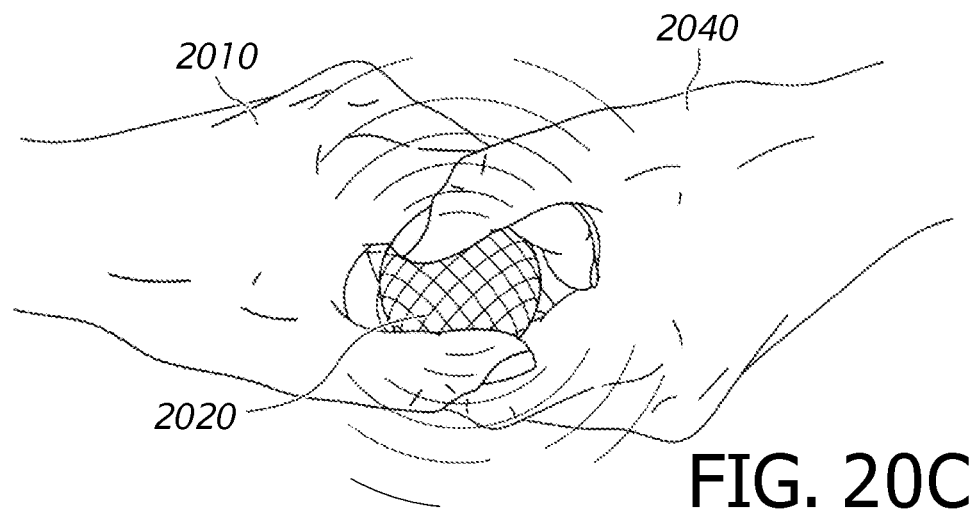
Figure 20D:
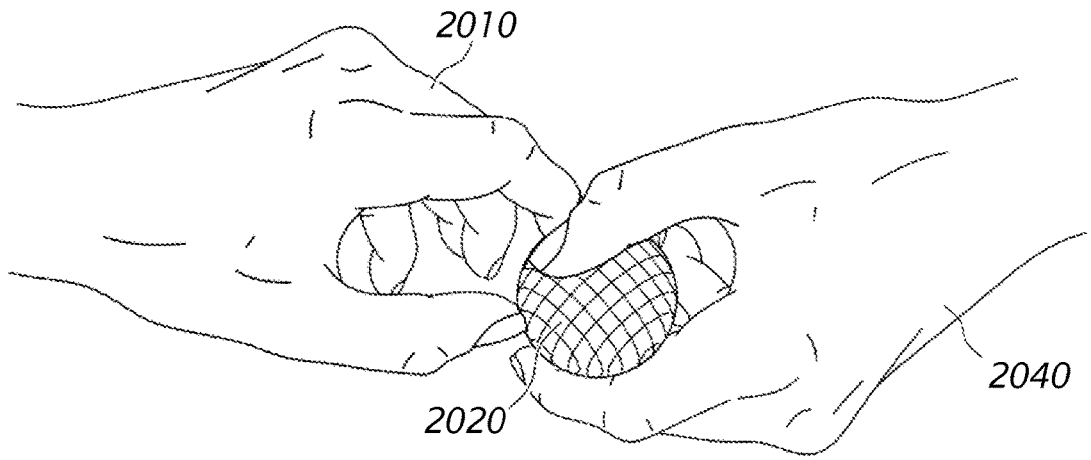
Figure 20E:
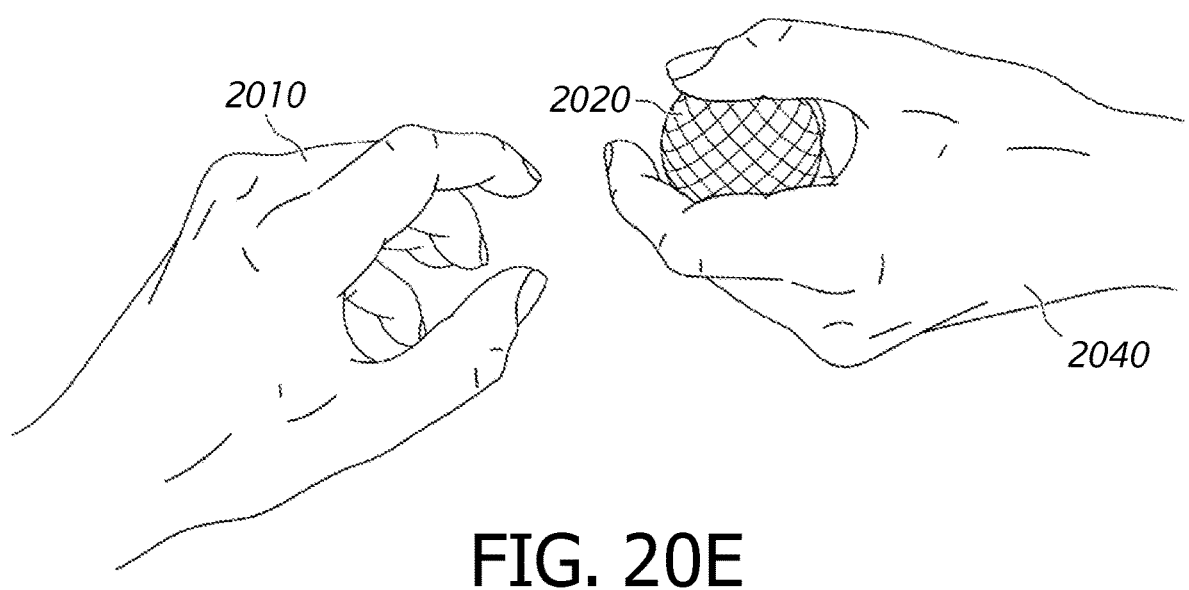

FIGS. 20A-20E illustrate an ultrasound system 2000 capable of a multi-user, such as 2010 and 2040, experience according to exemplary embodiments of the present invention. In such a system, 2000, multiple users, such as 2010 and 2040, may interact with each other in AR. There may be one or more object 2020 in such a system 2000. The users 2010 and 2040 may receive feedback that would facilitate one or more of the user's ownership or control of the object 2020. In some embodiments, the system 2000 may allow for a seamless interaction of two or more users 2010 and 2040 in an immersive computing environment. The system 2000 targets interactions where two or more users 2010 and 2040 come in contact with one another, or an object is transferred or handed from one user 2010 to another 2040, as illustrated in FIGS. 20B to 20E. For a scenario in which a user 2010 hands an object 2020 to another user 2040, the system 2000 may have five or more distinct phases. 1) The actor is holding the object (as illustrated in FIG. 20A). 2) As soon as the actor's 2010 hand approaches the receiver 2040 to hand it off (as illustrated in FIG. 20B), a slight variation in the touch feedback may be felt on the actor's 2010 hand. This can be manifested as increased or decreased pressure, speeding up or slowing down of the touch pattern recipe, changing of touch recipe all together, change in the visuals of the object, change in the audio feedback, or any combination of these. The receiver 2040 may also feel a sensation 2030 indicating that he or she is approaching a possible object 2020 to take control of (as illustrated in FIG. 20B). 3) When the receiver 2040 touches the object 2020, the aforementioned changes may take place once again, signaling that both users 2010 and 2040 have control of the object 2020, and both the actor 2010 and receiver 2040 are able to feel, see, and hear the object 2020 (as illustrated in FIG. 20C). Depending on the use, the system 2000 may accord either user 2010 or 2040 with superseding control over the object 2020. In some embodiments, both users 2010 and 2040 may have the same level of control over the object 2020. 4) When the actor 2010 is ready to hand off control of the object 2020 to the receiver 2040, he or she makes a gesture to signal the system 2000 (as illustrated in FIG. 20D). This can be manifested in any combination of closing of the hand, expanding of the hand, a verbal command, or another verbal and/or non-verbal method. 5) As soon as the receiver 2040 has the object, he or she becomes the actor, and the system 2000 is reset with the new context (as illustrated in FIG. 20E). The system 2000 may communicate regarding ownership of the object 2020 in multiple ways. For example, it may decide based on context, i.e., when the object 2020 is brought close to another object or a user 2040, the first user 2010 is likely to give away the object 2020 or share it. In other embodiments, system 2000 may look for visual cues, such as soon as actor's 2040 hands broaden or the actor's fingers expand, the system 2000 may recognize that a gesture to transfer the ownership of the object 2020. In other embodiments, the transfer process may start depending on the percentage of object 2020 "held" by a user, which may determine ownership. In other embodiments, the ownership may be based on time of use or priority.

Figure 21A:
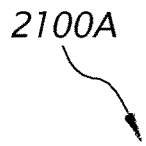
FIGS. 21A-21O illustrate various acoustics shapes and signals used in the ultrasound systems, according to exemplary embodiments of the present invention.
Figure 21B:
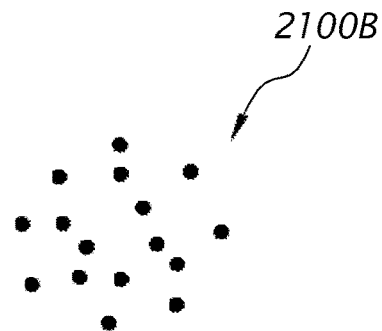
Figure 21C:
Figure 21D:
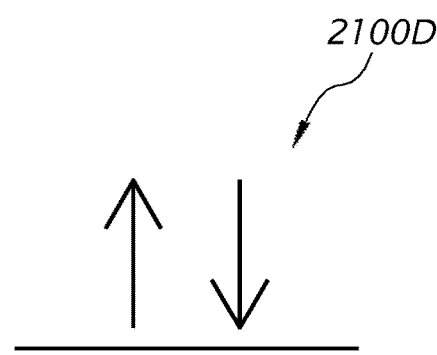
Figure 21E:
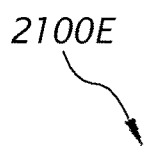
Figure 21F:
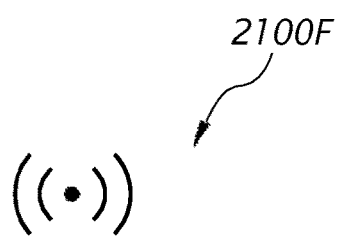
Figure 21G:
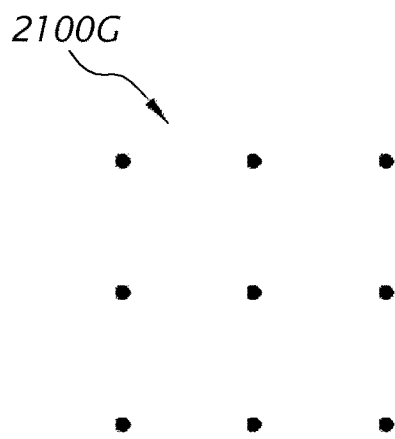
Figure 21H:
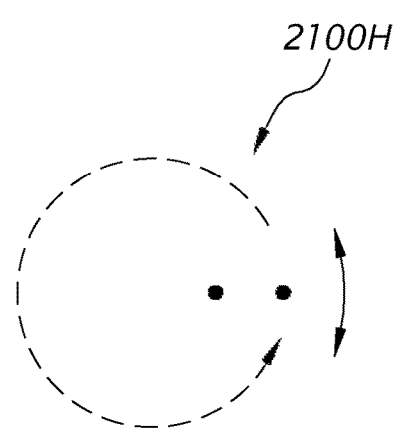
Figure 21I:
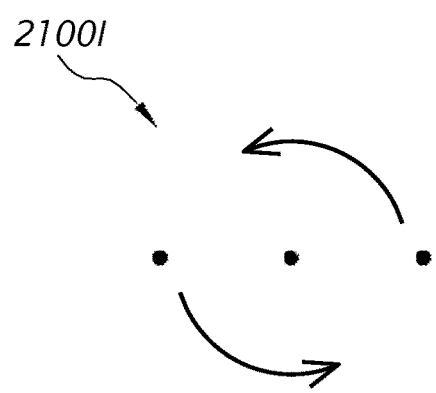
Figure 21J:
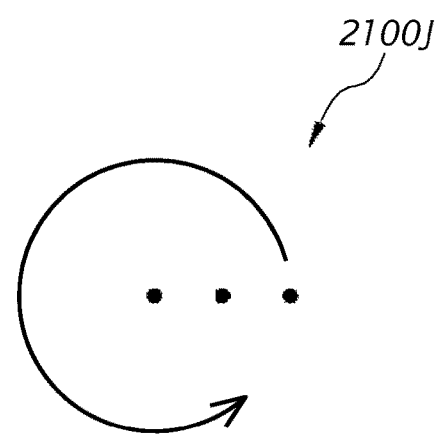
Figure 21K:
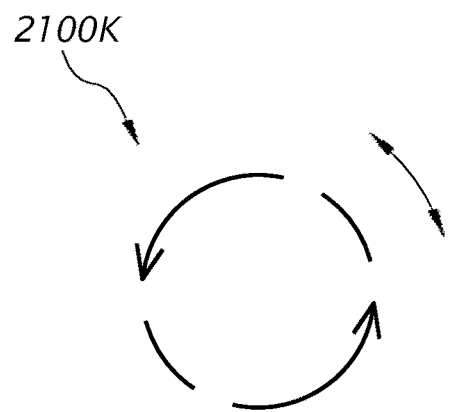
Figure 21L:
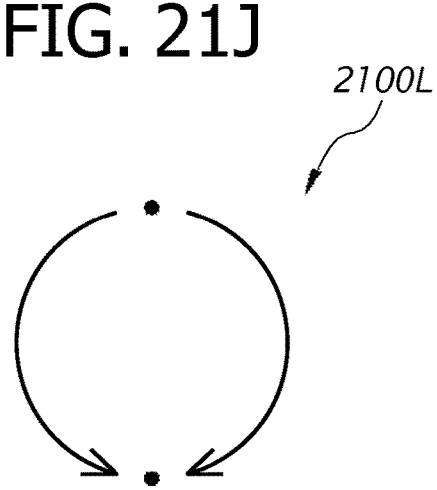
Figure 21M:
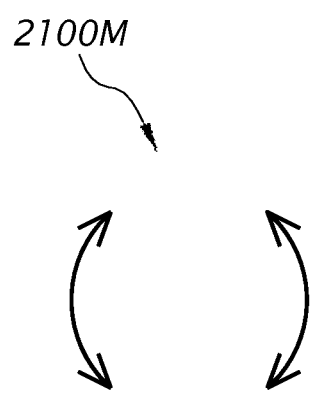
Figure 21N:
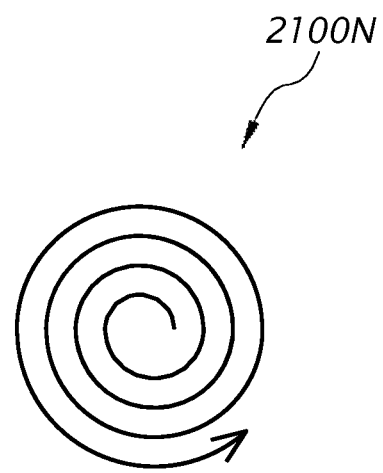

The systems described herein all function by creating unique sensations and feelings. Such sensations and feelings may be created by various algorithms that may work alone or in combination to create different acoustic shapes, textures, and volumes. In some embodiments, as illustrated in FIG. 21A, a single focal point 2100A may be created by constructive interference of ultrasonic waves. The single focal point 2100A is the "pixel" of all the systems described herein, i.e., the most basic and most precise unit in each system. As illustrated in FIG. 21B, in some embodiments, the systems may create an "electro-bubbly" pattern 2100B by focusing multiple points, scattered or stratified, in a circular fashion. Such a pattern 2100B may create the feeling or sensation of a disk, or even a sphere. In some embodiments, the pattern 2100B may also distribute the points in multiple vertical planes to create a 3-D shape. As illustrated in FIG. 21C, the system may create a sensation of a line 2100C by focusing multiple points adjacent to one another. Such lines may be used as other objects or for other purposes, such as virtual levers, boundary indicators, etc. As illustrated in FIG. 21D, the systems can create a sensation 2100D on a user's body of a rolling object, bouncing object, etc. In some embodiment, this sensation can be created by making a line using multiple points. Various points within those lines may move together or independently to create such a sensation 2100D. As illustrated in FIG. 21E, the systems may create a sensation of a triangle 2100E by focusing at least three points at each corner or creating three lines connecting at three corners. As illustrated in FIG. 21F, the systems can create pulsing objects 2100F by moving focal points on and off a target area or by another method. While FIG. 21F pulsing objects 2100F resembles a triangle, any other shape or object may be created as well. As illustrated in FIG. 21G, the systems may create grids and textures 2100G by focusing multiple points on an X, Y coordinate system. Such focusing may create a sensation of a panel or a semi-flat surface. As illustrated in FIG. 21H, a sensation of organic objects 2100H, such as a fish, may be created by mimicking the organic object's movement found in the natural word. For example, the points may be focused in a way to mimic the movement of a tail of a fish as it moves back and forth. In such embodiments, a multitude of points may be used to create the head and body of a fish. The last point on the body may be configured to fan back and forth so as to simulate a fish tail. All the points may be configured to move in a coordinate plane to simulate movement of a fish as it swims. Any other shapes, objects, textures, etc. may be created by combining any of the aforementioned techniques.

Figure 21O:
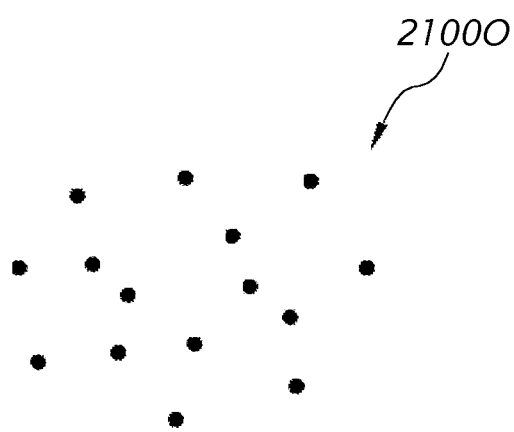

As illustrated in FIGS. 21I-21N, the systems may create a sensation of rotation 2100I-2100N. These rotations 2100I-2100N can be used to simulate various other sensations, such as simulating a loading status, for example as viewed on a computer, moving something around in a circle, etc. By varying the speeds of rotations 2100I-2100N, the system can simulate inertia, momentum, and even guide users through the sense of touch. These rotations 2100I-2100N may be created in a variety of ways. For example, rotation 2100I may be created by rotating three points around, pivoting on the middle point. Rotation 2100J may be created by rotating three points around, pivoting on the end point. Rotation 2100K may be created by rotating two points around, each going back and forth within a larger arc that is rotating. Rotation 2100L may be created by rotating two points that start on top of each other and move in an arc to the bottom position (e.g., like a snow angel). Rotation 2100M may be created by rotating two points back and forth but never completing a full circle or approaching each other (e.g., like a fly's wings). Rotation 2100N may be created by moving a single point from the center outwards in a spiral, then repeating the motion starting from the center. In some embodiments, as illustrated in FIG. 21O, multiple, randomly dispersed points can create the sensation of random dispersed points 2100O that may resemble rain, water, static, or any other natural elements.

Figure 22A:
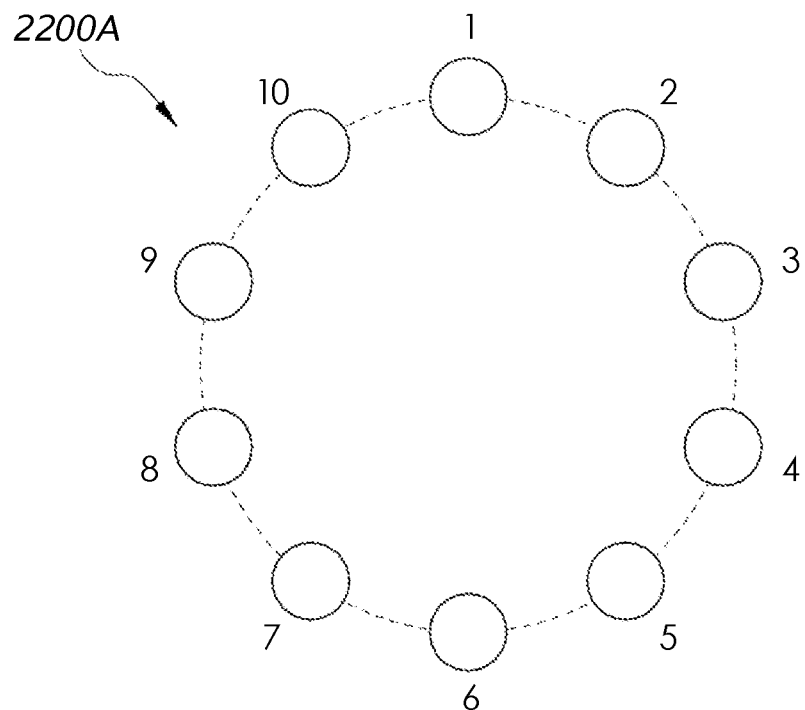
FIGS. 22A-22D illustrate methods to generate and implement acoustic shapes, according to exemplary embodiments of the present invention.
Figure 22B:
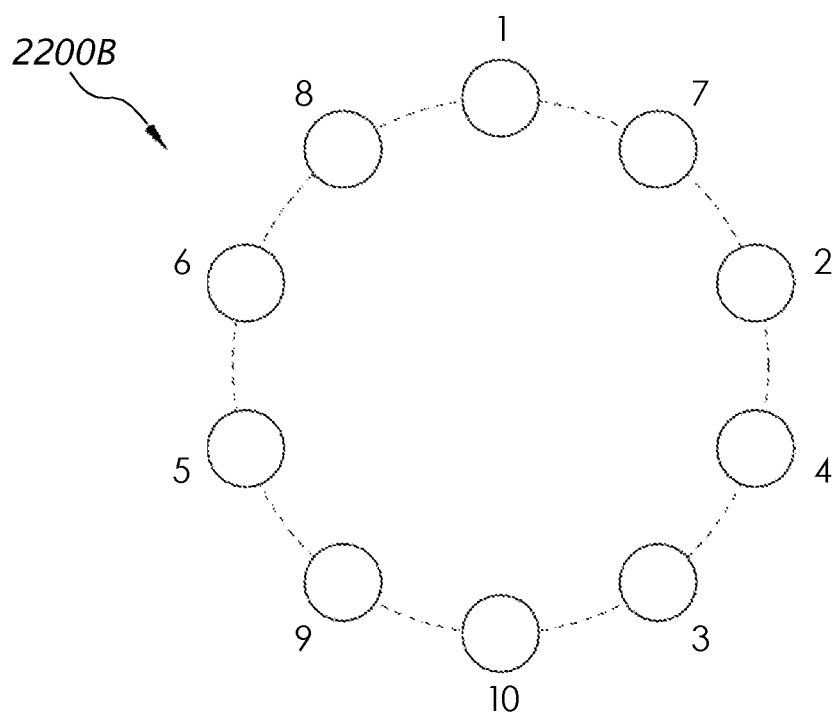
Figure 22D:
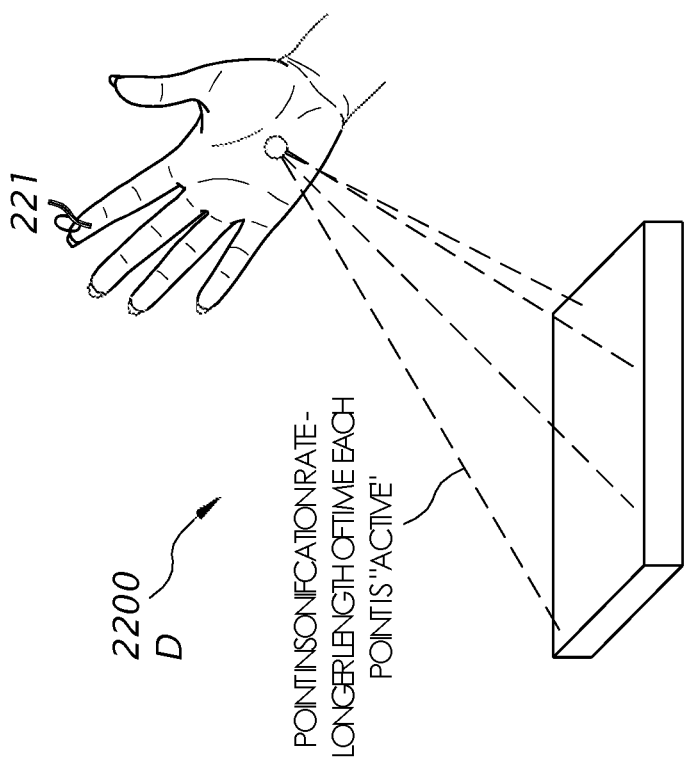
Figure 22C:
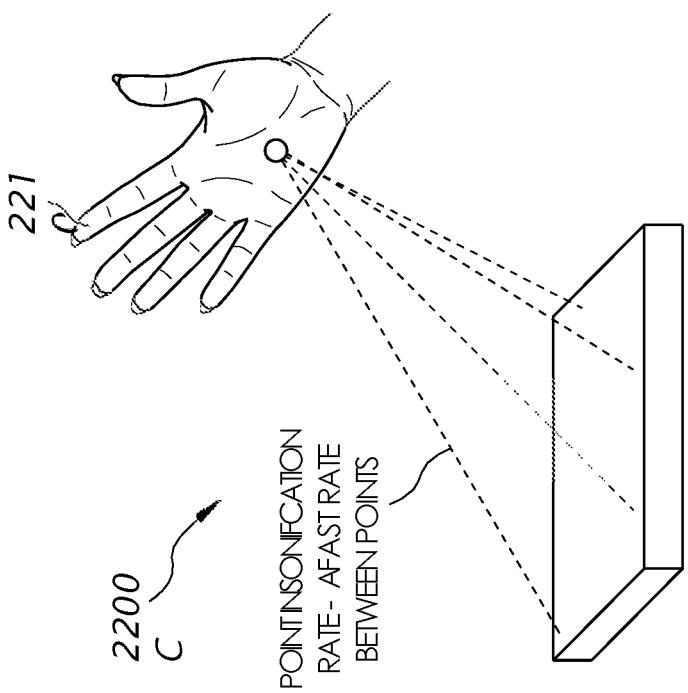

Various methods and algorithms can be used to generate and implement the various acoustic shapes, textures, and sensation described herein. For example, as illustrated in FIGS. 22A and 22B, by varying the focus points, i.e., the insonification sequence, different sensations 2200A and 2200B may be created. The order in which each individual point is activated can create different sensations or feelings. For example, the "electro-bubbly" may be configured to feel random, even though it is really setting of points in two concentric circles. In order to do so, in some embodiments, instead of going around a circle in sequence of adjacent points, by varying the order of the points, for example as illustrated 2200A and 2200B, different sensations may be created. In other embodiments, a multi beam or a single beam may be used to create various acoustic shapes, textures, and sensation described herein. This technique may allow for multiple beams to be created with a single array. It allows for larger area targeting but decreases overall pressure sensation. In other embodiments, point positioning algorithms (e.g., sinusoidal variation based on position—e.g., the fish tail method described herein) may be used. This method may utilize a special algorithm to create the phase maps or delays needed for a "fish tail" or any other organic shapes, textures, and movements. In some embodiments, the way it may work is by anchoring the "tail" off the "head" position of the "fish." I.e., if the "head" is at coordinates (x,y,z), then the "tail" may be auto set at coordinates (x1, y1, sz1). In some embodiments, as illustrated in FIGS. 22C and 22D, the point insonification rate, i.e., the time on points and between points, is the length of time that a focal point is at a specific location in 3-D space. To generate different feelings, sensations, shapes, textures, etc., the point insonification rate varies as shown, as illustrated in FIGS. 22C and 22D, to have the point "rest" on a user's body 2210 at different intervals, which affects how the object may "feel." In some embodiments, a typical point rate is approximately 5 ms between points or 200 Hz. In other embodiments, the typical point rate is variable. In some embodiments, objects created in the systems described herein may be moved by updating their position (i.e., location about which object points are created) while the object is being insonified. Clump size describes how many object points are insonified before the object location is updated—important for large (multi-point) objects. For example, if an object is made of 10-30 points, then it may be broken into various clumps. Clump sizes are typically between 1-3, but maybe more as well.

Figure 23:
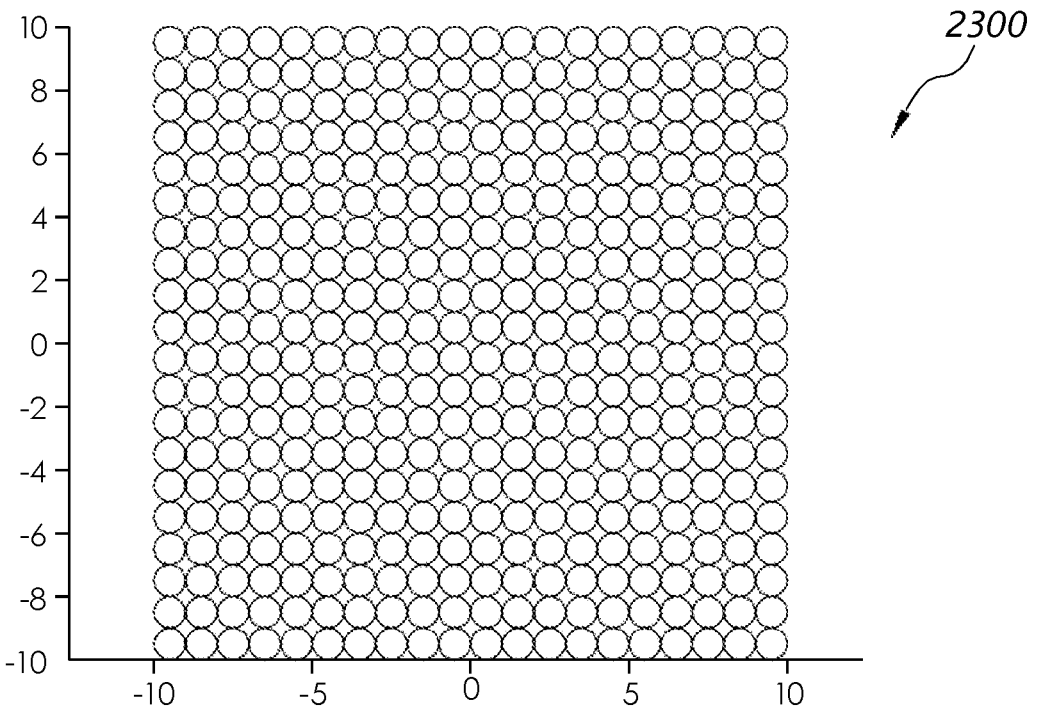
FIG. 23 illustrates an exemplary regular X, Y grid.
Figure 24:
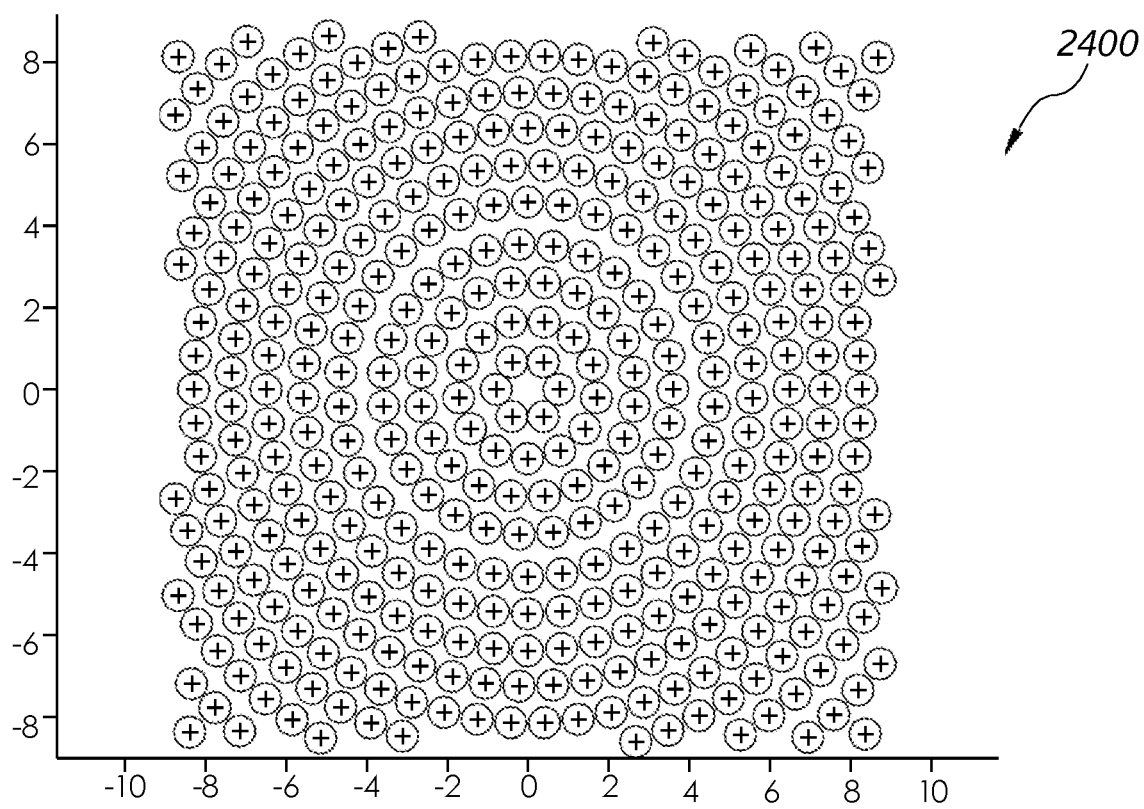
FIG. 24 illustrates an exemplary circular grid, according to exemplary embodiments of the present invention.
Figure 25A:
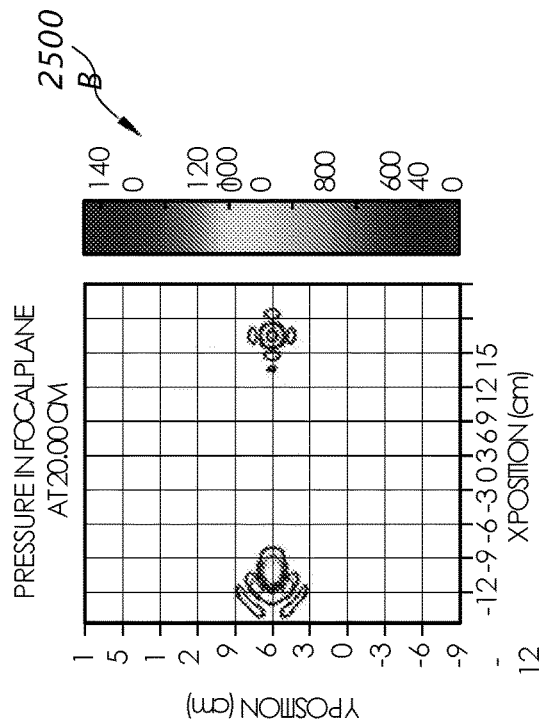
FIGS. 25A-25D illustrate exemplary graphs depicting pressure in focal plane at 20.00 cm for a regular X, Y grid and beam pattern.
Figure 25B:
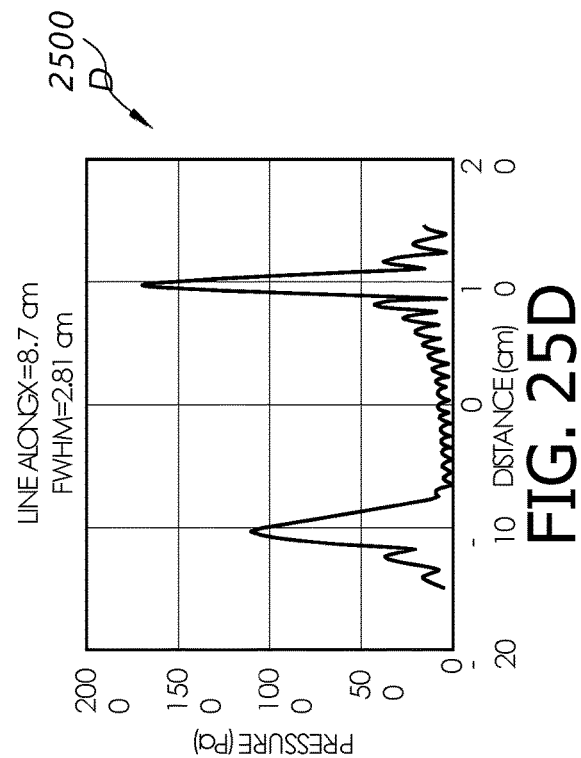
Figure 25C:
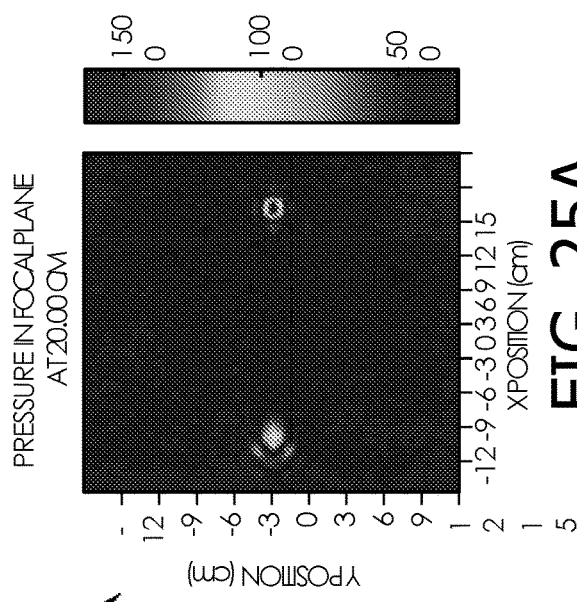
Figure 25D:
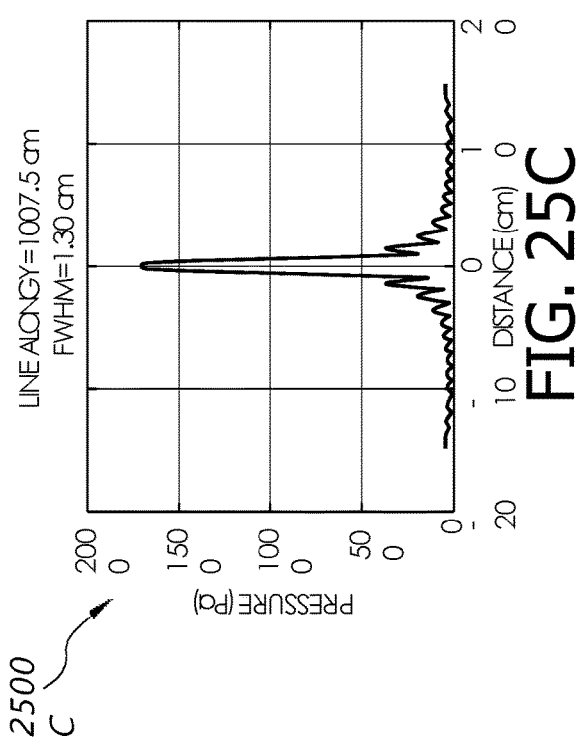
Figure 26A:
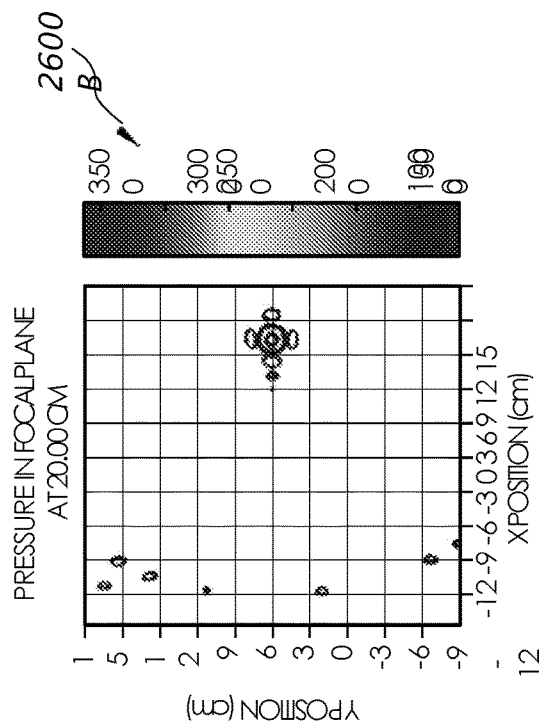
FIGS. 26A-26D illustrate exemplary graphs depicting pressure in focal plane at 20.00 cm for an exemplary circular grid and beam pattern according to exemplary embodiments of the present invention.
Figure 26B:
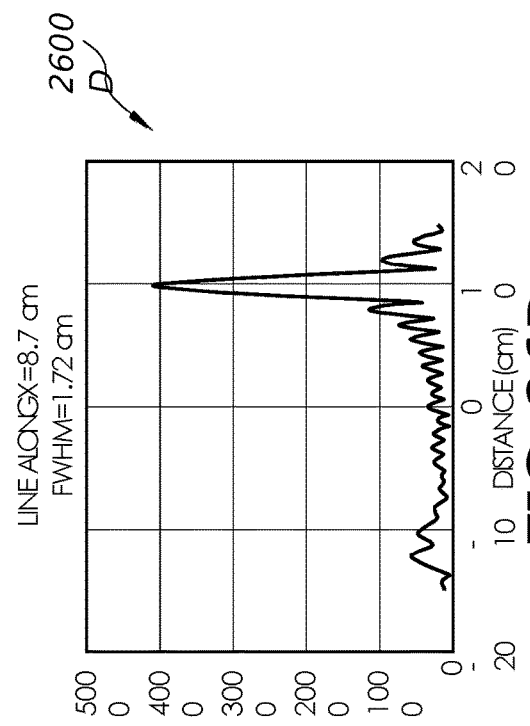
Figure 26C:
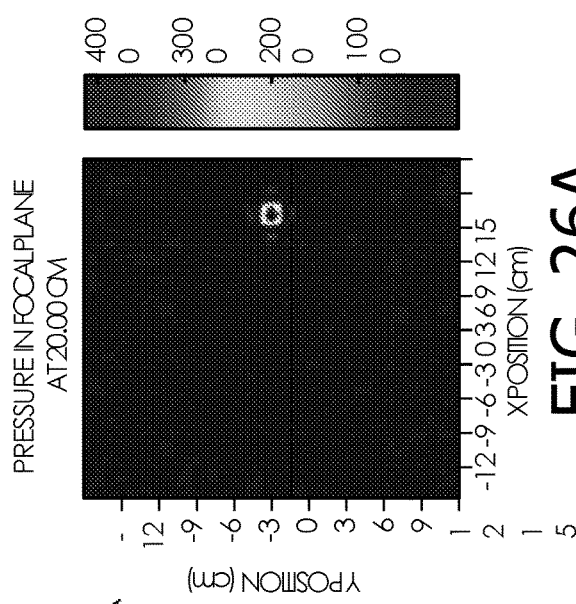
Figure 26D:
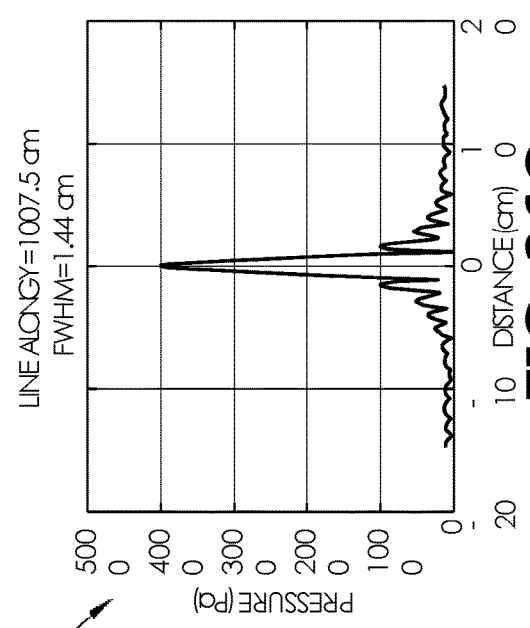

FIG. 23 illustrates an exemplary regular X, Y grid 2300. FIG. 24 illustrates exemplary circular grid 2400. In this embodiment, the array is a series of concentric circles with varying radius. The radius increments are in a manner to provide the closest packing of the concentric circles. Each circle is rotated to reduce alignment of transducers along any direction. Thus, in this embodiment, the local symmetry of the transducer positions is reduced compared to regular X, Y grid 2300 illustrated in FIG. 23. FIGS. 25A-25D illustrate graphs 2500A, 2500B, 2500C, and 2500D showing simulated pressure for main lobe (focus position) at x, y=10, 0 cm and grating lobe (unwanted beam) at approximately x, y=−10, 0 cm for the grid 2300 represented in FIG. 23. FIGS. 26A-26D illustrate how the grating lobe at x, y=−10, 0 is significantly reduced for a circular grid 2400 represented in FIG. 24 as opposed to a regular X, Y grid 2300 of FIG. 23.

Figure 28A:
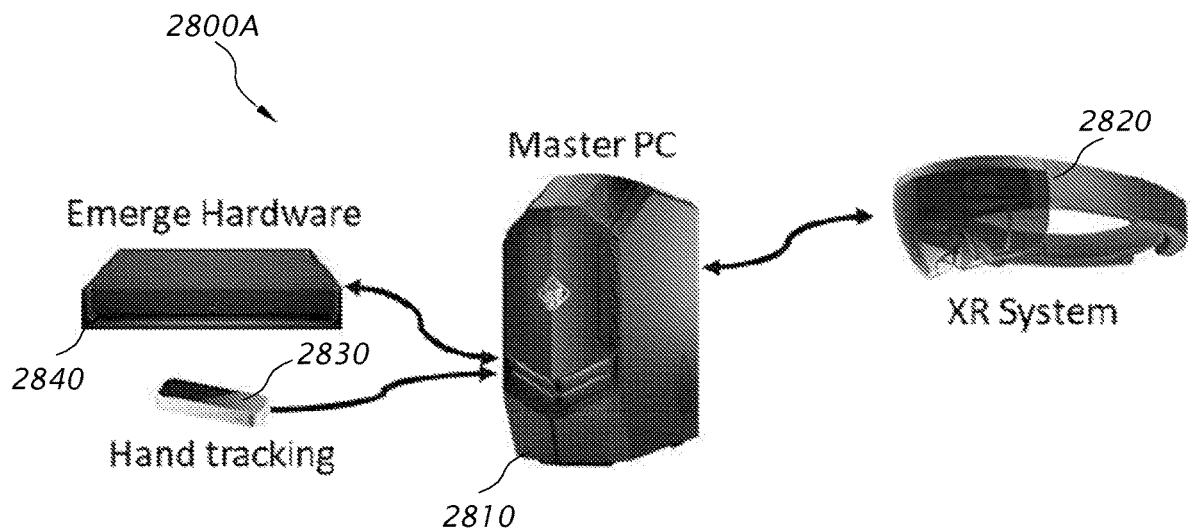
FIG. 28A illustrates an AR/VR/XR immersive computing environment, according to exemplary embodiments of the present invention.
Figure 28B:
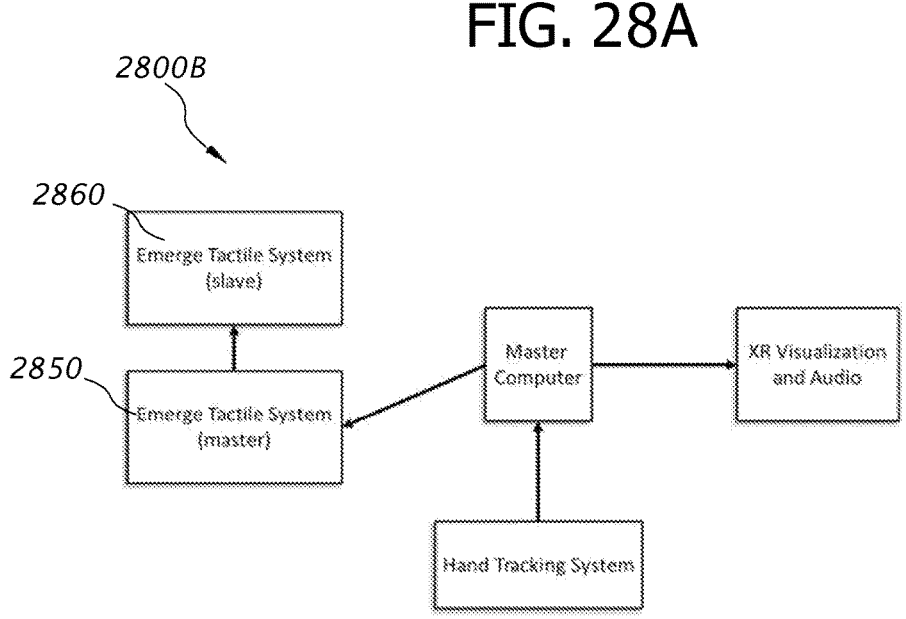
FIG. 28B illustrates a block diagram of an AR/VR/XR immersive computing environment, according to exemplary embodiments of the present invention.

FIG. 28A illustrates an AR/VR immersive computing environment 2800A. FIG. 28B is a block diagram representation 2800B of the AR/VR immersive computing environment The immersive computing environment 2800A, such as the Emerge immersive computing environment, may have a master computing device 2810, an AR/VR/XR system 2820, a hand tracking system 2830, and a tactile system 2840, such as the Emerge hardware box/Emerge tactile system. The hand tracking system 2830 may provide 3D location of the hand (or its components, such as palm, wrist, finger tips, knuckles, etc.) or any other body part of a user to the master computing device 2810. The AR/VR/XR system 2820 may provide, based on the commands, which may be preprogrammed, a visualization of digital objects, which includes interactive objects, digital scenery, avatars, etc. and/or audio received from the master computing device 2810. The tactile system 2840, such as the Emerge Tactile System, may consist of one or more arrays. The master array 2850 and slave array 2860 are illustrated in FIG. 28B. The tactile system 2840 may create the sense of touch based on commands sent from the master computing device 2810. The sense of touch may be preprogrammed. Commands may be sent based on user interaction with content. In some embodiments, the master computing device 2810 (and hosted software system) controls this experience and may dictate the experience and the characteristics and dynamics of the digital objects. For example, tactile sensation may be activated for digital object based on object location, hand location (provided from hand tracking system), and collision (touch) information (e.g., where the object is touched and how much of the object is in contact with the user's body part), which may be determined by a software on the master computing device 2810. There may be one or more master computing devices. I.e., the master computing device 2810 may be responsible for determining the interaction between the user's body part and the digital object (e.g., touch, grab, move, rotate, etc.). This may occur through the Unity or Leap software or any other software; defining which digital object(s) may be present and communicating that information to the AR/VR/XR system 2820; controlling the object visualization modes and communicating that information to the AR/VR/XR system 2820. For example, changing the size or color of a ball after it is touched; and controlling the acoustic tactile properties of the digital object by communicating signals to the tactile system 2840. In some embodiments, the software executing these functions may consist of different modules and code types (e.g., Unity code, 3rd party API's and drivers, Python code, etc.). There may also be other computing devices that are not the master computing device 2810. In some embodiments, the tactile system 2840 and the AR/VR/XR systems 2820 may be puppets to the master computing device 2810. The hand tracking system 2830 is the information provider to the master computing device 2810. The master computing device 2810 may conduct all of its processing within the hardware (i.e., local host), cloud (remote server), or edge computer/server ("local cloud") or a combination thereof. In another embodiment, the master computing device 2810 and tactile system 2840 may be combined in the same physical device (i.e., same housing). Similarly, the other sub-systems may be physically combined; for example, the hand tracking system 2830 may be combined in the same unit with the master computing device 2810 and tactile system 2840. The computing device 2810 may be anything as described herein. For example, if the computing device 2810 is a smart phone or a tablet, it may be capable of being docked into an appropriate connective device and engage in the immersive computing environment 2800A. This may also permit a user to access other immersive docking systems (at other locations) with the same master computing device 2810. A mobile computing device, combined with docking systems, could provide more consistent experience by allowing access to all the functions and capabilities of the computing device regardless of the docking location. Therefore, the user would not need to customize any of the software, applications, and presets on the computing device that could be necessary if the user were to use an immersive computing system for the first time. This functionality provides similar benefits to having a single laptop, with multiple docking locations (e.g., home and work). Furthermore, the smart phone computing device could be combined with other hosting systems such as cloud and/or edge computing servers. This may have the benefit of off-loading computational tasks better suited for platforms that are not suited for the master computing device 2810. The immersive computing environment 2800A may support the use of one or more digital objects. In some embodiments, immersive computing environment 2800A may calculate spatial transformations to align reference coordinate systems of the sub-systems. The relationship between the spatial position of visual digital object that is managed by the master computing device 2810 and communicated to AR/VR/XR system 2820, the user's body part (from the hand tracking system 2830), and an acoustic system may provide for user interaction of digital objects and combined visual and tactile property interaction. For example, the tactile system 2840 may process and communicate spatial data with respect to the center of the array. Therefore to create a tactile point 20 cm directly above the array, the tactile system 2840 may receive a command to focus ultrasound beam at location x,y,z=(0,0,20) cm. For example, the hand tracking system 2830 may process spatial data with respect to the center of the device, which may be located to the side of the array. The location may be known by measurement during system manufacturing or by engineering design. Similarly, by example, the XR visualization system may process and communicate spatial data with respect to a preprogrammed location in space. The master computing device 2810 may transform spatial coordinates from one coordinate system to another using the known locations of the origins of the sub-system coordinate systems by applying the appropriate translation and rotation to the coordinate data.

Figure 29:
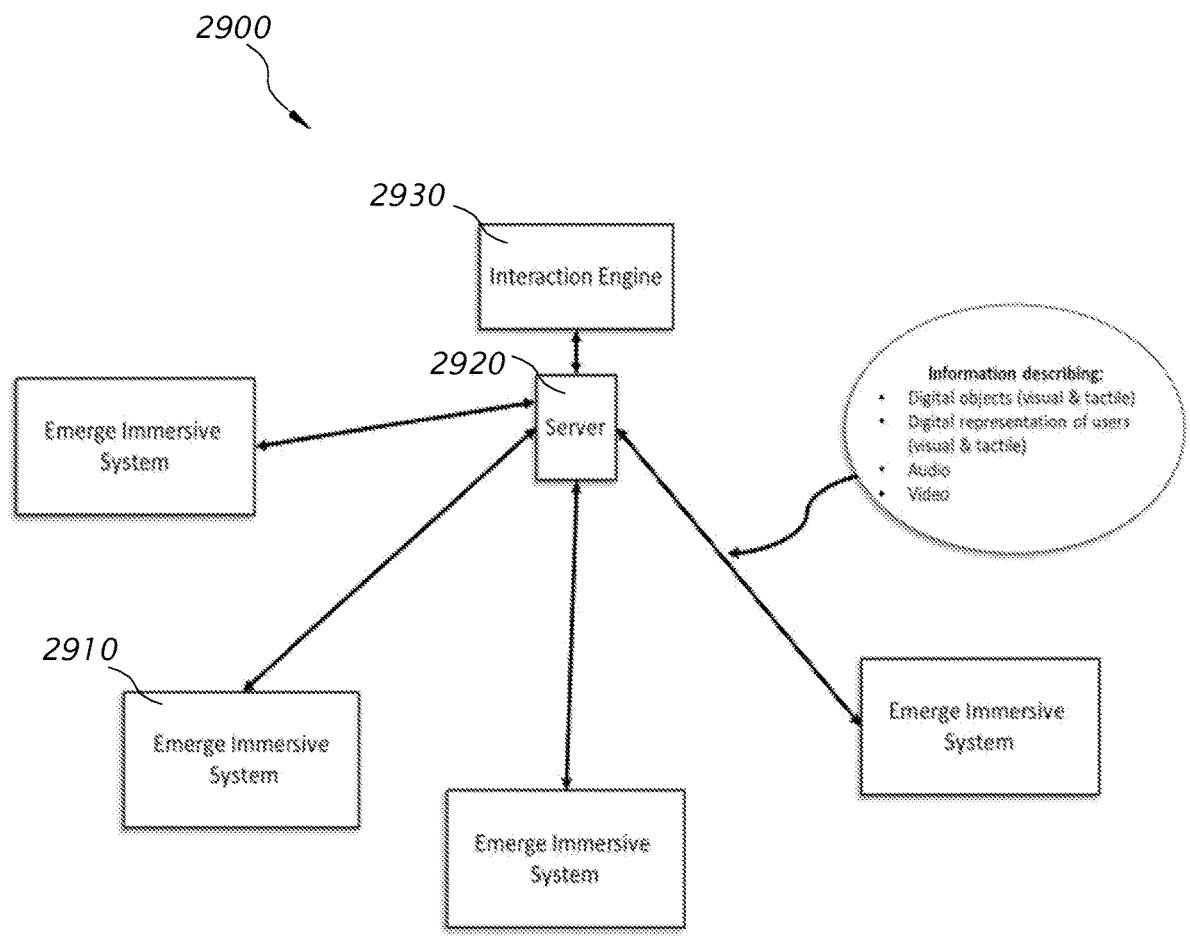
FIG. 29 illustrates a block diagram of an immersive computing system, according to exemplary embodiments of the present invention.

FIG. 29 illustrates a block diagram of a portal immersive network 2900 depicting an immersive computing system for teleportation, i.e., a system for digitally transmitting the human presence. An immersive computing system 2910, such as the Emerge immersive system, that is connected to the internet or to the immersive-net (immersive internet network connected other computing immersive systems, such as the Emerge immersive system) and has programming to allow it to connect to server 2920 is called a portal. The immersive computing system 2910 may have camera, microphone, and/or other components added to support the portal's operation. The portal may allow multiple users to share and interact with digital objects including holograms, digital scenes, and digital representations of the users. In some embodiments, the portal immersive network 2900 may constitute of immersive computing system 2910, server(s) 2920, and interaction engine (s) 2930. The interaction engine 2930 and server 2920 may control digital content data such as object locations, object physics, object states (e.g., spinning or moving object, grabbed object, etc.), visual properties, audio properties, tactile properties, etc. The interaction engine 2930 and server 2920 may communicate data to the portals to enable user interaction with content such as object location, object visual characteristics, object tactile data, etc. In addition, the interaction engine 2930 may control user interactions with content (e.g., has object been grabbed, pushed, what part of object is being touched, etc.). The immersive computing system 2910 may provide the user interaction with content and communication (e.g., video and audio) to server 2920 and interaction engine 2930. For example, the immersive computing system 2910 may communicate the location of the user's hands to the interaction engine 2930 and server 2920 for determining interaction with digital objects. For example, the immersive computing system 2910 may provide the user visualization of the digital objects, enabled by the portal's XR visualization subsystem. In addition, for example, the immersive computing system 2910 may provide the user tactile sensation using the portal's tactile subsystem. The portal immersive network 2900 operates analogous to multi-user network games, where portals are like user computer/workstations and the server/interaction engine is like the cloud hosted game server.

The server 2920 may control the communication between the immersive computing system 2910. Much like a network server, the server 2920 may control data flow and connectivity (e.g., login, permissions, etc.). The server 2920 can be cloud based, locally hosted (within or attached to an immersive computing system 2910) and/or part of an edge computing system ("local cloud").

In some embodiments, data representing users, digital objects, object interactions, and/or control commands may be communicated between the immersive computing system 2910, server 2920, and interaction engine 2930. These communicated data may include data from the immersive computing system 2910, such as video stream; a user's body position, size, and orientation transformed into digital objects (e.g., avatar) or parameters of digital objects (e.g., location and orientation of head and torso); a user's body parts' position, such as hand position, size, and orientation transformed into digital objects (e.g., avatar) or parameters of digital objects (e.g., locations of hand knuckles and palm); audio, such as voice and sounds associated digital content; and/or commands, such as interactions with shared digital objects, such as touching, grabbing, moving, rubbing, twisting, etc. (as described herein); and results of interactions with digital UX/UI that affect the joint immersive environment and objects. The communicated data may also include: the digital object data, such as visualization, position and orientation, and tactile information, and audio; and/or user data, such as avatar visualization, video stream, audio, and avatar tactile information. These communications may be selective and controlled between various immersive computing systems 2910 and vary depending on the digital object and the data streams/types. For example, the user's portal may not show the avatar of the user's hands, but only that of the other users' hands.

The interaction engine 2930 may generate and provide data describing the digital content of the immersive network (e.g., object position, state, etc.). The digital content may be created and managed using methods described for immersive computing system. The data may be communicated between immersive computing systems (portals), server, and interaction engine using standard digital data communication methods such as wireless methods (e.g., Bluetooth, Wifi, etc.) or wired methods (e.g., serial data connection). The interaction engine 2930 may control characteristics of digital objects and may communicate the data of digital objects to immersive computing system 2910 through the server 2920. For example, the interaction engine 2930 may provide the shape, form, tactile characteristics, position, and/or orientation of digital objects. The interaction engine 2930 may also provide communication paths. For example, it may control which digital objects are hidden to users or selective users and which users can interact with which digital objects, etc. For example, an object may be hidden if the object is not in the user's field of view or if the object is private to a particular user like a digital UX/UI control. In some embodiments, the communication paths may be controlled to provide a variety of portal systems including: a) receiving portals, i.e., the portals using which the users can participate in joint immersive environment but cannot affect or control all or some of digital objects (e.g., the users may be able to touch and see the objects, but cannot do much else, such as move, grasp, or rotate.); b) selective network portals, i.e., the portals that are selectively linked/connected to each other (as opposed to other instances when the portals are all connected to each other) so as to control the object and the user interactions. For example, in some embodiments, in a teaching scenario, one portal ("teacher") may broadcast to many ("student") and each student portal can interact with digital objects. However, the student portals may have limited or no connection to other student portals; and c) interaction engine hosting and distribution portals. Similar to the server 2920, the interaction engine 2930 may be cloud based, locally hosted (within or attached to a portal) or part of an edge computing system ("local cloud"). Also, all or parts of the interaction engine 2930 may be distributed on immersive computing system 2910 or server 2920. For example, processing for rendering digital objects or application of the digital object physics may be done on an AR/VR/XR system within each immersive computing system 2910.

Portal users can visualize the digital objects. As described for immersive system 2800A, visualization is enabled by the XR subsystem (e.g., augmented reality glasses, hologram projector, etc.). There may be various methods for portal users to view and interact with digital objects. For example, in some embodiments, the users, using different portals, may view and interact with digital objects with a common or different viewing geometry and conditions (e.g., different angle, lighting, proximity, etc.) of the digital objects. In other embodiments, the digital representation of remote users may be done using a video display, avatar, or a combination of the two, i.e., the video display and avatar. In some embodiments, the local user digital data may be inactive in the local portal. For example, the local portal may not show the local user avatar hands or video stream.

In some embodiments, haptic sensation may be added to real objects to create combined real or digital interaction. The method may also be applied to combined real or digital objects (e.g., physical ball with digital visual texture or coloring). For example, in some embodiments, acoustic beams may be used to stimulate tactile sensation on a user's fingers or hand when a panel is touched. The tactile sensation may be delivered to the user when a real object is moved or placed in target location. The sensation may be delivered on the grasping hand or elsewhere on the body of the user. In addition, acoustically transmissive materials may be used to create the real objects that allow for acoustic tactile signals to propagate through them, allowing for digital tactile sensation. Examples of highly transmissive materials are cloths, screens, and grates that have regions of open area with dimensions typically less than ¼ of an acoustic wavelength in air. Similarly, the thickness of these materials may be typically less than ¼ of an acoustic wavelength in air.

Figure 30:
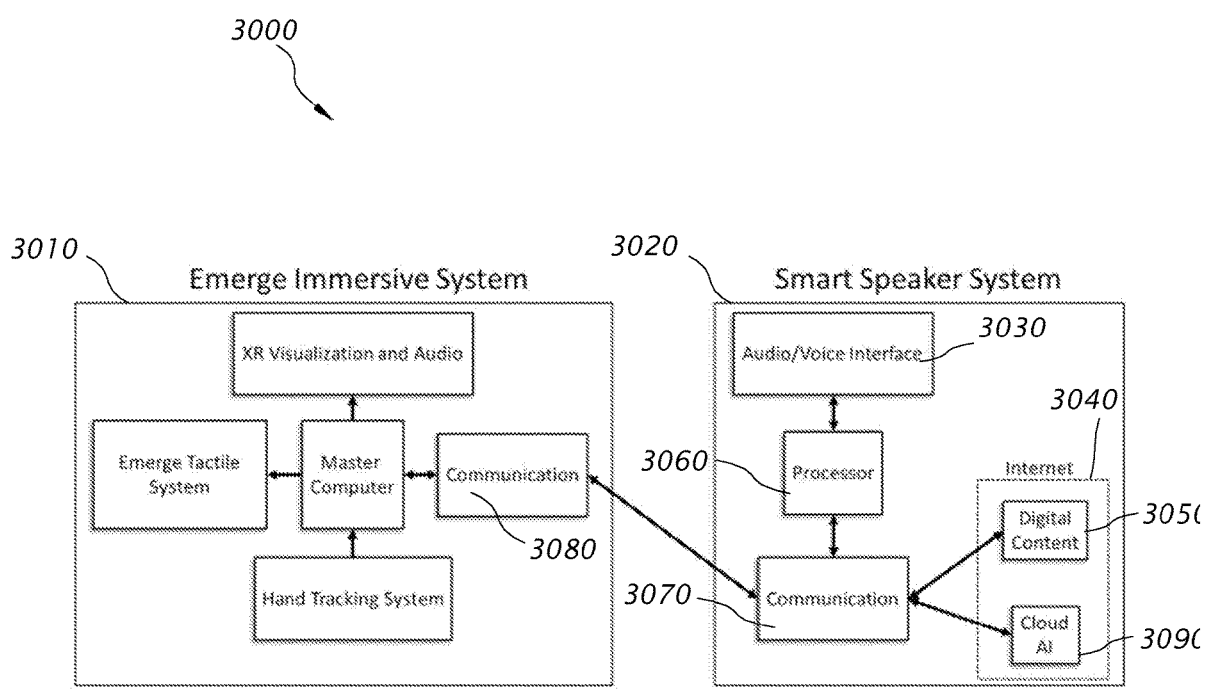
FIG. 30 illustrates a block diagram of an exemplary XR smart hub, according to exemplary embodiments of the present invention.

FIG. 30 illustrates a block diagram 3000 of an exemplary XR smart hub. An immersive computing system 3010, such as an Emerge Immersive System, described herein, may be communicatively coupled or linked to a smart speaker system 3020 using any conventionally available methods, such as electrical cords, WiFi, Bluetooth, etc. The smart speaker system 3020 may have an audio and voice interface 3030 that allows the user to interact with digital content 3050 from the internet 3040 or stored locally. A processor 3060 may provide computation resources for operation and a communication subsystem 3070 may allow for data to be sent and received from internet 3040 or other systems and devices. The communication may be wired or wireless. The communication sub-system may have WiFi, USB (or other wired bus), Bluetooth, cell-based wireless (e.g., 3G, 4G, 5G) or other communication devices (such as transmitters and receivers). Also, it may have data or memory buffers for interfacing with communication devices and local master computer or processor. In some embodiments, internal system clocks may be used to control data flow. Memories, clocks and other data processing may be used to transform data for suitable transmission to communication devices or processing units. For example, bit stream from communication device may get packed into bytes prior to transmission to processor. Smart speakers utilize cloud-based neural networks or other learning computational systems to provide artificial intelligence (AI) 3090 needed for processing voice commands and interfacing with digital content 3040. The AI 3090 may also be locally hosted in processor subsystem 3060 in whole or in part. The immersive computing system 3010 may have subsystems described above as well as a communication subsystem 3080 to control data flow to and from the immersive computing system 3010. In some embodiments, the communication subsystem 3080 is connected to the communication system 3070 of the smart speaker device 3020. The immersive computing system 3010 may allow the users to interact with XR content using both the smart speakers as well as the immersive computing system 3010. For example, the smart speakers can be used to request and interact with XR content for purposes, such as entertainment, commerce, games, communication (e.g., portal described elsewhere in this specification), UX/UI tools, etc. The interaction with content need not only involve haptic (e.g., the user being able to touch and move digital objects) and visual (e.g., holograms) components but also other capabilities provided by smart speakers, such as voice control of digital objects and immersive computer system controls. For example, the user may start a session on the immersive computing environment 3010 by stating "shop for shoes." The smart speaker may recognize the request, fetch appropriate content, and instruct the immersive computing system 3010 to display content (digital shoes) from various vendors. This may be accomplished by sending content, data, and commands from the smart speaker using communication subsystem 3080 to the immersive computing system 3010. The master controller may be programmed to process received data from 3080 and create the XR visual, haptic and audio content by instructing and interfacing with the sub-systems of immersive system 3010 such as XR visualization, hand tracking and tactile sub-systems. The user may use an XR UX/UI to select a vendor and then a pair of shoes. The XR system may provide a 3-D visualization of the shoes and the haptic system may allow the person to interact and feel shoes. The user may then use the smart speaker to alter the digital content by stating "change color to red." Finally, the user may be able to purchase the shoe by merely grabbing and moving the shoes to a digital shopping basket and commanding the smart speaker to "check out" and thus triggering an XR or voice UI for payment and shipping. In another example, the smart speaker system 3020 is used to initiate a portal communication described above. The user may state "contact Vish," and the local immersive portal may be activated and may connect to the remote user's portal, described herein, allowing for them to jointly interact with digital content, including XR visualization, haptics, and audio. In addition, during a portal session, the smart speaker can be used to access content that is jointly shared or for a single user. For example, one portal user may state "show the map of Los Angeles" and trigger a 3-D hologram of the Los Angeles area. The users may then use the portal to rotate, zoom, or pan the map with their hands to explore an area for a hike, for example. In some embodiments, the immersive computing system 3010 may include a camera and a microphone that enable video and audio communication channels of portal communication.

Figure 31:
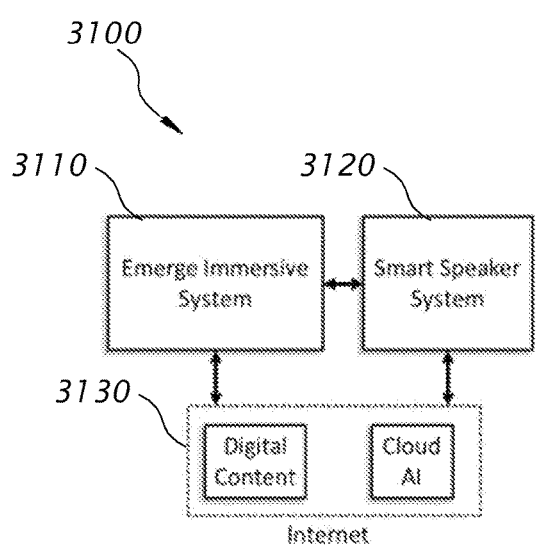
FIGS. 31 and 32 illustrate block diagrams of immersive computing systems and smart speaker systems communicatively linked to each other, according to exemplary embodiments of the present invention.
Figure 32:
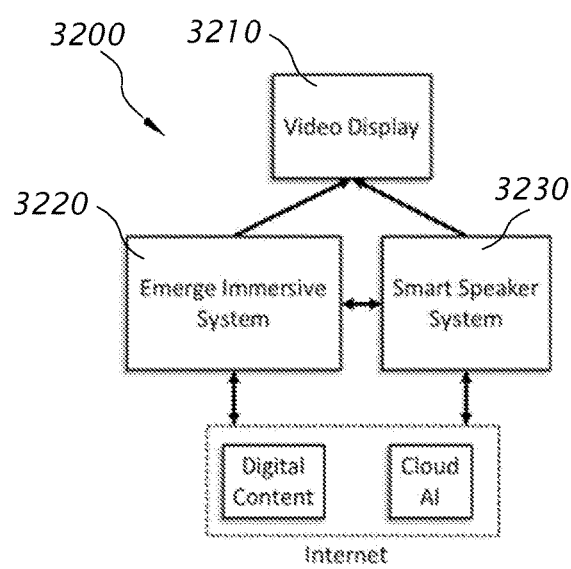

Additional examples of immersive computing systems and smart speaker systems communicatively coupled to each other are illustrated in FIGS. 31 and 32. FIG. 31 illustrates an extension of the concept described above. In this embodiment, not only are the immersive computing system 3110 and smart speak system 3120 communicatively coupled, using any methods such as electrical cords, WiFi, Bluetooth, etc., but both also communicate with the internet 3130 to access digital content and AI functions. This would provide communication efficiency benefits, allowing the immersive computing system 3110 to directly and independently access content instead of communicating through the smart speaker system 3120. In some embodiments, as illustrated in FIG. 32, a video display 3210 may be coupled to both the smart speaker 3220 and immersive computing system 3230. The video display 3210 can show 2-D digital content, such as an internet browser or a video stream, as well as provide a touch screen interface. The smart speaker system's 3230 function may be embedded in other devices. For example, the smart speaker system 3230 may be replaced by a smart phone, smart tablet, smart watch, or any other device equipped with AI capabilities (e.g., Google assistant).

Figure 33:
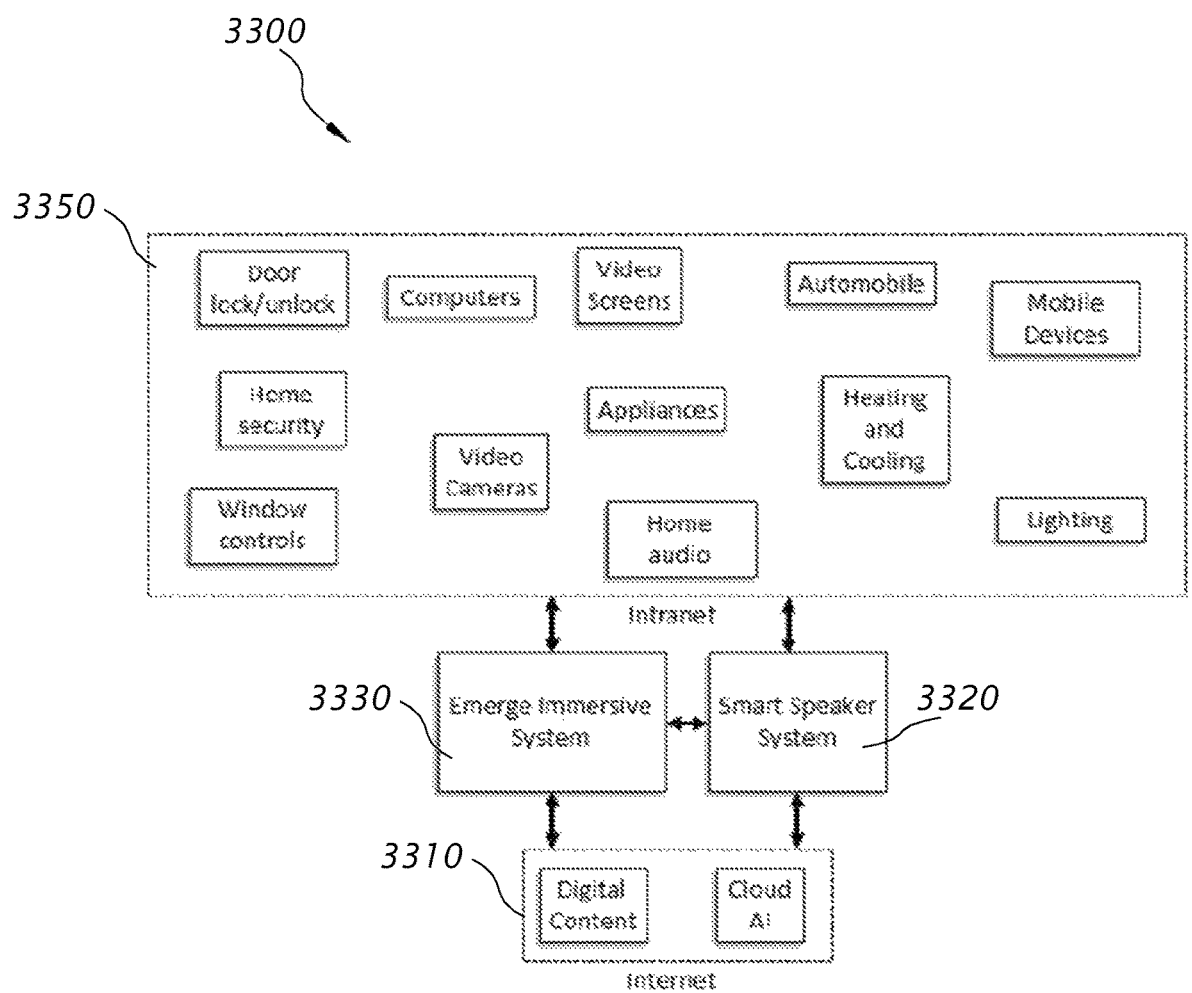
FIG. 33 illustrates a block diagram of an XR hub communicatively linked to the intranet, according to exemplary embodiments of the present invention.

In some embodiments, the XR hub may be connected to the local intranet 3310 to provide control, interface, and interaction with connected home systems as illustrated in FIG. 33. The XR hub may be able to communicate with a variety of home systems, using any communication methods, such as electrical cords, Bluetooth, WiFi, etc. For example, the user could state "temperature controls," triggering the smart speaker system 3320 to communicate with the immersive computing system 3330 to present controls affecting home environment 3350 and communicate with heating cooling system within it to get present settings and conditions. For example, the user may use the immersive computing system 3330 to turn a hologram of a dial using haptics and visualization to adjust temperature and humidity. This may trigger the XR hub to communicate the appropriate signals to the home heating and cooling system 3360. Using similar methods, other systems may be controlled. In another example, video camera data may be visualized and interacted with. The user could say "show cameras" triggering the XR hub to fetch stored or live video feed from the home camera system. The video information may be displayed by the XR hub as a hologram showing multiple streams simultaneously on virtual monitors. The user may grab the virtual monitor and bring it forward and expand for closer examination. Hand gestures, interface with virtual controls, or voice commands could be used to advance, pause, and play the video stream.

In some embodiments, a defined set of user actions such as grabbing, moving, throwing, rotating, spinning, expanding, etc. may manipulate basic digital object properties, such as position, orientation, size, visual properties, etc. In other words, sets of user actions may map to sets of digital object manipulations. Such mappings can be more than one-to-one, i.e., for example, grabbing may change the position and size.

Figure 34:
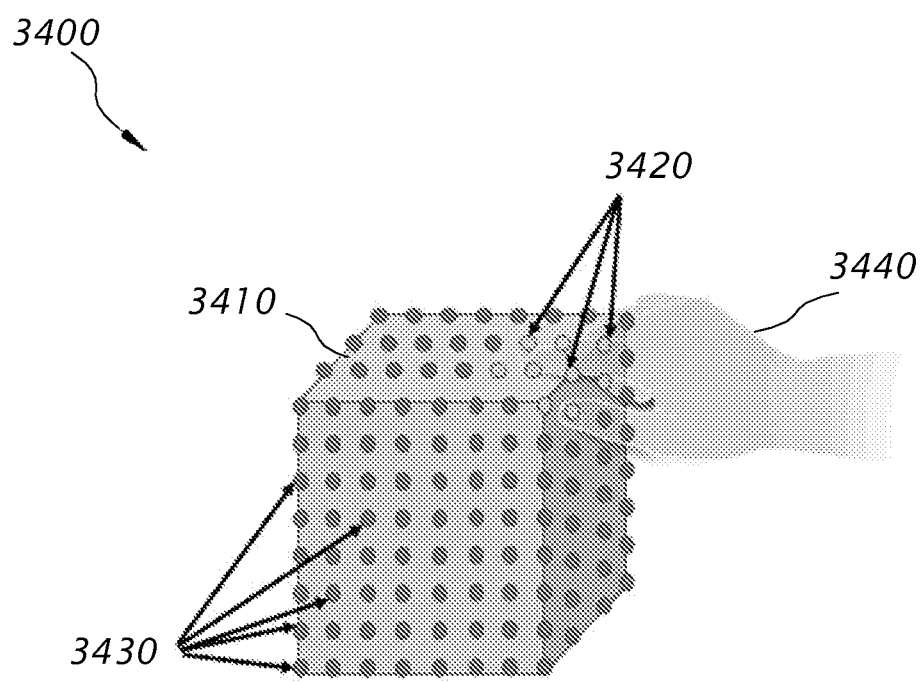
FIG. 34 illustrates localized object activation on a digital object, according to exemplary embodiments of the present invention.

In some embodiments, as illustrated in FIG. 34, localized object activation 3400 may be performed on a digital object 3410. Localized tactile sensation may be created at the region of touch, i.e., at some collection of points, 3420 by the interaction of the object and a body part of a user. This is in contrast to the tactile sensation being generated for the entire digital object. Thus, localized object activation 3400 may provide for more optimized tactile sensation and may be particularly useful for large objects. Large objects may require many target tactile points and the time required to create tactile sensation at all the points (including the ones not touched) can degrade the haptic sensation. For example, the sensation may feel irregular or periodic since there will be pauses in sensation during times when other, non-touched, tactile points are being insonified. In some embodiments, there may be target tactile points 3430 that define the digital objects by creating a set of tactile target locations. This definition maybe pre-programmed. A tactile system, such as the Emerge tactile system, may create one or more sensations at these target locations. The target locations can take various forms including points, lines, spots, planes, or any arbitrary region that can be insonified by the tactile system. For example, a cube acoustic object 3410, as illustrated in FIG. 34, may be composed of target tactile points 3430 that are evenly spaced on the cubes' six faces and twelve edges. In other embodiments, the target tactile points may be spaced unevenly. When the interaction of the user's body part and the object occurs, a fixed number of points near the interaction point(s) may be activated to produce tactile sensation. For example, when a user touches the digital object with his or her hands 3440, the closest single point or points to each fingertip or geometric center of hand in contact with object may get activated. In some embodiments, a subset of target points can also be used as candidate points for activation. For example, if the touch location is near the edge of cube, the face target locations can be omitted, and a set of edge target locations may be activated by their proximity to the hand or the hand's characteristics. In another example, the activated points may be a circle consisting of a fixed number of points of a fixed radius centered about the middle of palm. The set of activated points could also change with time. Expanding on the previous example, the activated points could toggle every 1 second between circle and a single point at middle of palm.

In some embodiments, the haptic sensation using ultrasound may be dependent on timing of beam motion and acoustic field changes. The temporal changes in the acoustic field may stimulate neuro-mechanical receptors to significantly enhance tactile sensation. In order to have precise control of the beam and field temporal changes, the tactile system, such as the Emerge tactile system, may incorporate a timing sub-system to trigger the next beam state. The timing sub-system may be a software based sub-system that utilizes a precise timer provided by a timing function (e.g., Python's time.time or time.time_ns functions) to measure time since start of last beam position or acoustic field change. The timing sub-system may be executed on the master computer of the immersive computing system. When the timer reaches a pre-programmed time (inter-beam time), which is defined as an acoustic (tactile) property of the digital object, the next beam position or acoustic field change may be created by the master computer communicating the new beam position or acoustic field parameters to the tactile system. The process is repeated for the next beam position or acoustic field. This process may allow for the tactile rate to be consistent and precisely controlled. It is particularly critical for changing computational load conditions on the master computing system when the computing speed, such as that of a central processing unit, is reduced such as battery power operation. Furthermore, it provides for consistent haptic experience across various processing systems' models and computational configurations. For example, changing computational load or computational power (e.g., different CPU) causes changes in the execution time of software instructions, functions, modules, communication, etc. on the master computer leading to variation in time between acoustic field updates. The timing sub-system eliminates these variations by precisely controlling timing between acoustic field updates, providing a consistent tactile experience to the user.

Figure 35:
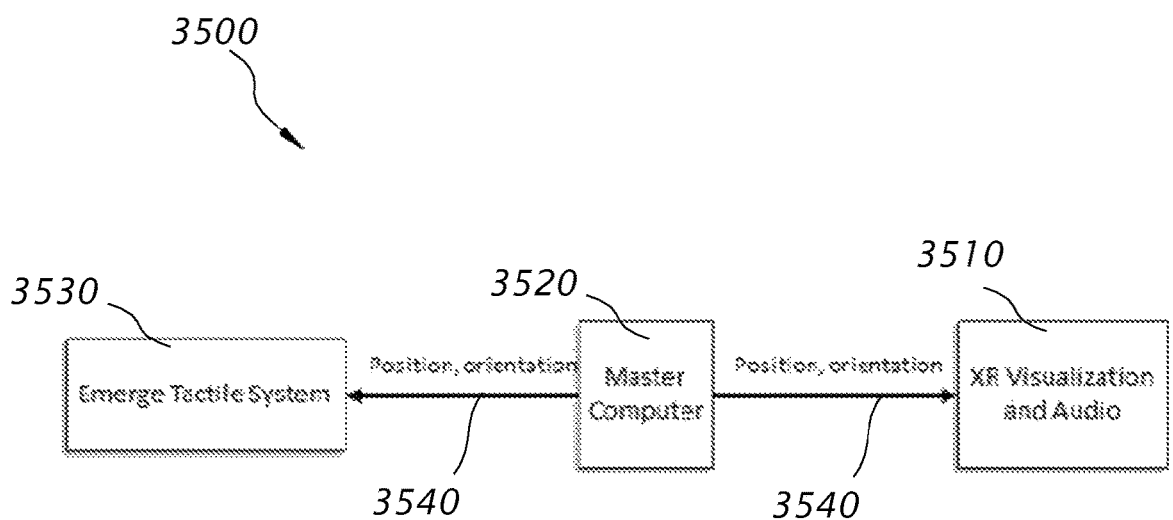
FIGS. 35-38 illustrate block diagrams of a tactile system, master computing system, and an XR visualization system communicatively linked to each other, according to exemplary embodiments of the present invention.
Figure 36:
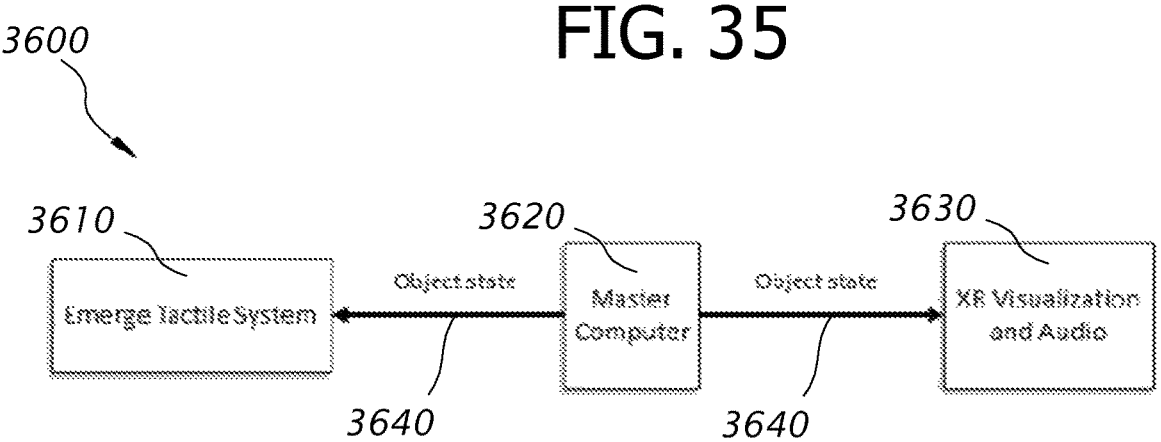
Figure 37:
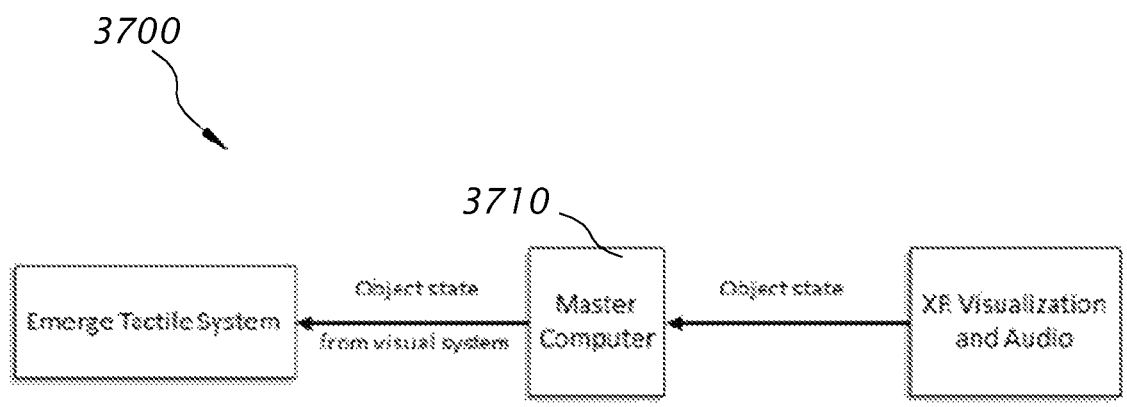
Figure 38:
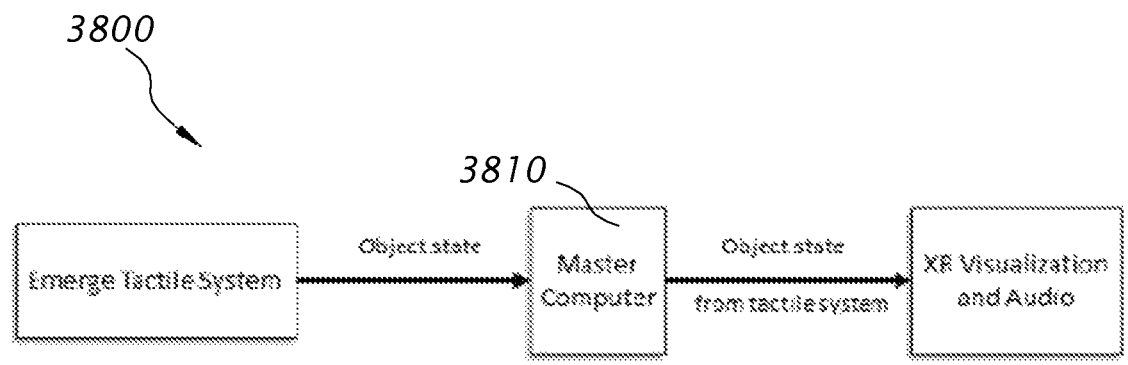

In some embodiments, acoustic and visual characteristics of digital objects may be linked to optimize the immersive experience. For example, it is common to have the position and orientation 3540 of the visual and acoustic digital objects coordinated between the XR visualization and audio system 3510, the master computing system 3520, and the tactile system 3530, as illustrated in the block diagram 3500 in FIG. 35, to provide the expected interaction when the digital object is moved or rotated. Similarly, the states of the digital object may be linked to the tactile system 3610 and the master computing system 3620 and the XR visualization and audio system 3630, as illustrated in FIG. 36. For example, a rolling ball may have a coordinated rolling tactile sensation. In some embodiments, as illustrated in FIGS. 35 and 36, in the immersive computing system, such as the Emerge computing system, the master computing system may control and communicate the digital object's state, position and orientation, and other linked visual or tactile characteristics between the tactile system and the XR visualization and audio system. Alternatively, the digital object's state, position and orientation, and other linked visual or tactile characteristics may be controlled and communicated by the XR visualization and audio system, as illustrated in FIG. 37 or the tactile system, as illustrated in FIG. 38. The communicated data may be passed through the master computing system 3710, 3810, respectively, in both instances. The master computing system 3710 or 3810 may transform the input commands from these various input systems to generate a suitable output for the appropriate destination system.

Systems described herein may also include active noise cancellation mechanisms for audible noise. The ultrasound devices may create an audible sound from changes in the radiation pressure associated with changing the acoustic field, moving the beam(s), or turning the array on/off. In some embodiments, the active noise cancellation mechanisms may work by creating and/or storing a library of each recipe (i.e., a collection of phase maps created for each "feeling) and the audible sound it generates. The active noise mechanism may then create inverse sounds and transmit that data to the AR headset, which can project the sound cancelling noise through the built-in headphones or speakers through the speakers embedded in the ultrasound panel, etc. In some embodiments, the systems described herein may be coupled with currently available noise cancellation methods such as microphone(s) and speakers placed near the user's ears. The microphone signals may be used to generate the cancelling acoustic signals delivered to the speakers.

All the gestures, sensations, feelings, UI/UX interactions, interactions with various objects, etc. are a part of specific outputs in the immersive computing environment created by the systems described herein. These gestures, sensations, feelings, UI/UX interactions, interactions with various objects, etc. may be pre-programmed into a database that may be communicatively coupled to the systems described herein. In some embodiments, the systems described herein may be able to analyze the user's movements, signals, etc. with the database and produce corresponding specific outputs. These specific outputs are non-limiting. I.e., the systems described herein may function in combination or alone to facilitate any number and kind of interactions with the immersive computing environment.

In some embodiments, systems described herein may have communication mechanisms configured to communicate with other systems or with parts of a system. In fact, the systems described herein may be capable of communicating with any other object or device, such as those listening to others via ultrasound or other communication technology. The communication mechanism may synchronize ultrasound panels that can work independently or combined when put close to each other or together. I.e., when ultrasound panels are close enough to each other, which may be detected using proximity sensors, they may send a message to work together for the other to perform a specific task. In some embodiments, the communication mechanism may also assist in reducing any latency in the communication path between the user tracking external module, AR platform, and ultrasound arrays. In some embodiments, the systems may also include a failure-assessment mechanism that may help identify dynamically dead elements on the ultrasound arrays and compensate them by altering the algorithms, so the focal points or recipes are optimized. In some embodiments, the failure assessment mechanisms may be able to monitor real-time data of each system. In some embodiments, the systems may include cloud-based architecture that would facilitate various tasks, such as storing information, downloading new haptic recipes, computing efficiency in real time using the latest algorithms, reducing required hardware, and supporting modular designs.

The systems may also include various specific hardware designs that, for example, may assist with synchronizing beams in a multi-system architecture. In some embodiments, the systems may also include grid arrangements. For example, the grid arrangement may be a circular arrangement of transducers. For many airborne ultrasound transducers, their size (diameter) is 1-1.25 larger than the acoustic wavelength. When arranged in an array with symmetry the transducer spacing can create secondary maxima or grating lobes, which is undesirable from a user's safety standpoint as well as being a limitation to the clarity of acoustic objects and pressure field. This problem can be fixed by arranging transducers in a grid that has reduced symmetry, for example, a series of concentric circles that are rotated to different angles. Transducer positions can be determined by: defining the number of transducers in inner (smallest) circle; determining the next largest radius that: (1) does not overlap transducers and (2) has an integer number of transducers; rotating a circle with respect to the previous circle; and repeating previous two steps until desired size of array is achieved. In some embodiments, it may be advantageous to have a square or rectangular array to maximize coverage on a circuit board. To accomplish this, a circular array may be grown to a maximum distance of transducer to center on a desired rectangular or square grid. Then transducers whose positions exceed maximum dimension of rectangular grid may be eliminated.

In some embodiments, the ultrasound arrays may include filters or covers that may serve a variety of purposes including environmental protection (dust, water, etc.) and aesthetic enhancement. In other embodiments, the filters or covers may eliminate the need for acoustic modulation algorithms, and instead the filter or cover that may be positioned above the ultrasound array dynamically may move, which alters the acoustic field, generating the desired acoustic shapes and interactions mid-air. In some embodiments, the filters or covers may be able to enhance the sensation felt by the users. For example, hardware filters or covers may be capable of enhancing sensation by enhancing the various haptic feelings, by decreasing noise, and refining focal points for more precision. In some embodiments, the filter or cover may be 3-D printed and may match the gaps of the ultrasound array perfectly such that the whole array is "enclosed" or "fitted" but does not lose any performance value; usually a filter or cover will reduce the performance of the array, but since the cover here may sit between the transducers and does not cover any individual transducer, it does not reduce the requisite pressure. The cover or filter may be also serve as waveguides or impedance matching structure to produce greater acoustic energy emitted from the array. Waveguides act similar to an acoustic horn, directing the acoustic energy from the transduction location where the sound is being generated and delivering it to the air medium above the transducer. Depending on the waveguide design, the waveguides can increase the amount of energy transferred to the air and control acoustic characteristics such as the frequency of the emitted sound. Similarly, impedance matching structures can increase the amount of energy transferred to the air by providing intermediate material between the transducer and the air that is favorable for acoustic transmission. The impedance matching material may be a metamaterial or other engineered structure that allows greater acoustic energy to be transferred to the air.

In some embodiments, the systems may be integrated with the real world. In some embodiments, there may be a need to accurately position and locate the systems in the real world, i.e. the virtual world needs to line up or sync or spatially register with the real world (e.g., a user's hand and the system need to line up or sync together). In some embodiments, the ultrasound array may be located in AR or VR using computer vision and/or InfraRed mechanisms.

In some embodiments, the systems may be capable of auto translating AR or VR visual content into haptic coordinates for the systems themselves. This may be done by having an algorithm capable of choosing which content should be made touchable (through machine learning, for instance). In some embodiments, the system may be capable of predicting the next scenario or interaction to prepare a smoother interaction, i.e., the system may be able to predict where a user's hands (or any other body part) are going next using computer vision or machine learning. Where a user is, where the user is going, and what sensation the user is feeling may all be factored into such predictions. In some embodiments, the predictions may also take into account a user's human metrics, for example, whether the user is fat or thin or has big or small hands. In some embodiments, the systems may comprise visual markers that may indicate user's presence in the AR or VR world.

In some embodiments, the visual contents may be translated to a corresponding acoustic object by predicting the expected feeling of an object according to its texture, volume, etc., i.e. by automatic creation of an acoustic object. This may also be done using machine learning, computer vision, or look up tables. This may also be done using a graphical user interface (GUI) on the developer side. In some embodiments, the user themselves may create the required feelings. The system may interface with a software platform that allows users themselves to create feelings, patterns, or digital textures by combining individual focal points at specific times. By allowing the user to modulate specific focal points, choose the number, physical arrangement, and even frequency, the systems may create a vast library, where the users can store, share, or even buy other people's textures.

Systems described herein may have the ability to incorporate temperature sensations, such as heat and cold. For example, in some embodiments, in order to create a temperature sensation of warmth, the ultrasound array may generate heat and channels and directs said heat (warmth) from the array surface to warm up focal points mid-air. Another possible method of generating the sensation of heat is by modulating focal points in certain ways. Further, in order to create a temperature sensation of cold, the ultrasound array may be capable of simulating the feeling of coolness by modulating focal points in certain ways.

By using various ultrasound systems described herein, multiple users may be able to communicate with each other in real time or using stored messages. The multiple users may communicate with each other through physical touch or through any of the immersive environments described herein. In some embodiments, the ultrasound systems may function along with external computing devices, such as computers, phones, tablets, etc. that may perform one or more tasks that, as described herein or as generally known, are performed by the ultrasound systems themselves. For example, in some embodiments, the ultrasound system may be communicatively coupled a computing device, such as a phone, or other electronic devices using 5G, WiFi, Bluetooth®, etc. and may offload the computing or storage functions to the computing or electronic devices. In some embodiments, the computing or electronic devices may offload some of their tasks onto the ultrasound systems as well. In some embodiments, the multiple users may be able to interact with each other by storing messages, such as visuals, avatars of each other, audio messages, recording sensations, etc. For example, one or more users may store these messages and the new user(s) may enter the immersive experience and be able to access the messages and interact with the messages. These interactions may occur in a variety of ways, such as one-on-one/peer-to-peer user interaction; one user to a group of users—for example, a speaker may interact with a group of users; or a group of users to a group of users—for example similar to an online game that facilitates interaction of multiple users separated by geographical distance.

The ultrasound devices described herein may be equipped with various safety features that facilitate the device shutting down or turning on. For example, the ultrasound system may detect a user's head's proximity to the ultrasound array and turn itself off if needed based on the time the user's head has spent at a set proximity to the ultrasound array. Any other parameter may be used to shut the ultrasound system on or off. For example, if the ultrasound system does not detect a user's hand, it may not even turn on. The ultrasound system may shut off or turn on automatically or it may prompt the user using signals to shut it off or turn it on manually. Further, the ultrasound arrays in the ultrasound systems described herein may be oriented in any direction (i.e., the arrays are not limited to the orientation illustrated in the figures). The foregoing description has been presented for purposes of illustration. Said description is not intended to be exhaustive nor is it to limit the invention to the precise forms disclosed. Modifications are possible and inherent in light of the above teachings. The described embodiments were chosen in order to explain the principles of the invention, its practical application, and to allow others possessing ordinary skill in the art to implement those modifications and variations inherent thereto. It is intended that the ultimate scope of any particular embodiment be defined and/or limited exclusively by the claims that follow.

What is claimed is:

1. A multi-array ultrasound system for haptic engagement, the system comprising:
    a computing device with a processing system;
    a tracking device communicatively coupled to the processing system;
    wherein the tracking device provides the tracking information to the processing system;
    two or more ultrasound transducer arrays including a plurality of ultrasound transducers that can produce at least one acoustic field of ultrasonic energy, wherein the plurality of ultrasound transducers is arranged in a set of two-dimensional concentric circles of varying radius, wherein each concentric circle of the set of two-dimensional concentric circles comprises a subset of the plurality of ultrasound transducers, wherein each concentric circle is rotated to reduce alignment of the ultrasound transducers along any direction, and wherein each adjacent concentric circle is not aligned; and
    a driver communicatively coupled to the processing system and the two or more ultrasound transducer arrays;
    wherein the driver causes the plurality of ultrasound transducers to create a mid-air tactile sensation on the body part of the at least one user through excitement of the two or more ultrasound transducer arrays in response to feedback from the processing system that is responsive to the tracking information from the tracking device.

2. The multi-array ultrasound system of claim 1, wherein the relative position or orientation of the arrays is measured automatically.

3. The multi-array ultrasound system of claim 1 further comprising three or more ultrasound transmitters that emit ultrasound signals.

4. The multi-array ultrasound system of claim 3, wherein the ultrasound transmitters are placed above the ultrasound arrays.

5. The multi-array ultrasound system of claim 4, wherein the ultrasound transmitters are placed above the ultrasound arrays using a holding system.

6. The multi-array ultrasound system of claim 5, wherein the holding system does not impede signal transmission between the ultrasound transmitters and ultrasound arrays.

7. The multi-array ultrasound system of claim 4 further comprising detectors.

8. The multi-array ultrasound system of claim 7, wherein the detectors receive the emitted ultrasound signals from the ultrasound transmitters.

9. The multi-array ultrasound system of claim 7, wherein the location of the detectors is computed.

10. The multi-array ultrasound system of claim 3, wherein emission time of the emitted signals is computed.

11. The multi-array ultrasound system of claim 3 further comprising a waveform generator and a standard acquisition system.

12. The multi-array ultrasound system of claim 11, wherein the waveform generator is communicatively coupled to the standard acquisition system and the ultrasound transmitters.

13. The multi-array ultrasound system of claim 11, wherein the acquisition system records the emission time of the emitted ultrasound signals.

14. The multi-array ultrasound system of claim 11, wherein the acquisition system is commutatively coupled to the ultrasound detectors.

15. The multi-array ultrasound system of claim 11, wherein the acquisition system or waveform generator is embedded in the ultrasound system.

16. The multi-array ultrasound system of claim 1 further comprising an orienting feature.

17. The multi-array ultrasound system of claim 1, wherein the ultrasound system is integrated into an immersive computing environment.

18. The multi-array ultrasound system of claim 17, wherein the immersive computing environment further comprises an AR/VR/XR system.

19. The multi-array ultrasound system of claim 18, wherein the AR/VR/XR system provides a visualization of digital objects.

20. The multi-array ultrasound system of claim 17, wherein the immersive computing environment is communicatively linked to a smart speaker, wherein the smart speaker comprises a voice interface and smart assistant software, and wherein the smart speaker utilizes a set of neural networks to interface with digital content.

\* \* \* \* \*